(12) United States Patent
Hagenbuch

(10) Patent No.: US 6,726,288 B2
(45) Date of Patent: Apr. 27, 2004

(54) TAILGATE ASSEMBLY FOR AN OFF-ROAD TRUCK

(76) Inventor: LeRoy G. Hagenbuch, 502 W. Northgate Rd., Peoria, IL (US) 61614

( * ) Notice: Subject to any disclaimer, the term of this patent is extended or adjusted under 35 U.S.C. 154(b) by 79 days.

(21) Appl. No.: 10/145,836

(22) Filed: May 14, 2002

(65) Prior Publication Data

US 2003/0214174 A1 Nov. 20, 2003

(51) Int. Cl.$^7$ ................................................ B60P 1/26
(52) U.S. Cl. .............................. 298/23 D; 298/230 F; 296/56
(58) Field of Search .................. 298/23 MD, 23 D, 298/230 F, 17 B; 296/56, 50, 184

(56) References Cited

U.S. PATENT DOCUMENTS

| | | | |
|---|---|---|---|
| 2,639,187 A | * | 5/1953 | Grumbache ................ 296/37.6 |
| 3,272,552 A | | 9/1966 | Park |
| 3,720,446 A | | 3/1973 | Kelley |
| 3,751,112 A | * | 8/1973 | Hagenbuch ............. 298/23 DF |
| 3,905,493 A | | 9/1975 | Logue |
| 3,905,616 A | | 9/1975 | Tamburino et al. |
| 3,917,343 A | | 11/1975 | Taylor et al. |
| 3,927,724 A | * | 12/1975 | Baker ......................... 177/136 |
| 4,050,734 A | | 9/1977 | Richard |
| 4,071,277 A | | 1/1978 | Stedman |
| 4,323,279 A | | 4/1982 | Domes et al. |
| 4,348,055 A | | 9/1982 | Meisner et al. |
| 4,531,781 A | | 7/1985 | Hunt et al. |
| 4,621,858 A | | 11/1986 | Hagenbuch |
| 4,666,003 A | * | 5/1987 | Reichow ..................... 177/136 |
| 4,678,235 A | | 7/1987 | Hagenbuch |
| 4,779,931 A | * | 10/1988 | Miller et al. .............. 298/17 B |
| 5,100,279 A | | 3/1992 | Bjerk |
| 5,112,082 A | * | 5/1992 | Clelland ..................... 280/783 |
| 5,228,750 A | | 7/1993 | Hagenbuch |
| 5,372,448 A | * | 12/1994 | Gilb ........................... 403/231 |
| 5,474,363 A | | 12/1995 | Hagenbuch |
| 5,887,914 A | | 3/1999 | Hagenbuch |
| 6,495,774 B1 | * | 12/2002 | Pederson .................... 177/136 |
| 6,517,143 B2 | * | 2/2003 | Hagenbuch ................ 296/184 |

FOREIGN PATENT DOCUMENTS

| | | |
|---|---|---|
| CH | 98789 | 4/1940 |
| DE | 913876 | 6/1954 |
| GB | 595516 | 12/1947 |

OTHER PUBLICATIONS

Photographs (5) of an outrigger arrangement on a Moxy MT26 truck taken Mar. 22, 2002.

* cited by examiner

Primary Examiner—D. Glenn Dayoan
Assistant Examiner—H. Gutman
(74) Attorney, Agent, or Firm—Leydig, Voit & Mayer, Ltd.

(57) ABSTRACT

In view of the foregoing, a tailgate assembly for a dump body of a truck is provided. The tailgate assembly includes an outrigger assembly having an associated mounting assembly that permits the outrigger assembly to be fastened around the frame of the truck. Each mounting assembly includes a mounting member connected to the outrigger assembly for engaging a first surface of the frame, a clamp member for engaging a second surface of the frame and at least one fastener for interconnecting the mounting and clamping plates thereby clamping the frame therebetween.

44 Claims, 29 Drawing Sheets

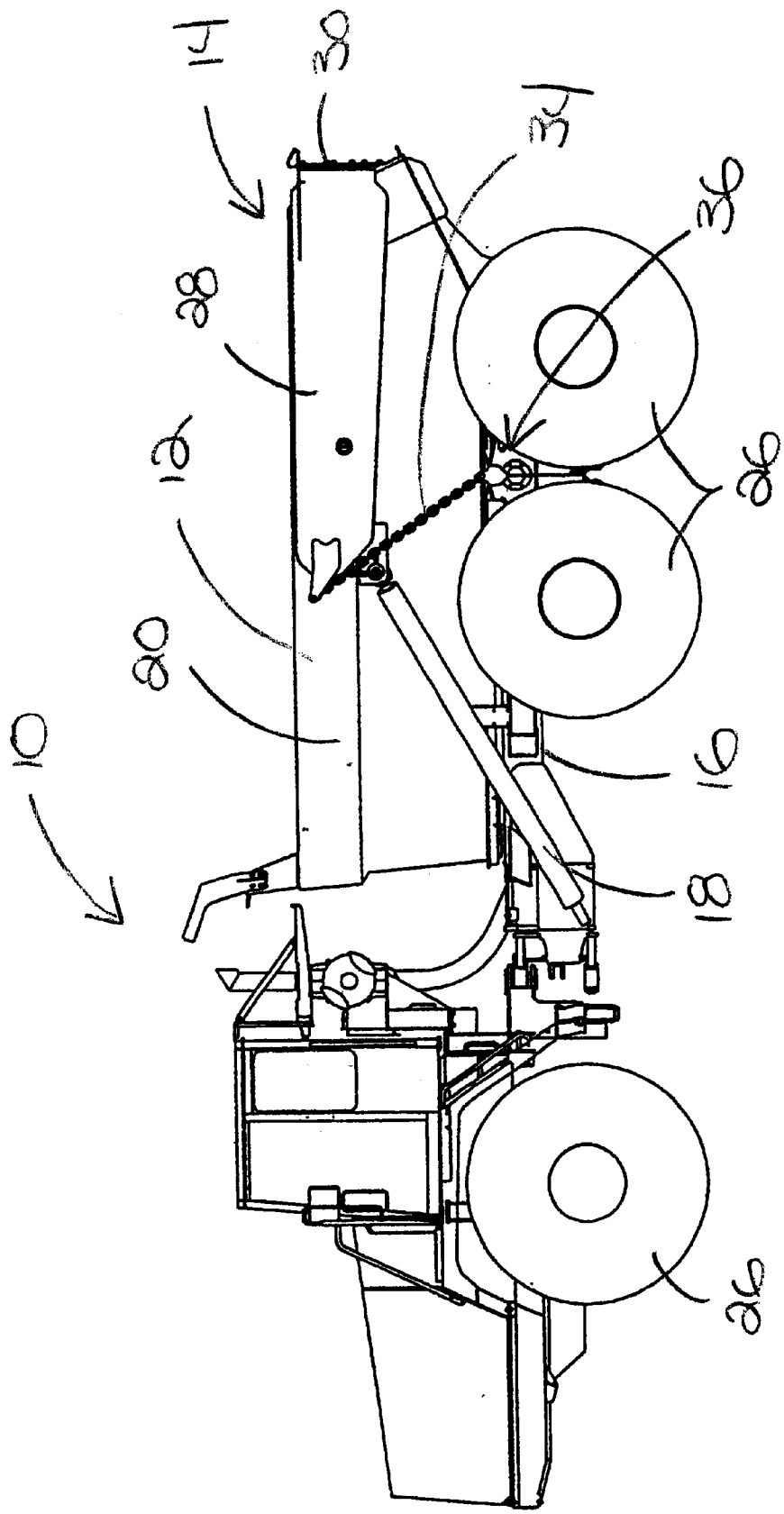

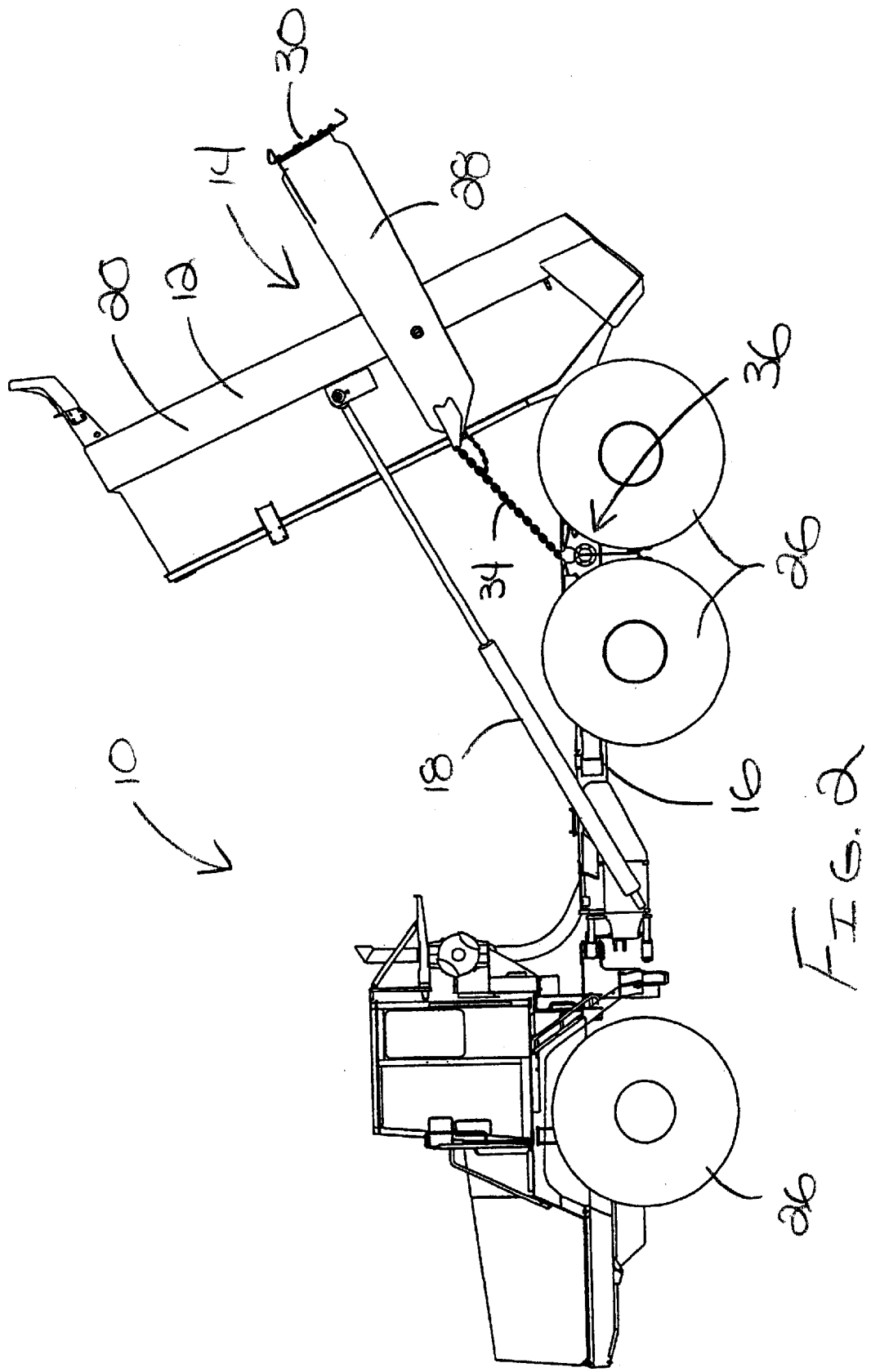

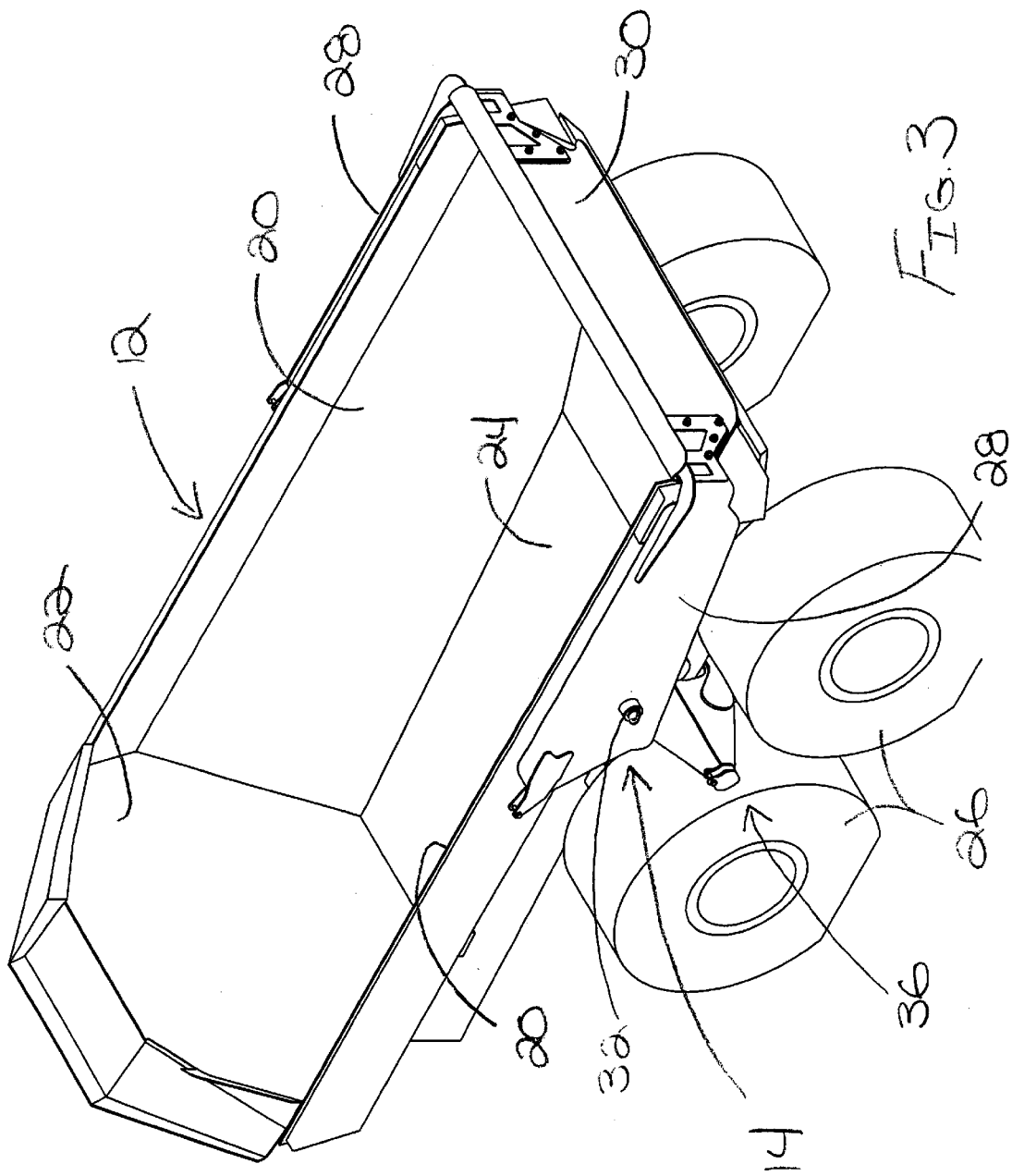

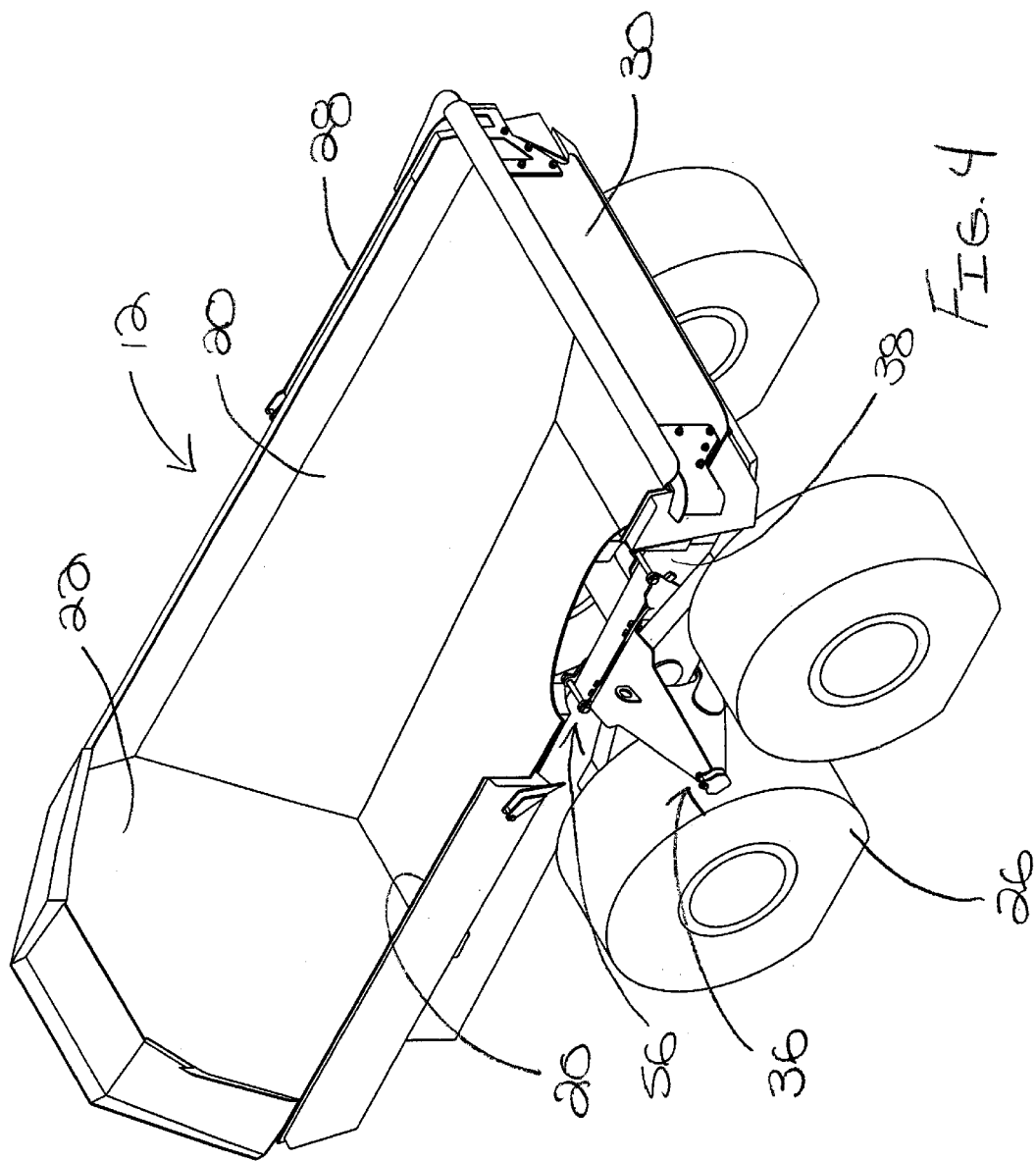

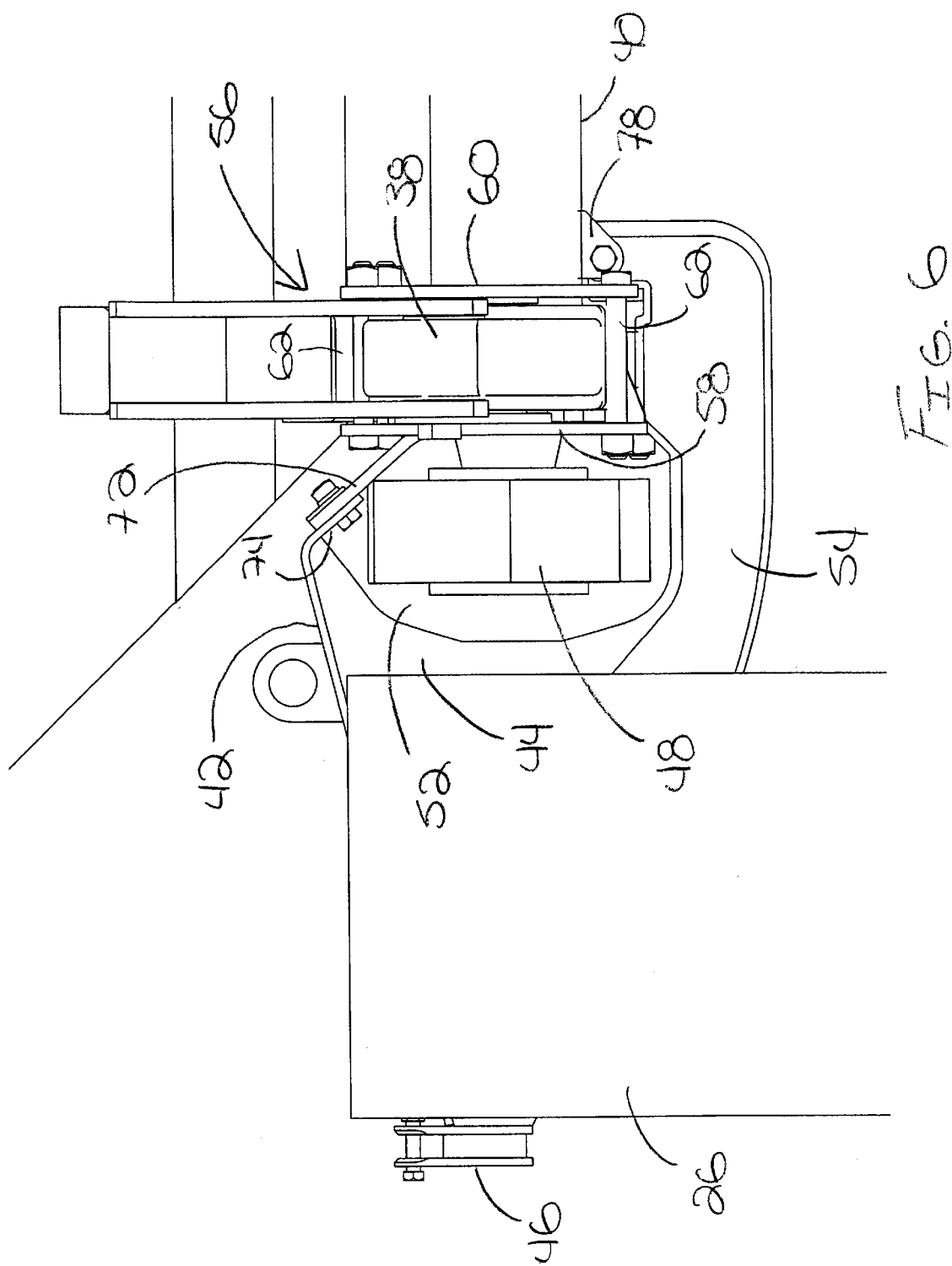

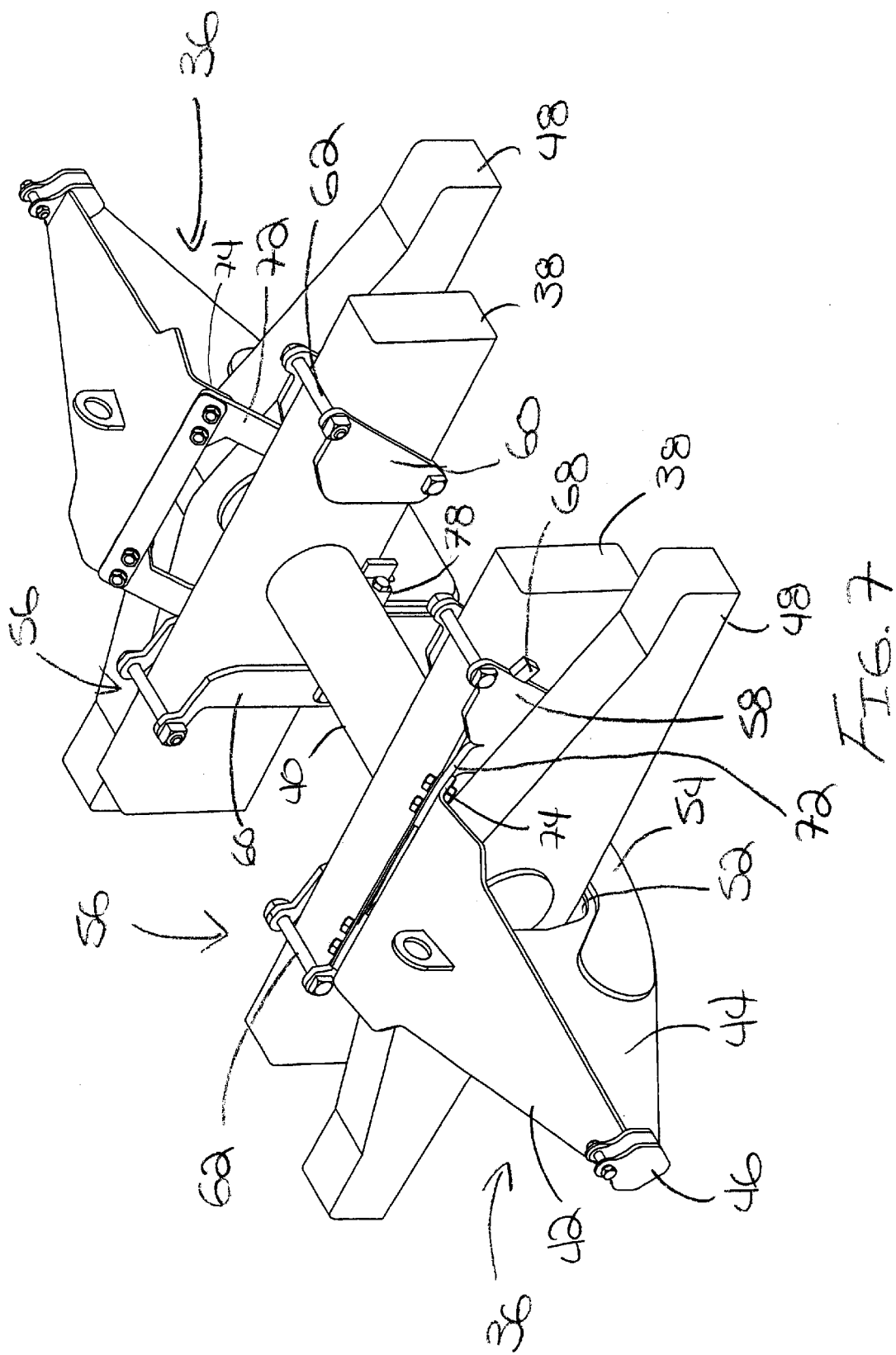

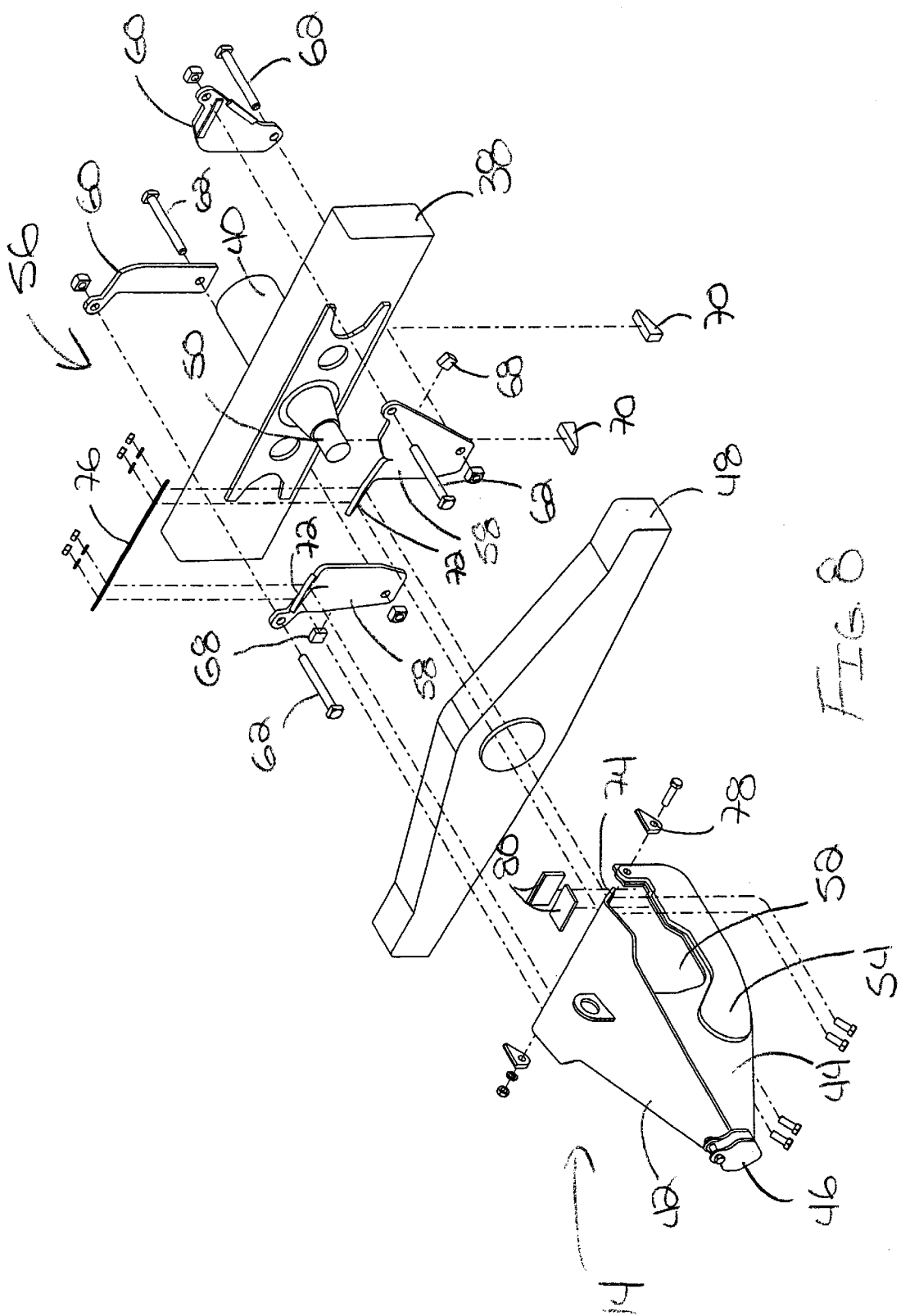

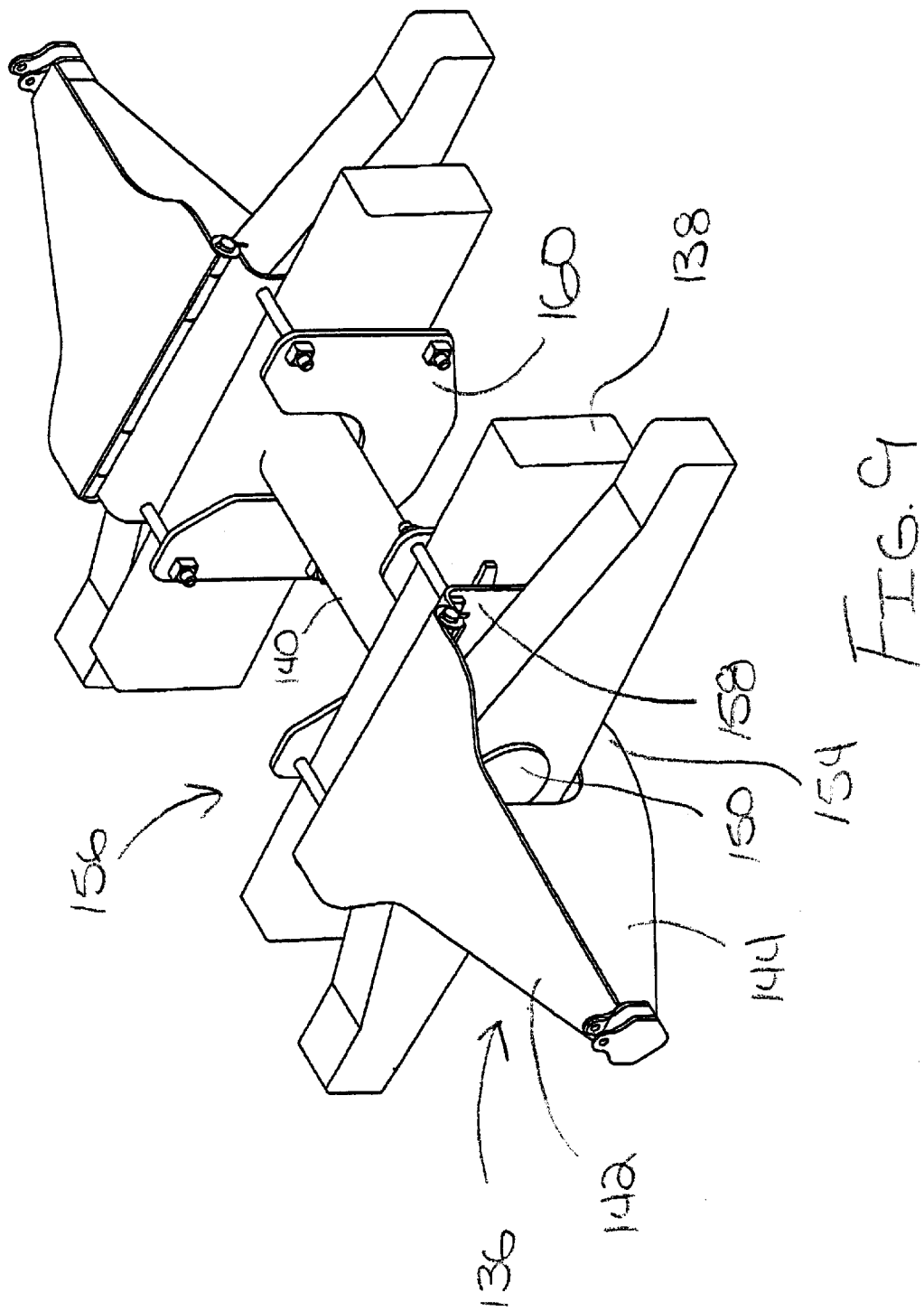

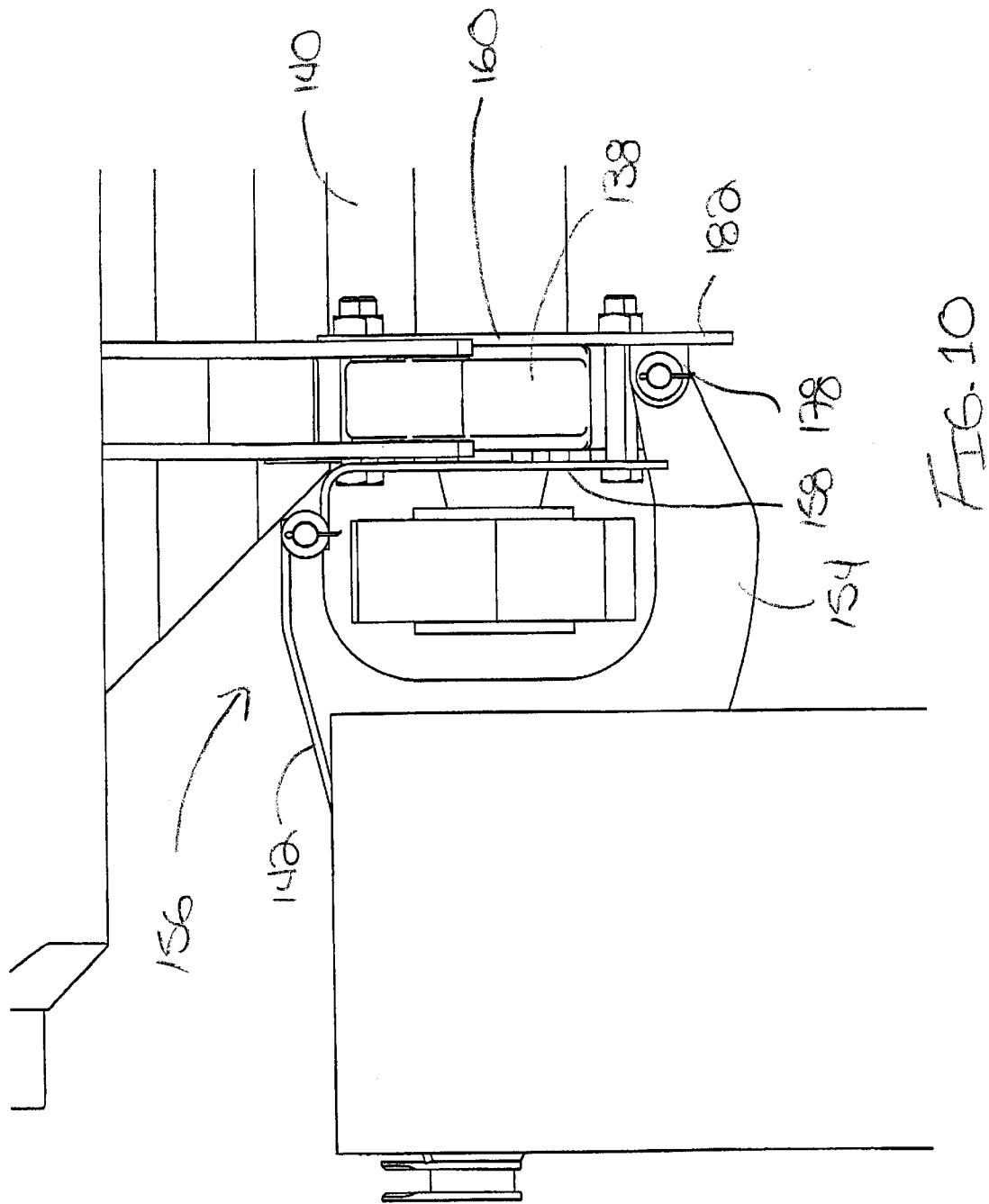

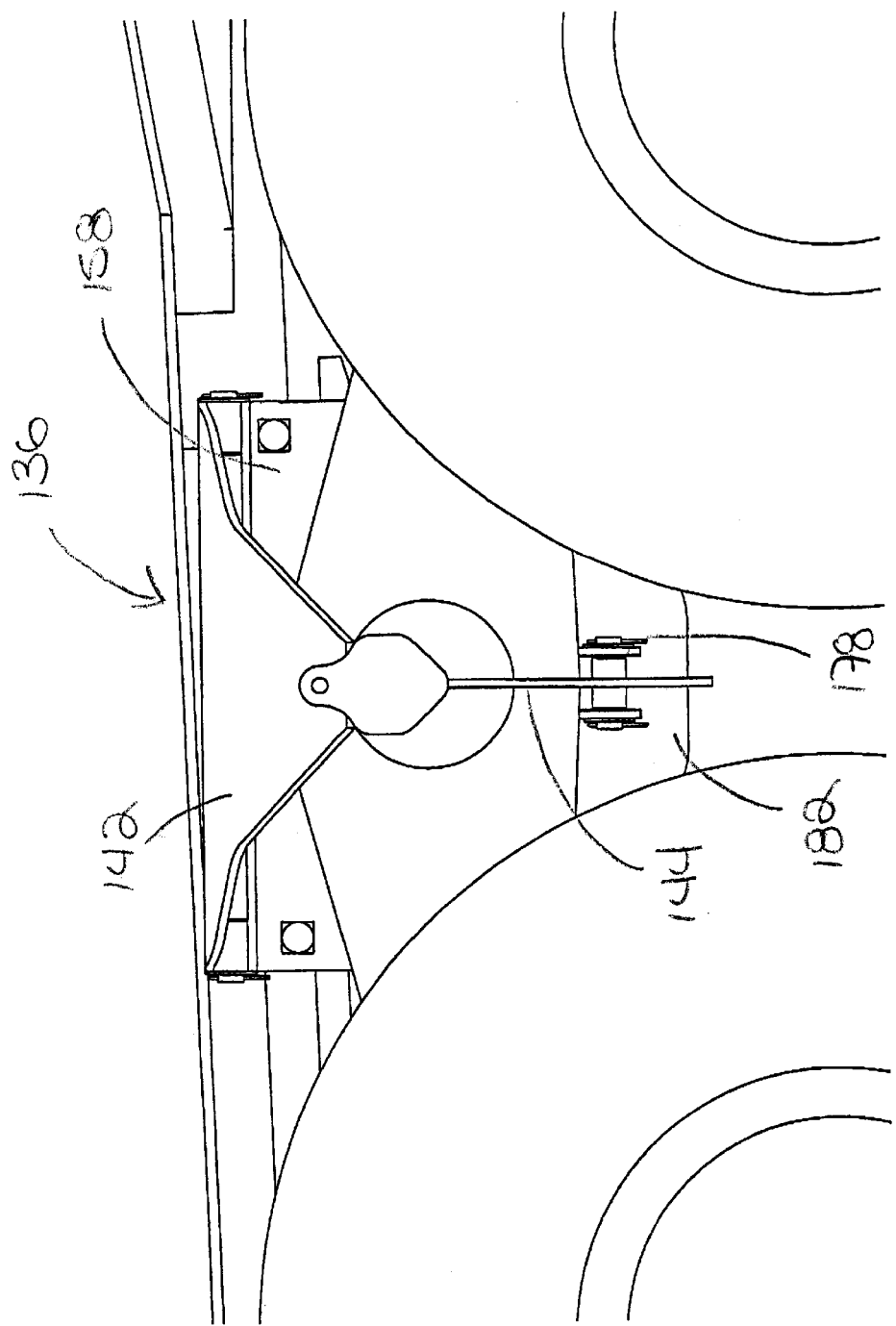

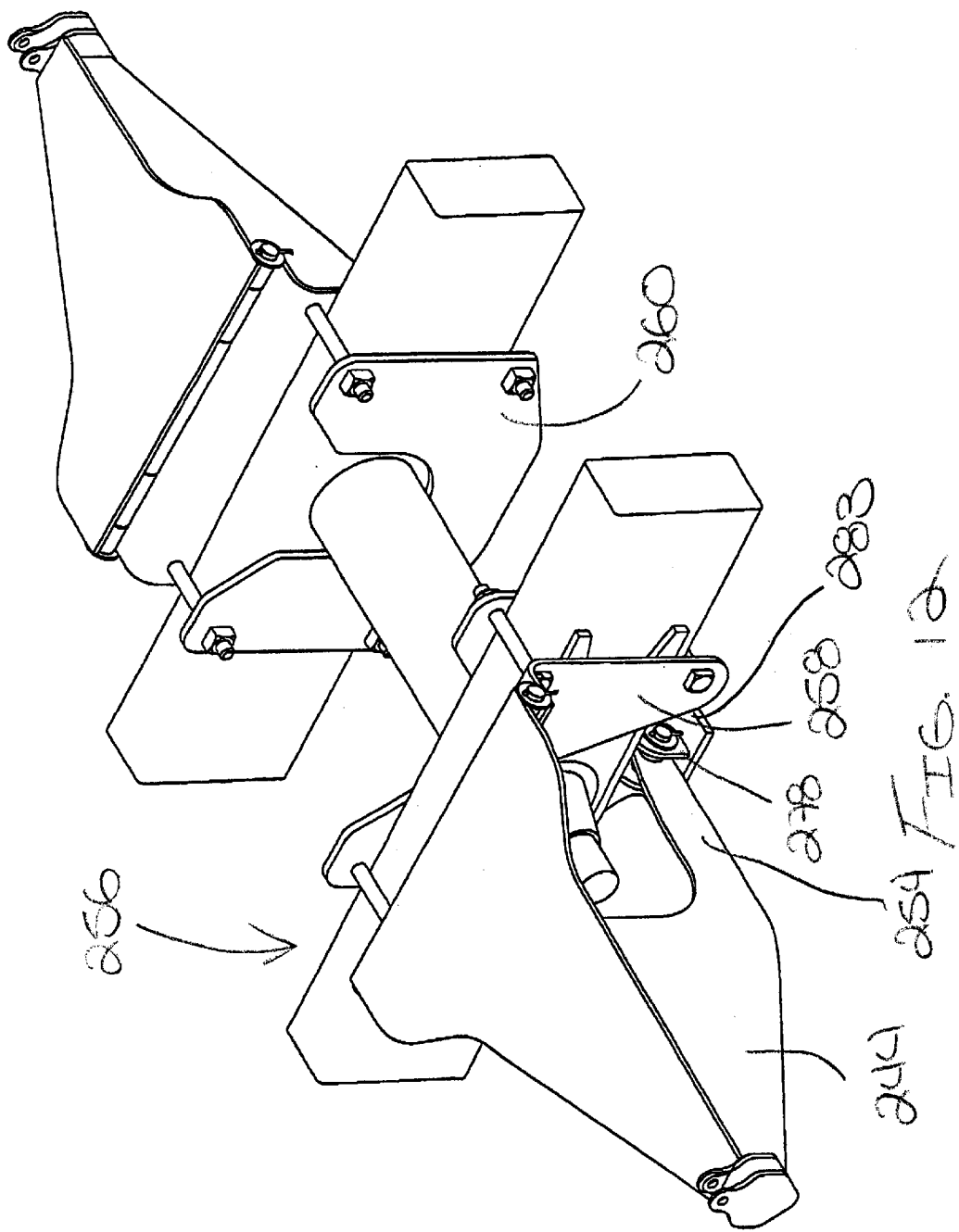

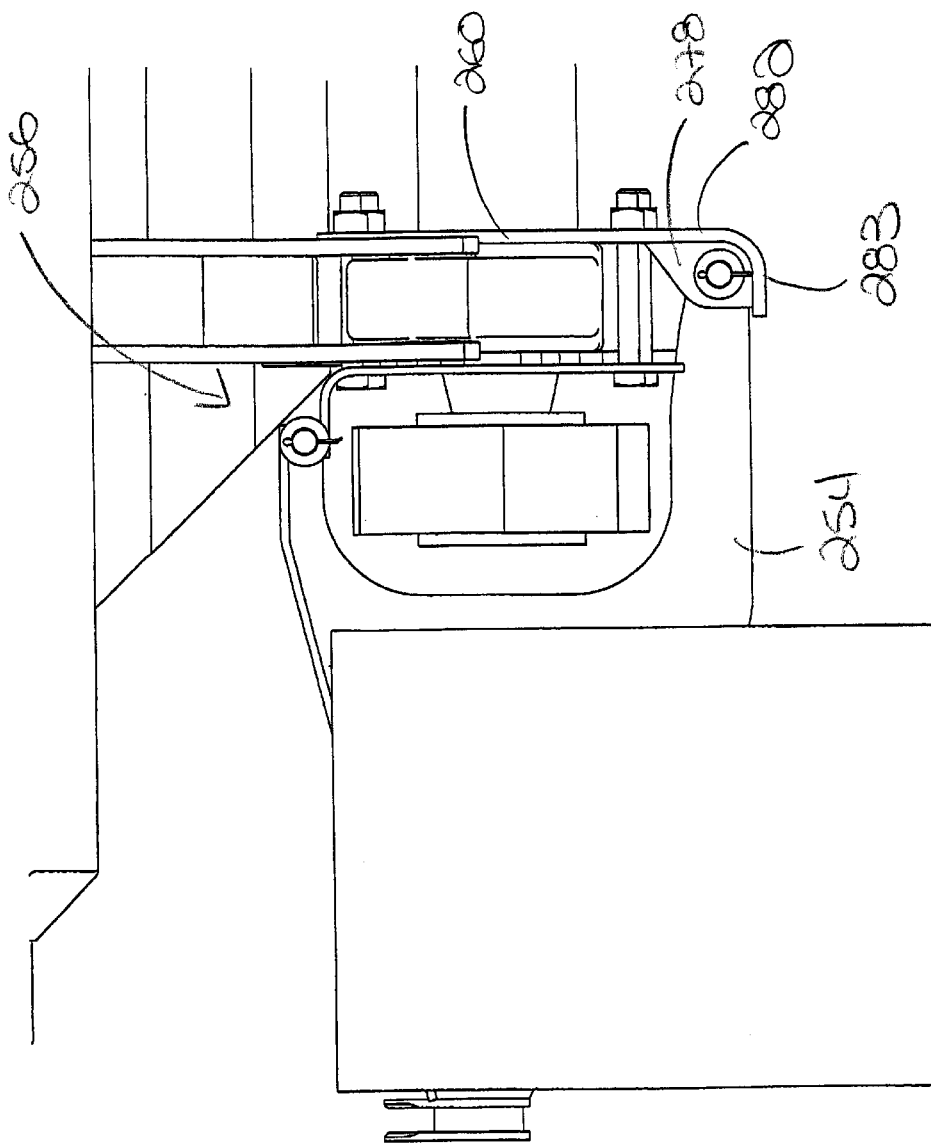

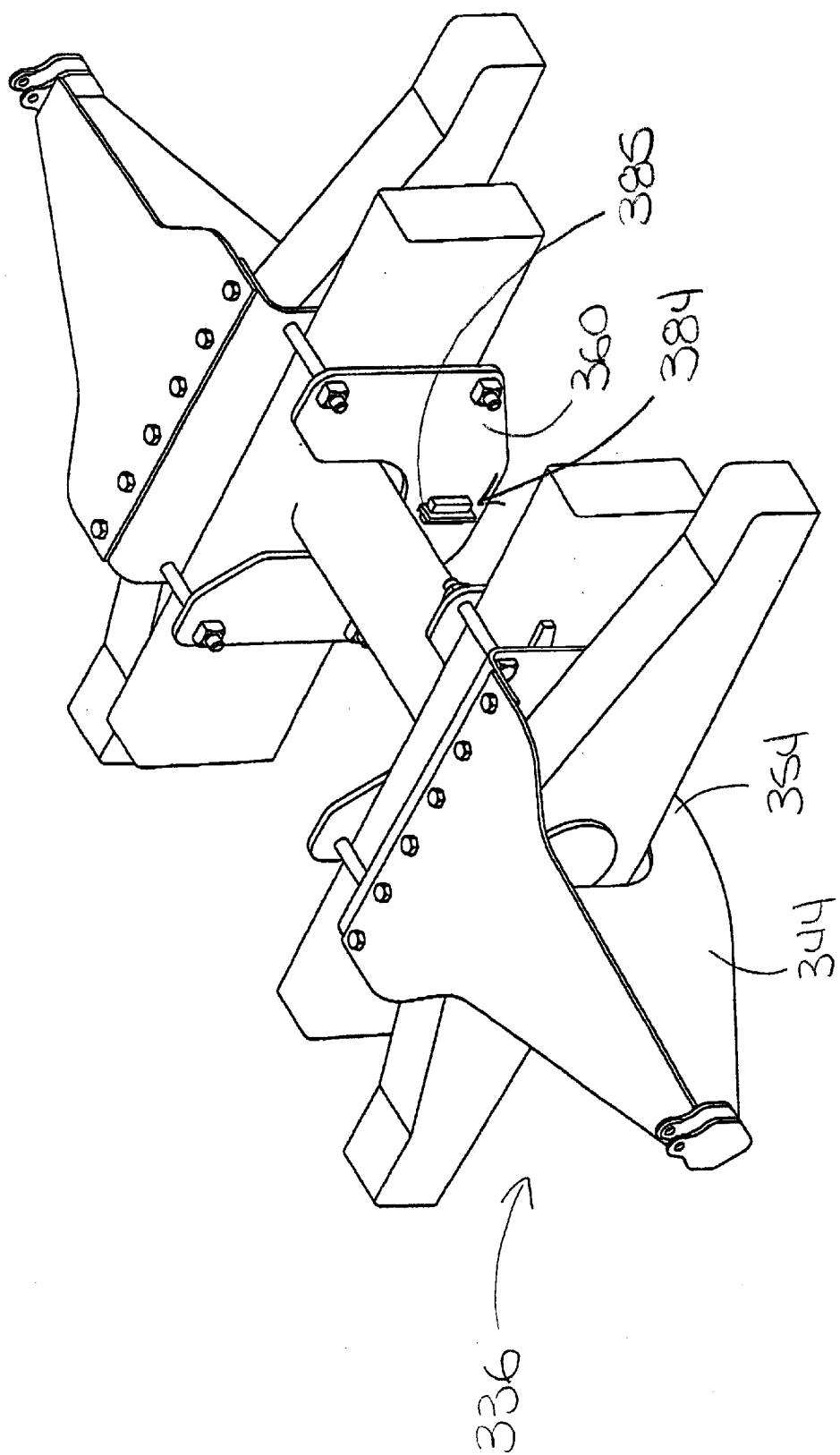

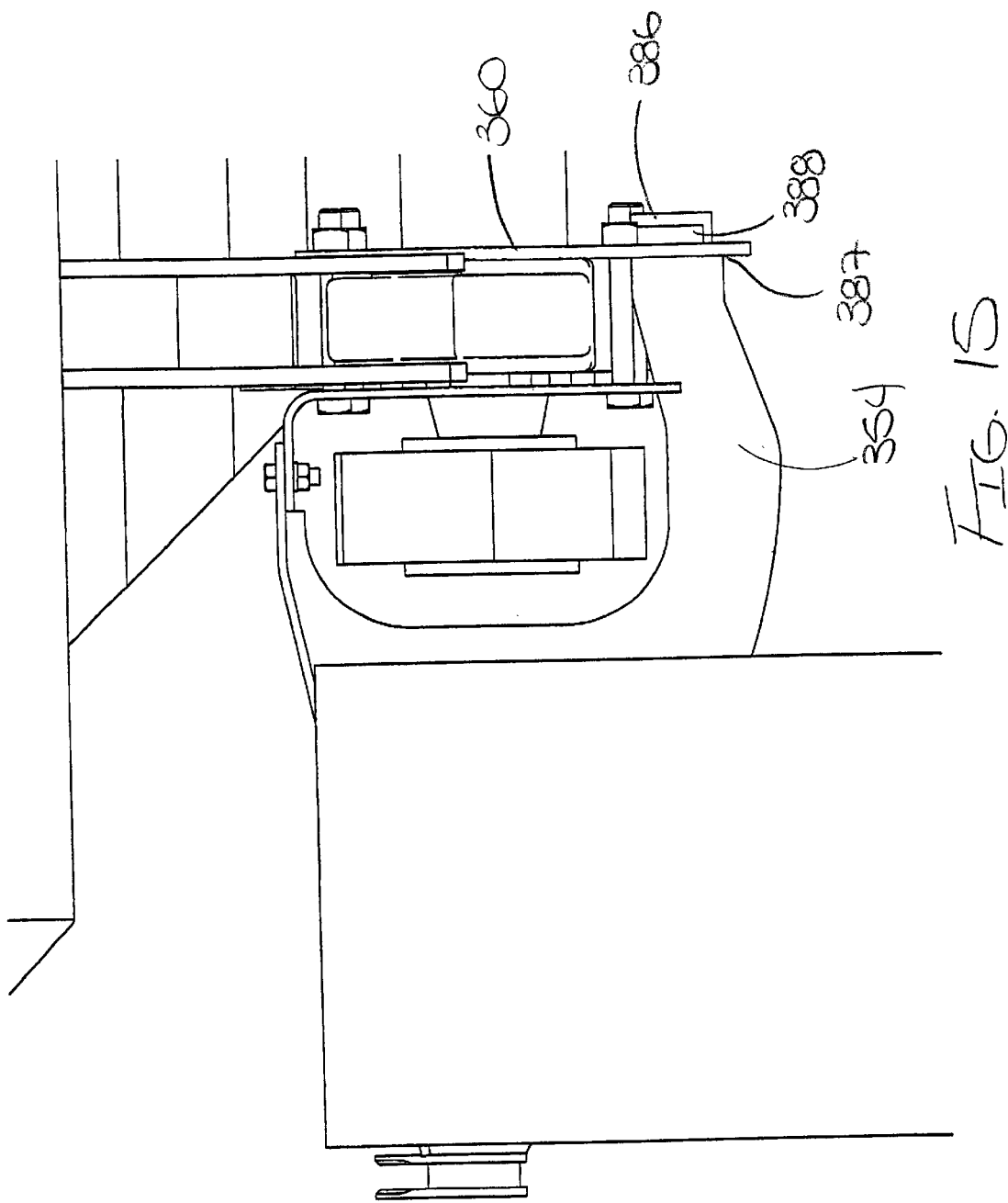

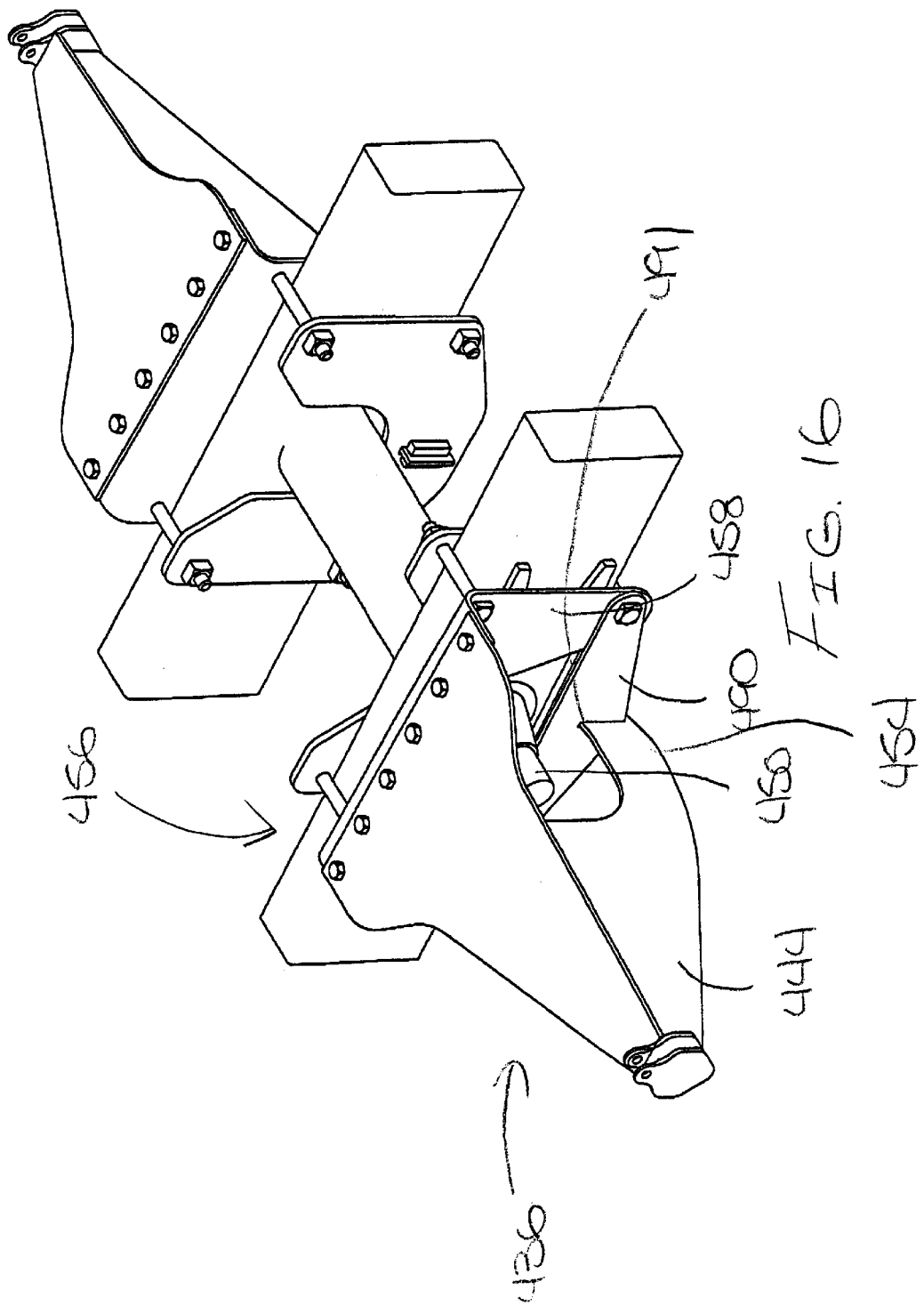

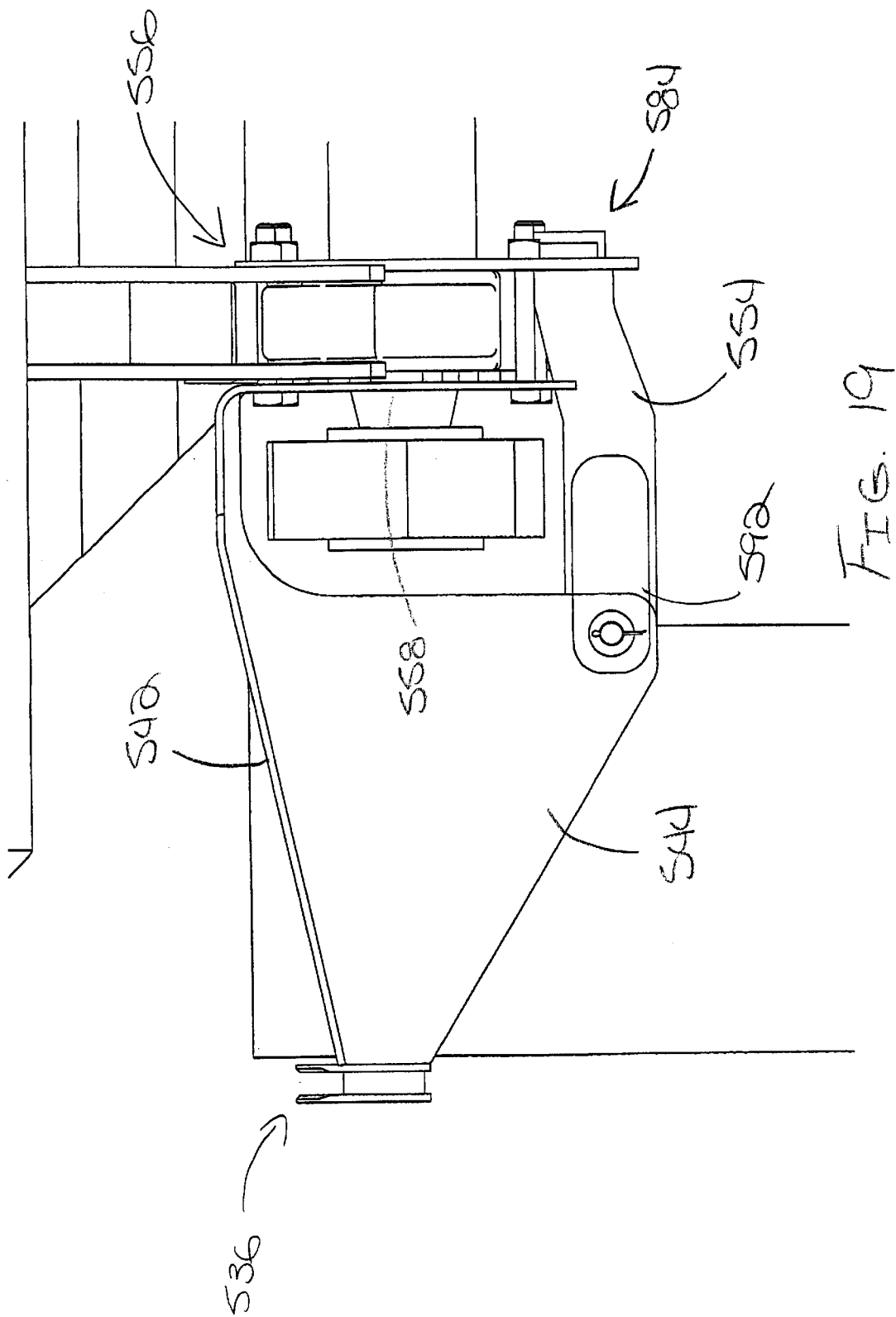

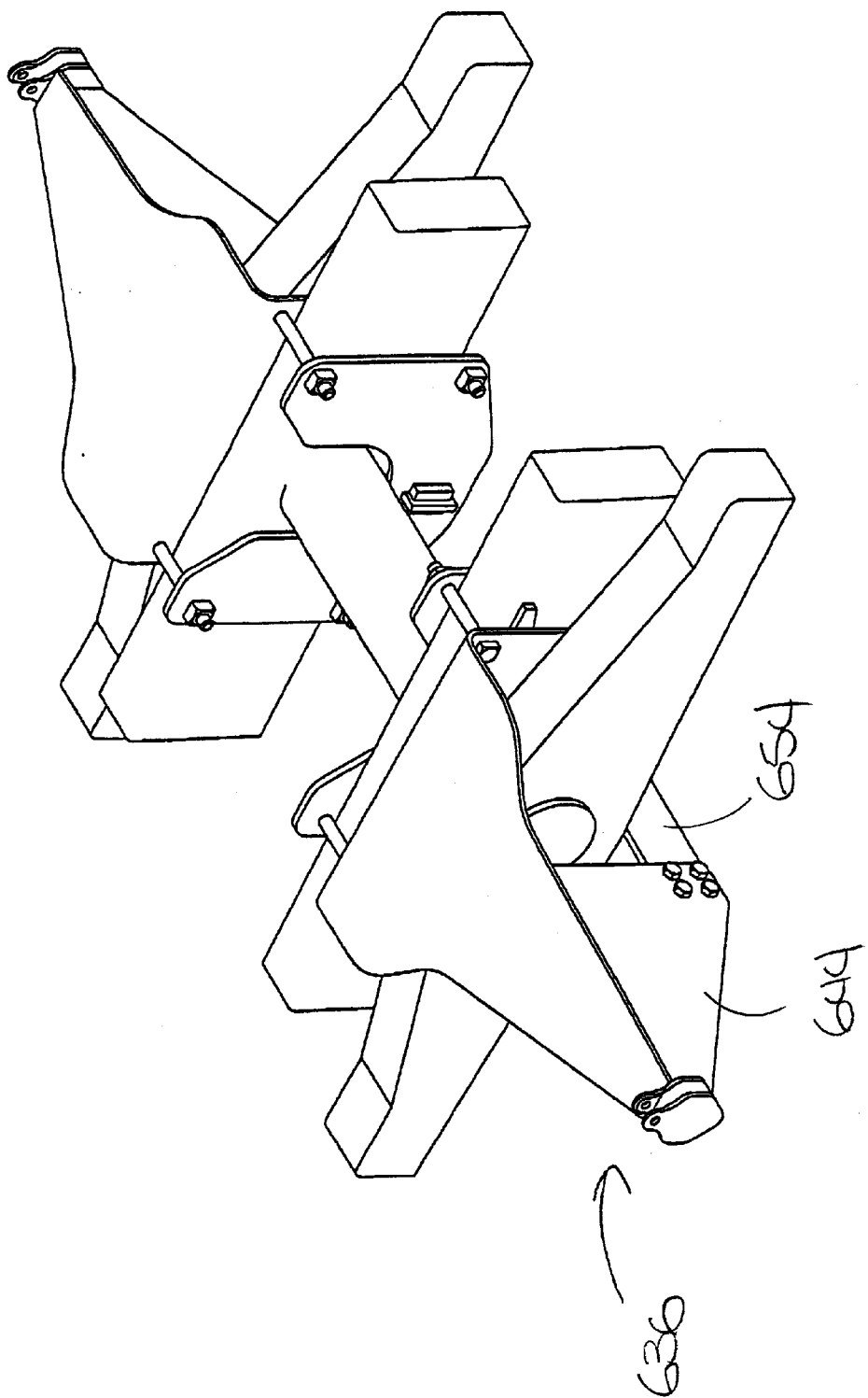

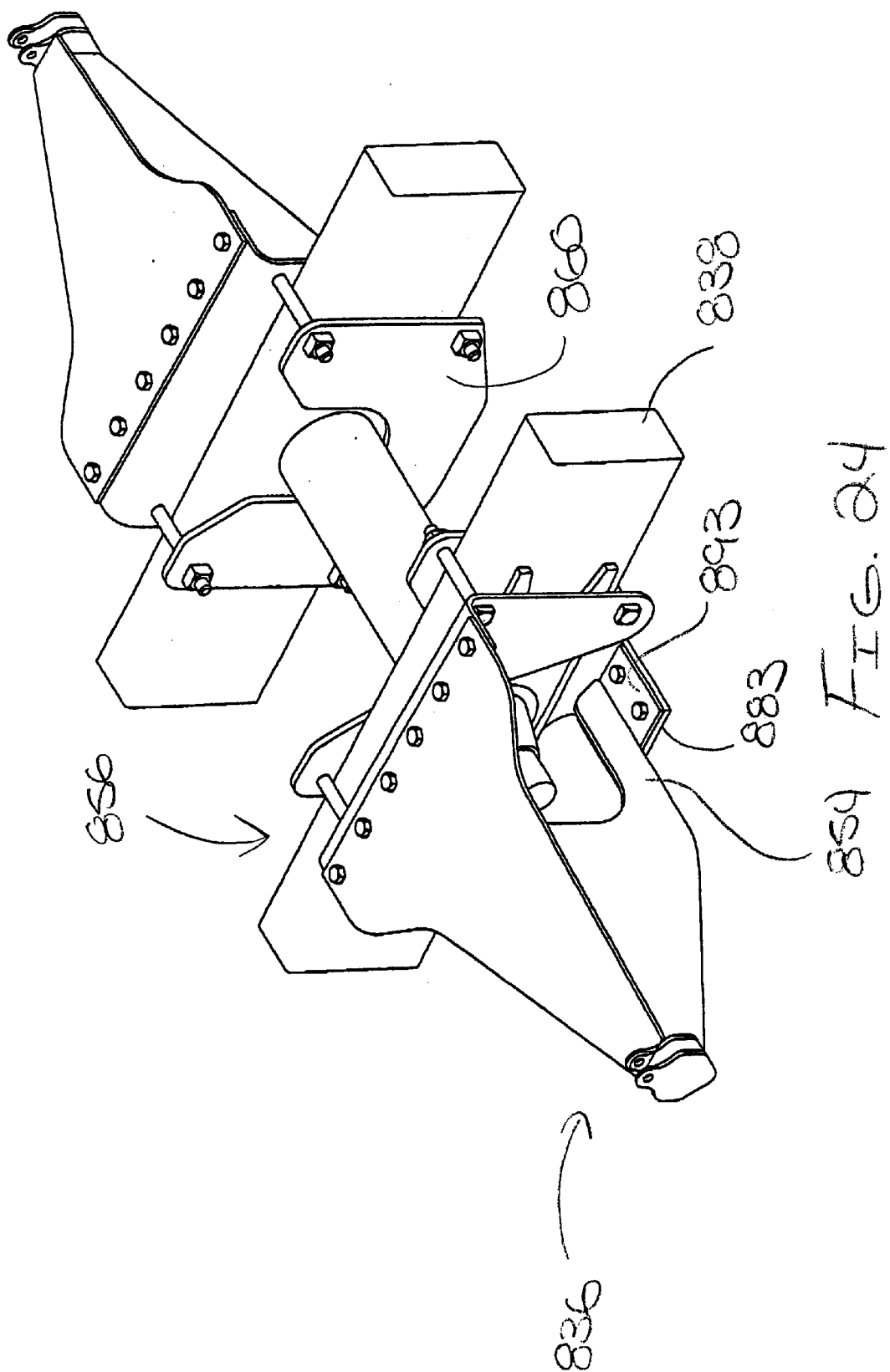

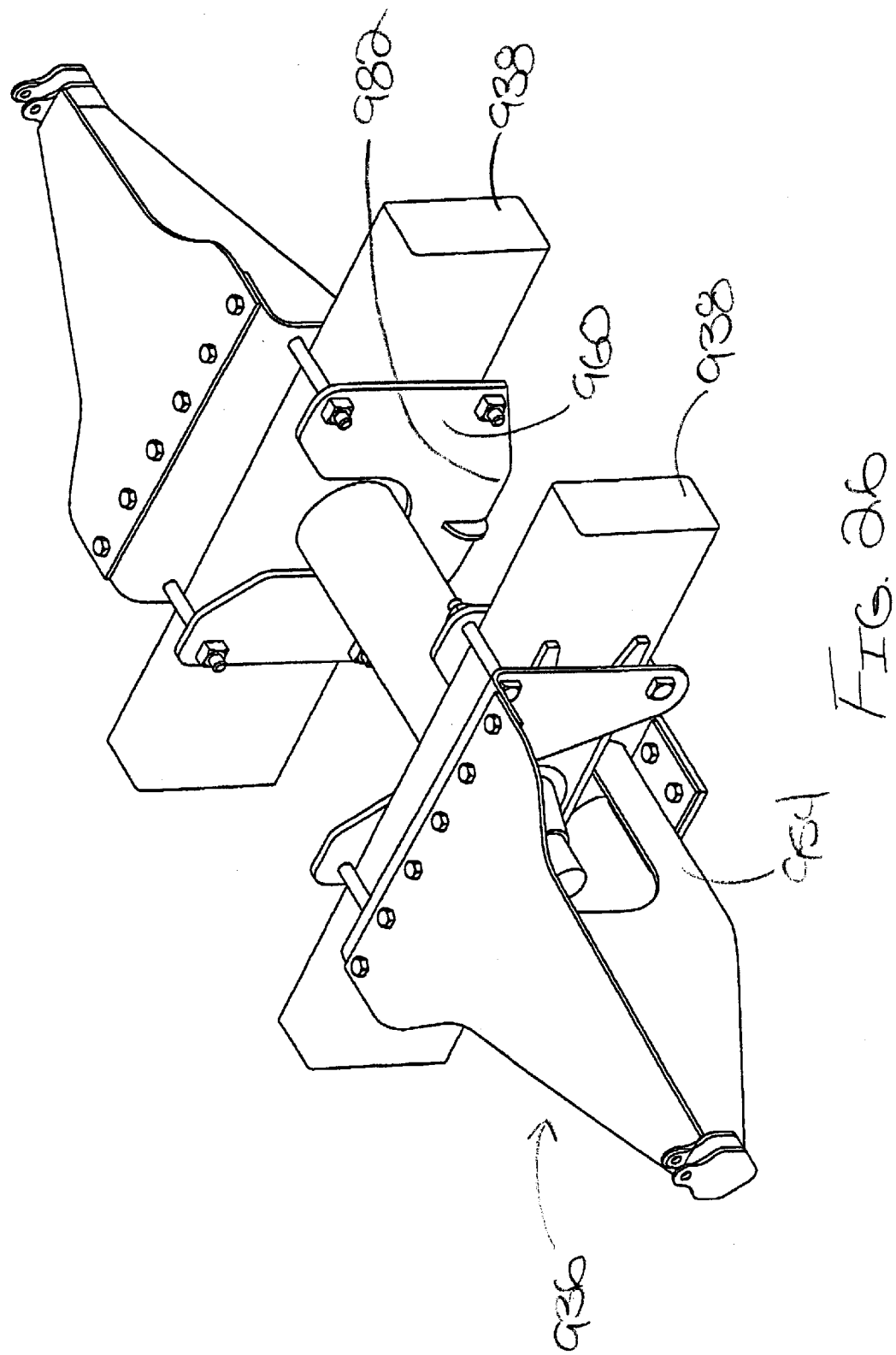

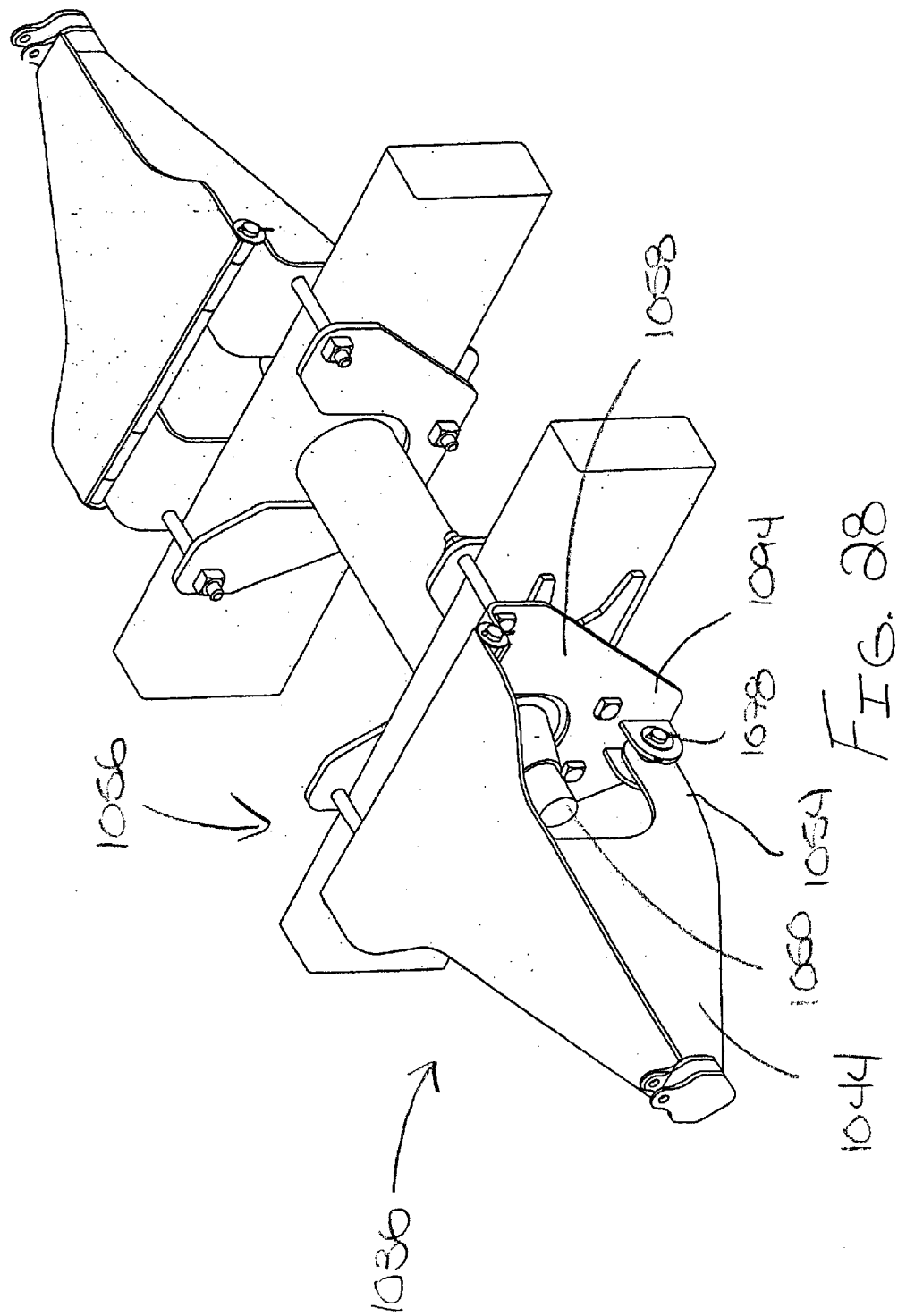

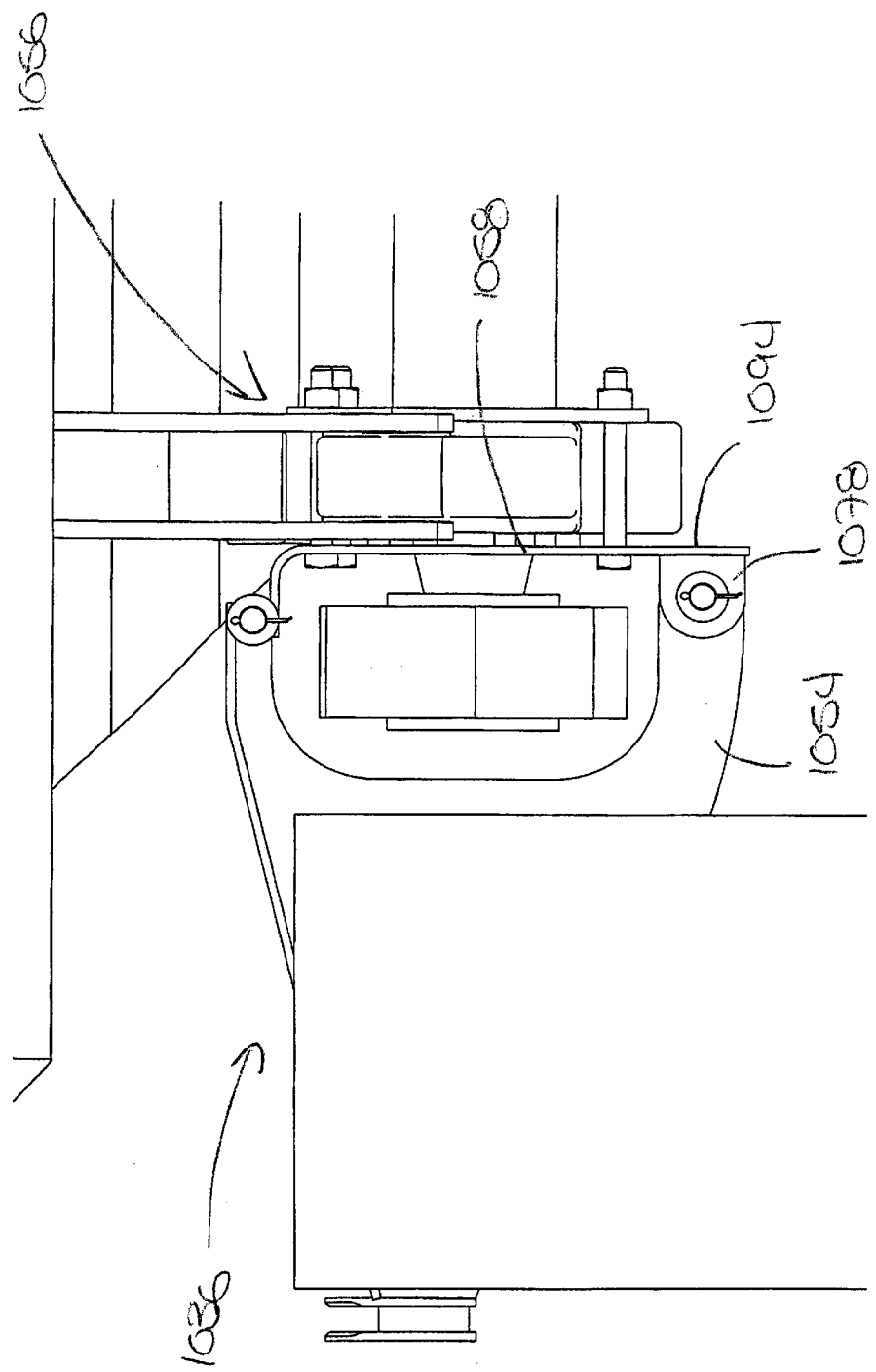

TAILGATE ASSEMBLY FOR AN OFF-ROAD TRUCK

FIELD OF THE INVENTION

This invention relates to heavy-duty off-road trucks and, more particularly, to a tailgate assembly for such trucks.

BACKGROUND OF THE INVENTION

The dump bodies of heavy-duty, off-road trucks are often provided with tailgate assemblies in order to increase their load capacity. A tailgate assembly typically includes a pair of straight sidearms which are pivotally mounted to the sides of the dump body and between which a center-rear portion is supported. When the tailgate assembly is in a closed position, the center-rear portion closes off the rear end of the dump body. Thus, when the tailgate assembly is closed, the effective volumetric capacity of the dump body is increased as material is prevented from spilling out of the rear of the dump body.

To allow material to be dumped from the rear of the dump body, the center-rear portion of the tailgate is pivotable upward into an open position. In particular, the center-rear portion pivots upward when the body is raised to a dump position as a result of an actuating mechanism that generally includes pair of chains or cables which link the sidearms of the tailgate to the truck frame. The chains can be attached to the truck frame in several different ways. One common method is to connect the chains to outriggers that extend outward from the frame of the body to a point beyond the sidewalls of the body. The outriggers ensure that the chains are not biased around the bottom edge of the body, which could cause damage to both the chains and the truck body.

Unfortunately, attaching the outriggers to the truck frame can be a very difficult and time-consuming task. Typically, the outriggers or outrigger attachment components are welded to the truck frame. However, there is very little space within which to perform such a welding operation on many off-road truck models. Moreover, the small space can be difficult for installation personnel to access because of the presence of various truck components such as walking beams, cylinders and other elements of the truck suspension system. As a result, the welding process can take a significant amount of time and thus substantially increases the labor cost associated with installing a tailgate on a dump body.

The difficulty associated with welding the outriggers to the frame also increases the likelihood of welding flaws. These welding flaws can significantly compromise the strength of the outrigger. Welding flaws are of particular concern because each outrigger is subjected to a substantial torque when the tailgate is pivoted into the open position. Thus, when welding flaws are present, the outriggers are susceptible to becoming separated from the truck frame after repeated use.

SUMMARY OF THE INVENTION

In view of the foregoing, a tailgate assembly for a dump body of a truck is provided. The tailgate assembly includes an outrigger assembly having an associated mounting assembly that permits the outrigger assembly to be fastened around the frame of the truck. The dump body includes a pair of opposing sidewalls and an open rear end. The dump body is movable relative to the truck frame between a lowered transport position and a raised dump position.

The tailgate assembly includes a pair of opposing sidearms each of which is pivotally connected to a respective sidewall of the dump body and a center-rear portion supported between the opposing sidearms. The sidearms and center-rear portion are movable between a closed position wherein the center-rear portion spans substantially between the opposing sidewalls of the dump body and encloses the open rear end of the dump body and an open position wherein the center-rear portion is positioned away from the open rear end of the dump body.

Each outrigger mounting assembly includes a mounting member connected to the outrigger assembly for engaging a first surface of the frame, a clamp member for engaging a second surface of the frame and at least one fastener for interconnecting the mounting and clamping plates thereby clamping the frame therebetween. The tailgate assembly further includes a pair of connectors. Each connector couples a respective one of the sidearms to a respective one of the outriggers such that the sidearms and center-rear portion rotate between the open and closed positions in response to rotation of the dump body between the lowered and raised positions.

These and other features and advantages of the invention will be more readily apparent upon reading the following description of an exemplary embodiment of the present invention and upon reference to the accompanying drawings wherein:

BRIEF DESCRIPTION OF THE DRAWINGS

FIG. 1 is a side elevation view of an illustrative heavy-duty, off-road articulated truck showing the dump body in the lowered position and an illustrative tailgate assembly constructed in accordance with the teachings of the present invention in the closed position.

FIG. 2 is a side elevation view of the articulated truck and tailgate assembly of FIG. 1 showing the dump body in the raised position and the tailgate assembly in the open position.

While the invention will be described and disclosed in connection with certain exemplary embodiments, it is not intended to limit the invention to those specific embodiments. Rather it is intended to cover all such alternative embodiments and modifications as fall within the scope of the invention.

DETAILED DESCRIPTION OF THE INVENTION

Figure 3:
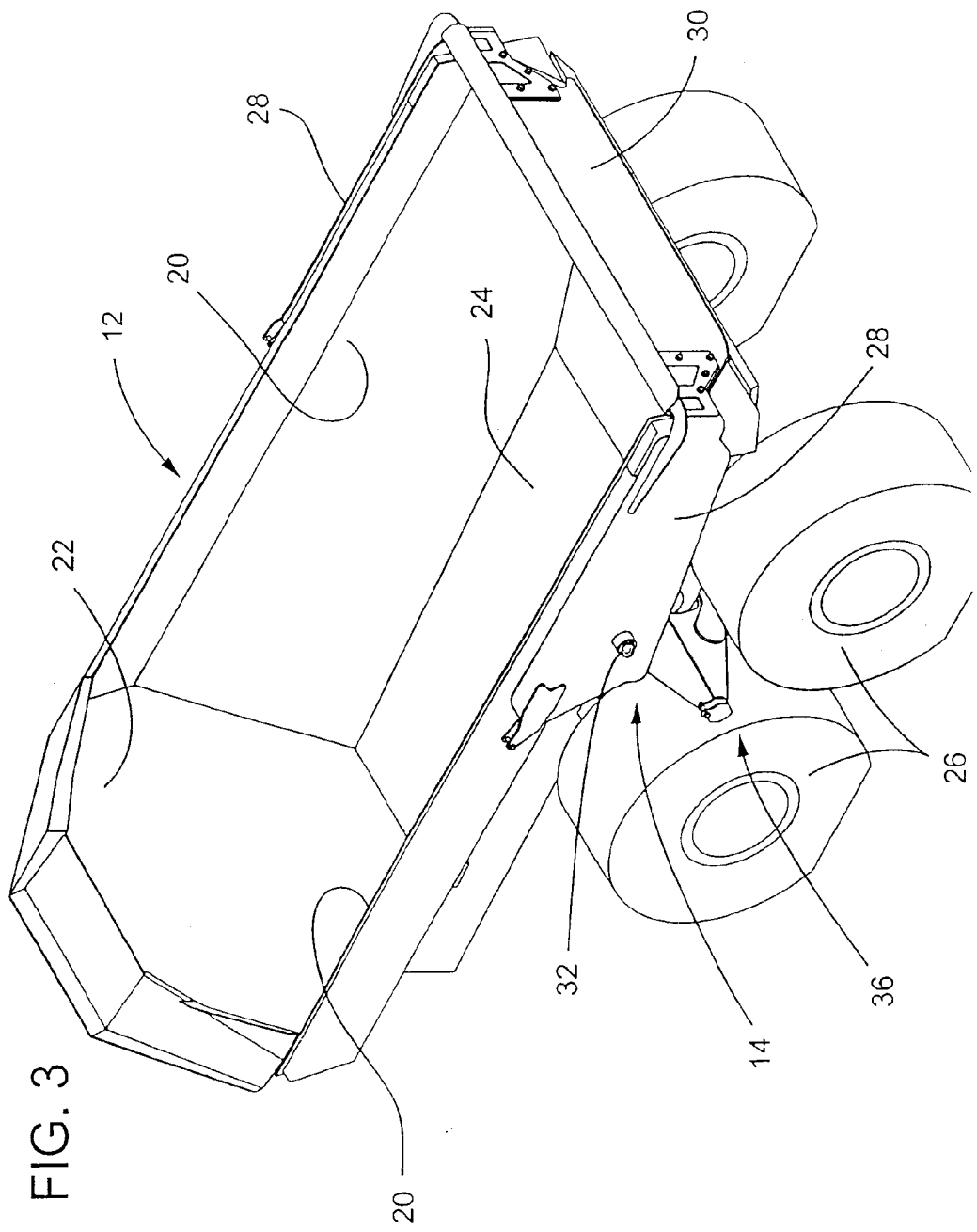
FIG. 3 is a perspective view of the rear portion of the articulated truck of FIG. 1.

Referring now more particularly to FIGS. 1–3, an exemplary heavy-duty, off-road articulated truck 10 having a dump body 12 and tailgate assembly 14 constructed in accordance with the teachings of the present invention is shown. The illustrated articulated truck has a front portion, which includes the truck cab, and a rear portion, which includes the dump body 12 and tailgate assembly 14. The truck 10 is generally symmetrical about its longitudinal axis and includes a frame 16 which is supported on a plurality of tires 26 and to which the dump body 12 is attached for pivotal movement about an axis between a lowered position (FIG. 1) for receiving and transporting a load of material and a raised position (FIG. 2) for dumping the load. In the illustrated embodiment, the dump body 12 is moved between the lowered and raised positions by actuation of a hydraulic dump cylinder 18 carried on the frame 16 of the truck 10.

The dump body 12 is generally constructed of steel panels which define the shape of the dump body and beams which form the structural framework for the dump body. In this case, the dump body 12 generally comprises a pair of opposing sidewalls 20, a front wall 22 and a floor 24. The illustrated tailgate assembly includes a pair of laterally spaced, parallel sidearms 28 between which a center-rear portion 30 of the tailgate is supported. Each sidearm 28 is pivotally connected to a respective one of the sidewalls 20 of the dump body 12 by a pivot pin 32 so as to allow the sidearms to rotate relative to the dump body 12 between a closed position (FIG. 1) and an open position (FIG. 2). In the closed position, the tailgate assembly 14 is in a lowered position with the center-rear portion 30 of the tailgate extending between the opposing sidewalls 20 and closing off the rear end of the dump body 12 as shown in FIG. 1. With the rear end of the dump body 12 closed off, the volumetric capacity of the dump body is increased for more efficient hauling of material. In the open position, the center-rear portion 30 of the tailgate assembly is pivoted upward relative to the rear end of the dump body 12 so as to allow material to be dumped from the rear of the dump body 12 as shown in FIG. 2.

For rotating the tailgate assembly 14 between the closed (FIG. 1) and open (FIG. 2) positions, the tailgate assembly 14 includes an actuating assembly. The actuation assembly comprises, in this instance, a cable or chain 34 that is connected at one end to the sidearm 28 and at the opposing end to an outrigger assembly 36 that, in turn, is connected to the truck frame 16. The chain 34 produces a torque on the tailgate assembly 14 that rotates the tailgate assembly between the closed and open positions as the hydraulic dump cylinder 18 pivots the dump body 12 between the raised and lowered positions.

Figure 5:
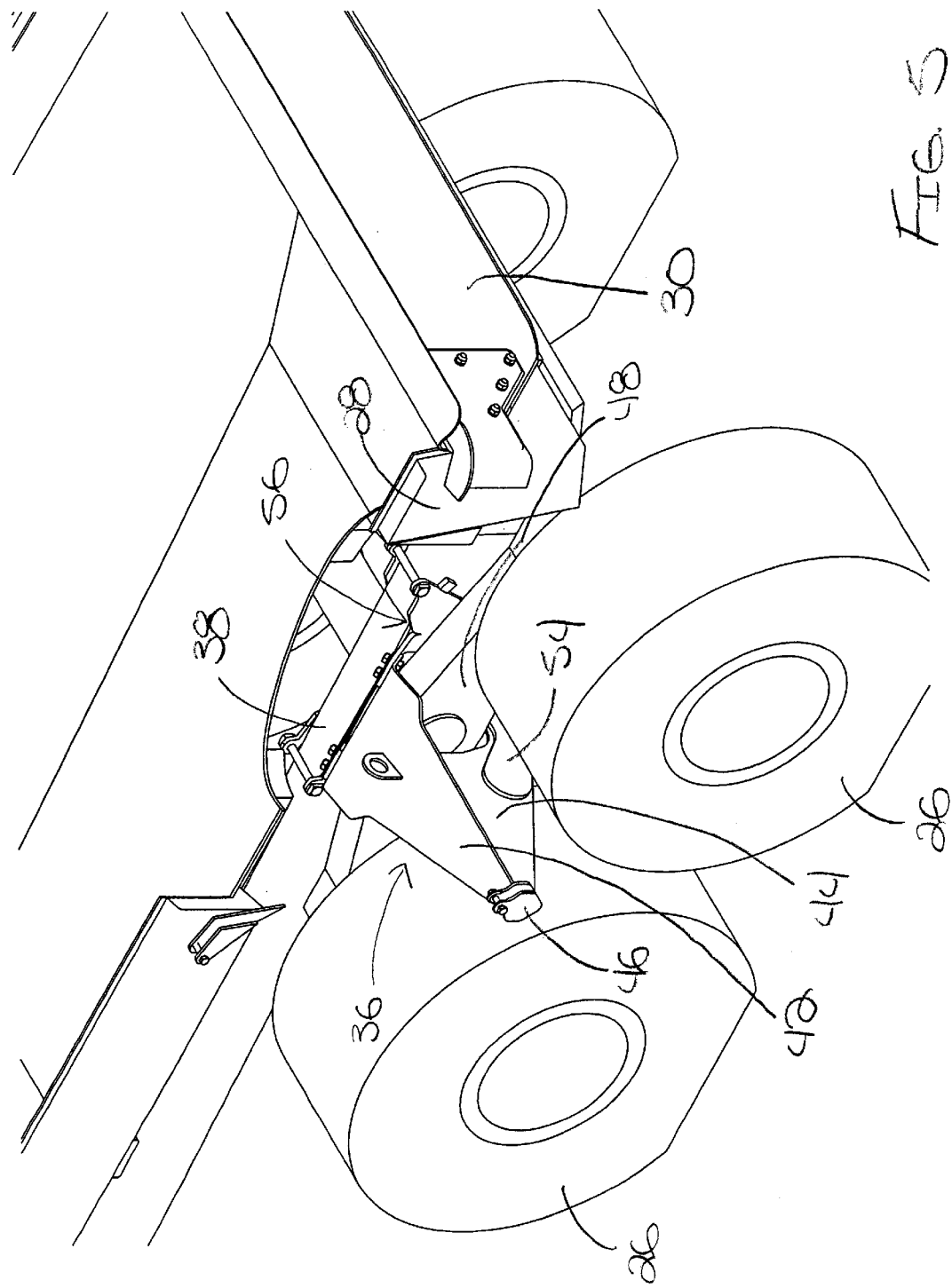
FIG. 5 is an enlarged partially cut away perspective view of the rear portion of the articulated truck of FIG. 1 showing the outrigger assembly.
Figure 4:
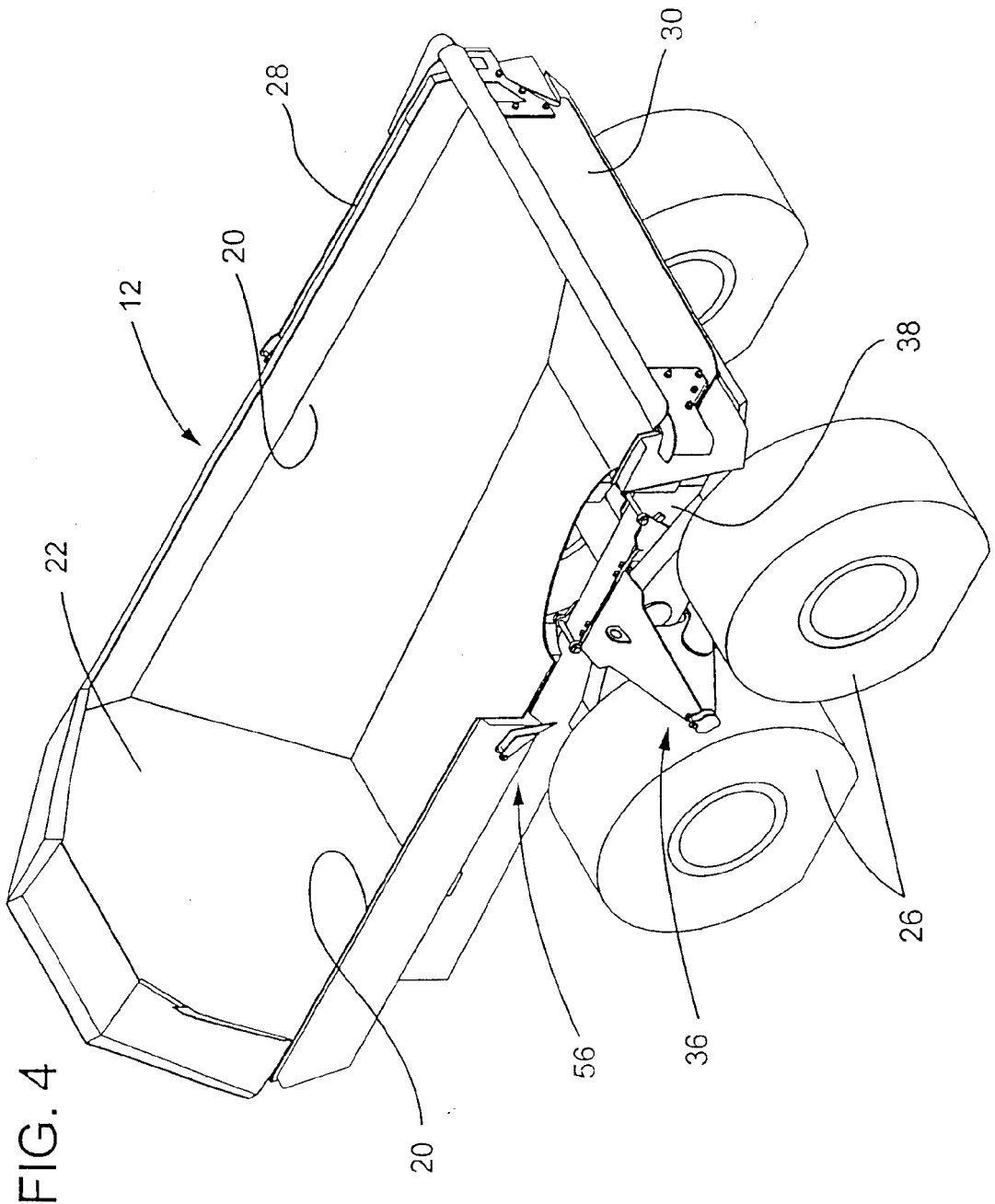
FIG. 4 is a partially cut away perspective view of the rear portion of the articulated truck of FIG. 1 showing the outrigger assembly.
Figure 5:
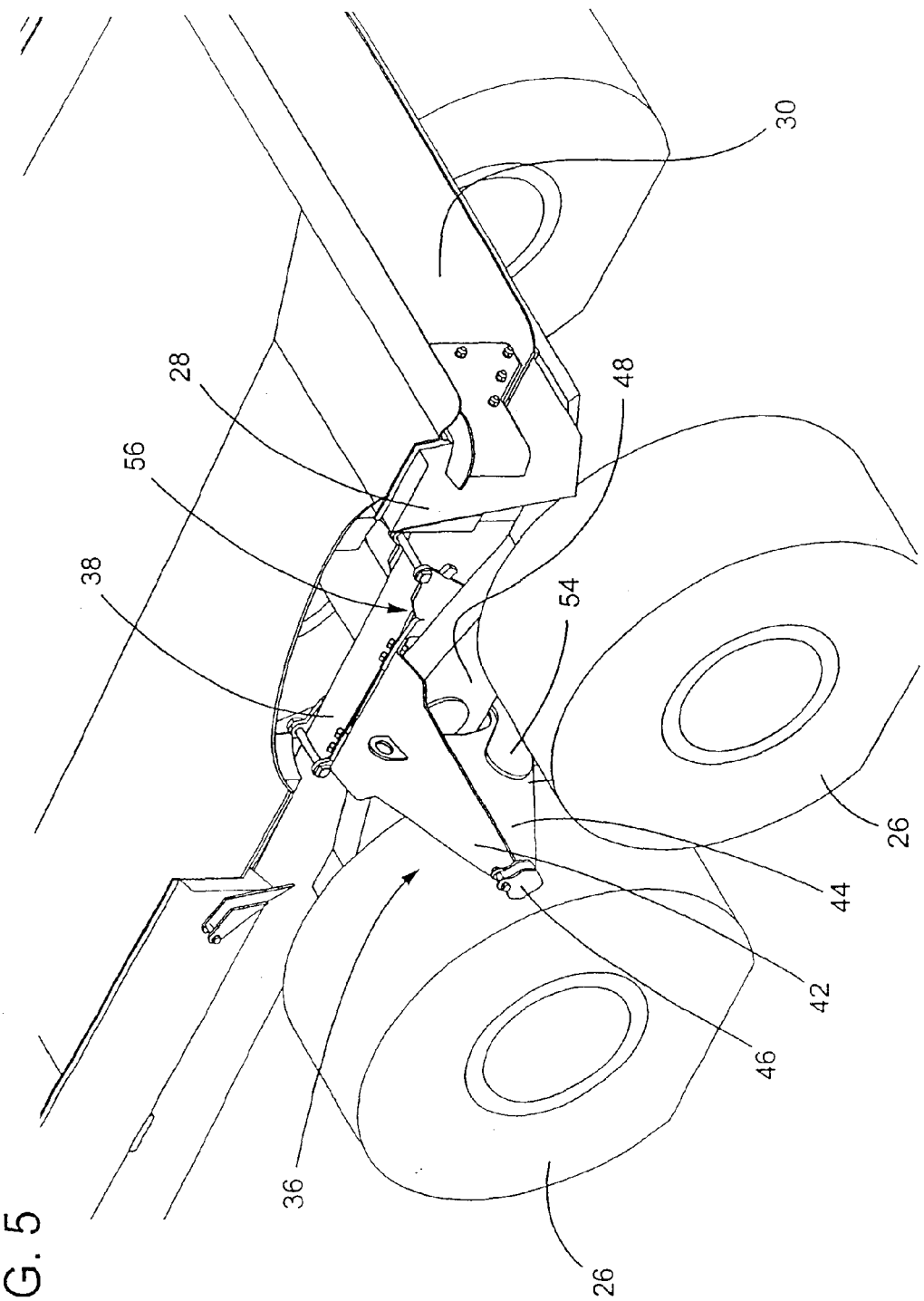
Figure 6:
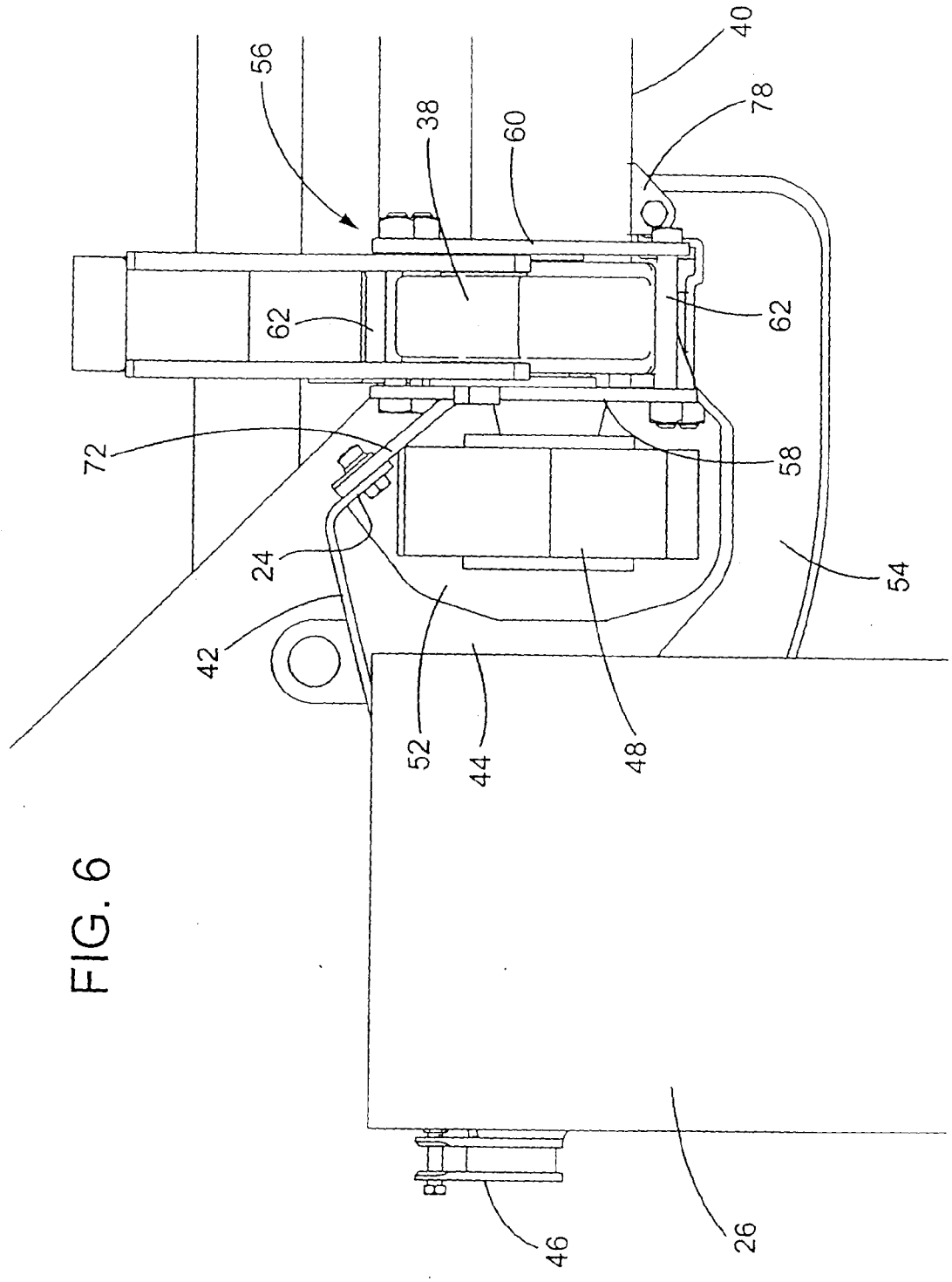
FIG. 6 is an enlarged end view of the outrigger assembly.
Figure 7:
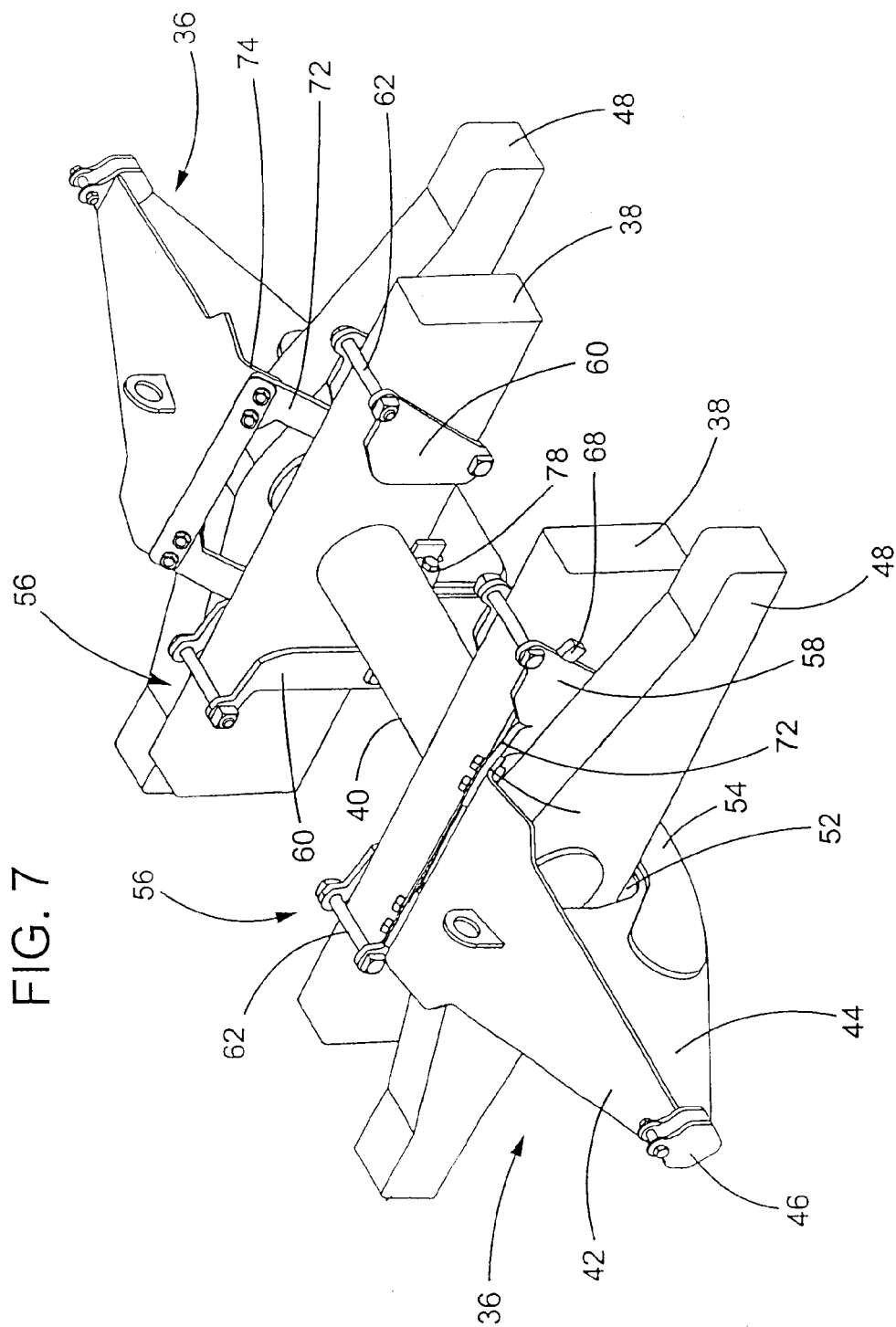
FIG. 7 is a perspective view of the two outrigger assemblies on the articulated truck of FIG. 1.

In the illustrated embodiment, the frame 16 of the rear portion of the truck 10 includes a pair of parallel longitudinally extending box-section frame members 38 with each outrigger assembly 36 being secured to a respective one of the frame members (see, e.g., FIGS. 4, 5, and 7). The two longitudinal frame members 38 are connected together by a cylindrical cross-member 40 as shown in FIG. 7. For ease of reference herein, the present invention will only be described in connection with one of the two outrigger assemblies 36 that are provided. However, it will be appreciated that in the illustrated embodiment of the present invention identical outrigger assemblies are provided on each side of the truck. As illustrated in FIGS. 5, 6 and 7, the outrigger assembly 36 comprises, in this case, an upper horizontal plate 42 and a lower vertical plate 44 that extends downwardly from the horizontal plate 42. To facilitate connection of the outrigger assembly 36 to the chain 34 (FIGS. 1 and 2), a clevis 46 is arranged at a free or outer end of the outrigger assembly 36. When the outrigger assembly 36 is attached to the truck frame 16, the clevis 46 is arranged outboard of the sidewalls 20 of the truck body 12. This prevents the chain 34 from being damaged by or causing damage to the sidewall 20 of the body 12.

To accommodate other components of the truck 10, the outrigger assembly 36 can be configured to include an opening or passage, which in effect allows the outrigger assembly 36 to extend or wrap around the other truck components. In the embodiment illustrated in FIGS. 4–8, the outrigger assembly is configured to wrap around a walking beam 48 which is arranged outward of the longitudinal frame member 38 and extends generally parallel thereto. The walking beam 48 is pivotably supported on a trunnion 50 (see FIG. 8) which extends outward from the longitudinal frame member 38. To accommodate the walking beam 48, the inner end of the vertical plate 44 of the outrigger assembly 36 has an opening or a cutout 52 through which the walking beam 48 extends when the outrigger assembly 36 is mounted to the longitudinal frame member 38 as shown in FIGS. 5–7. With this arrangement, the horizontal plate 42 of the outrigger assembly 36 extends over the walking beam 48 to reach the longitudinal frame member while a lower arm portion 54 of the vertical plate 44 of the outrigger assembly extends beneath the walking beam 48 to reach the longitudinal frame member. The lower arm portion 54 of the vertical plate 44 can be integral with the remainder of the vertical plate 44 or comprise a separate member which is attached to the remainder of the vertical plate 44 by, for example, welding, bolts or a pin (see, e.g., FIGS. 18–21). In the embodiment illustrated in FIGS. 4–8, braces are provided on the lower arm portion 54 of the vertical plate 44 to provide additional strength and stability.

Each of the outrigger assemblies 36 includes an associated mounting assembly 56 that allows the outrigger assembly to be connected to the frame 16 of the truck 10 relatively quickly and easily as compared to when a conventional welding operation is used to secure the outrigger assembly. In contrast to welding to the frame, the mounting assembly 56 is configured for fastening around the frame 16 of the truck 10. Specifically, the mounting assembly 56 includes at least one mounting member 58 and at least one clamp member 60 that are interconnectable by one or more fasteners 62 so as to clamp the frame 16 therebetween and thereby secure the outrigger assembly 36 to the frame. The mounting assembly 56 of the present invention eliminates the need for extensive and time-consuming welding operations in connection with attaching the outrigger assemblies 36 to the truck frame 16. As will be appreciated, this is a significant advantage particularly in situations where limited space is available in the area around the frame for the manipulation of welding equipment. Moreover, in contrast to welding, the mounting assembly 56 of the present invention also provides a consistently strong and solid anchor for the outrigger assembly 36.

Figure 8:
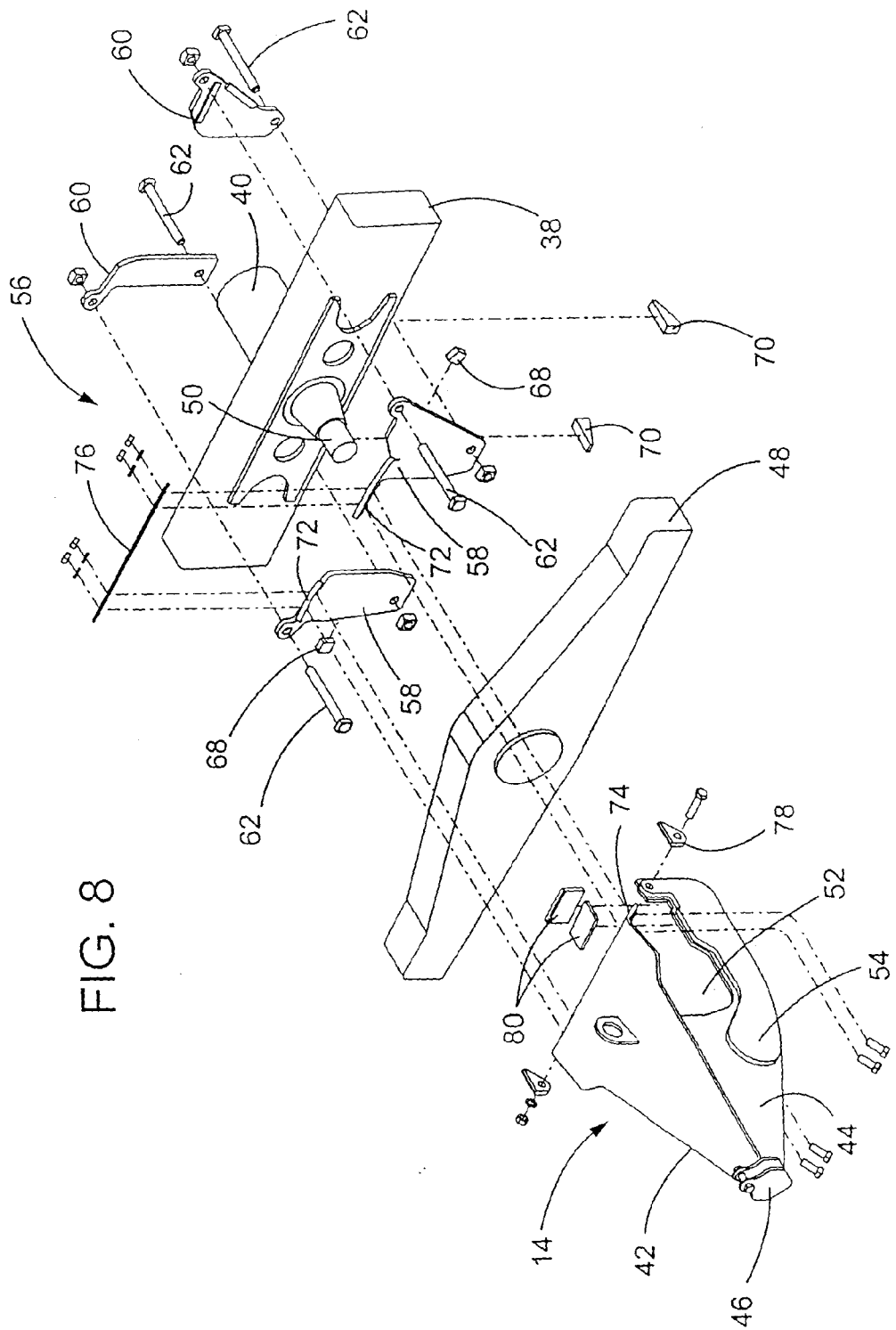
FIG. 8 is an exploded perspective view of the truck frame and outrigger assembly on one side of the articulated truck of FIG. 1.

In the illustrated embodiments, the mounting member 58 engages an outer side of one of the longitudinal frame members 38 and the clamp member 60 engages an opposing inner surface of the longitudinal frame member. The mounting member 58 and clamp member 60 are interconnected by a plurality of fasteners 62 at least one of which extends over the longitudinal frame member 38 and at least one of which extends under the longitudinal frame member 38. In this case, the mounting assembly 56 includes four fasteners 62 with two extending above and two extending below the longitudinal frame member 38. The illustrated fasteners 62 are nuts and bolts, however, it will be appreciated that other fasteners could be used such as pins that are secured with keys. Both the mounting member 58 and the clamp member 60 can be divided into multiple components. For example as shown in FIGS. 7–8, the mounting member 58 can be divided into front and rear mounting plates or members 58. With such an arrangement, the front mounting member 58 is positioned forward of the trunnion 50 on which the walking beam 48 is mounted and the rear mounting member 58, in turn, is positioned to the rear of the trunnion 50. In the FIGS. 4–8 embodiment, the clamp member 60 is also divided into front and rear clamp plates or members that are arranged on either side of the frame cross-member 40. Various embodiments in which the mounting member 58 and the clamping member 60 each consist of a single component are shown in FIGS. 9–27 (described in greater detail below). As used herein, the term "member" refers to both a single element and a plurality of elements.

To assist in the proper placement of the mount members 58 and clamp members 60 relative to each other and the longitudinal frame member 38, stop blocks 68 can be provided. For example, as shown in FIGS. 7–8, stop blocks 68 can be welded onto the outer side of the longitudinal frame member to help ensure that the two mounting members 58 are properly positioned relative to each other. Stops blocks 70 that engage the lower side of the longitudinal frame member 38 can also be provided adjacent the lower edge of the mounting members 58 and/or the clamp members 60. In the embodiment illustrated in FIGS. 4–8, such a stop block 70 is provided adjacent the lower edge of both the front clamp member 60 and the rear mounting member 58.

To allow for connection to the horizontal plate 42 of the outrigger assembly 36, each of the mounting members 58 has an outwardly extending portion 72 at its respective upper end. The outwardly extending portion 72 of each mounting member 58 is engageable with, in this case, a generally downwardly extending portion 74 at the inner end of the horizontal plate 42 (see FIGS. 6–8). When the outrigger assembly 36 is assembled, the downwardly extending portion 74 of the horizontal plate 42 overlaps the outwardly extending portions 72 of the mounting members 58 to permit connection of the horizontal plate to the mounting members. In the embodiment illustrated in FIGS. 4–8, the connection is established by a plurality of bolts that extend through the downwardly extending portion 74 of the horizontal plate 42 and the outwardly extending portions of the mounting members 58. A washer plate 76 can be provided in order to facilitate this connection. Of course, it will be appreciated that other methods can be used to secure the horizontal plate 42 of the outrigger assembly 36 to the mounting members 58 including welding or a pinned connection (see, e.g. FIGS. 9–10).

In the embodiment illustrated in FIGS. 4–8, the mounting assembly 56 further includes a mounting ear 78 that can be used to secure the lower arm portion 54 of the vertical plate 44 of the outrigger assembly to the truck frame. The mounting ear 78 can be secured to the bottom of the cross-member 40 of the frame (see FIG. 6) in order to provide a structure to which the lower arm portion 54 of the vertical plate 44 can be connected by a fastener such as a bolt or pin. In this case, frame spacer pads 80 (see FIG. 8) are also provided on the lower arm 54 of the vertical plate 44 and are positioned to space the lower arm 54 away from the longitudinal frame member 38 and protect the lower and inner sides of the longitudinal frame member 38. As will be appreciated from the following description of the embodiments shown in FIGS. 9–27, the mounting assembly 56 could be configured such that the lower arm 54 of the vertical plate 44 can be connected to the clamp member 60 thereby eliminating the need for securing the mounting ear directly to the frame. It will also appreciated that other methods may be employed to generally connect the mounting assembly 56 to the remainder of the outrigger assembly 36.

Figure 9:
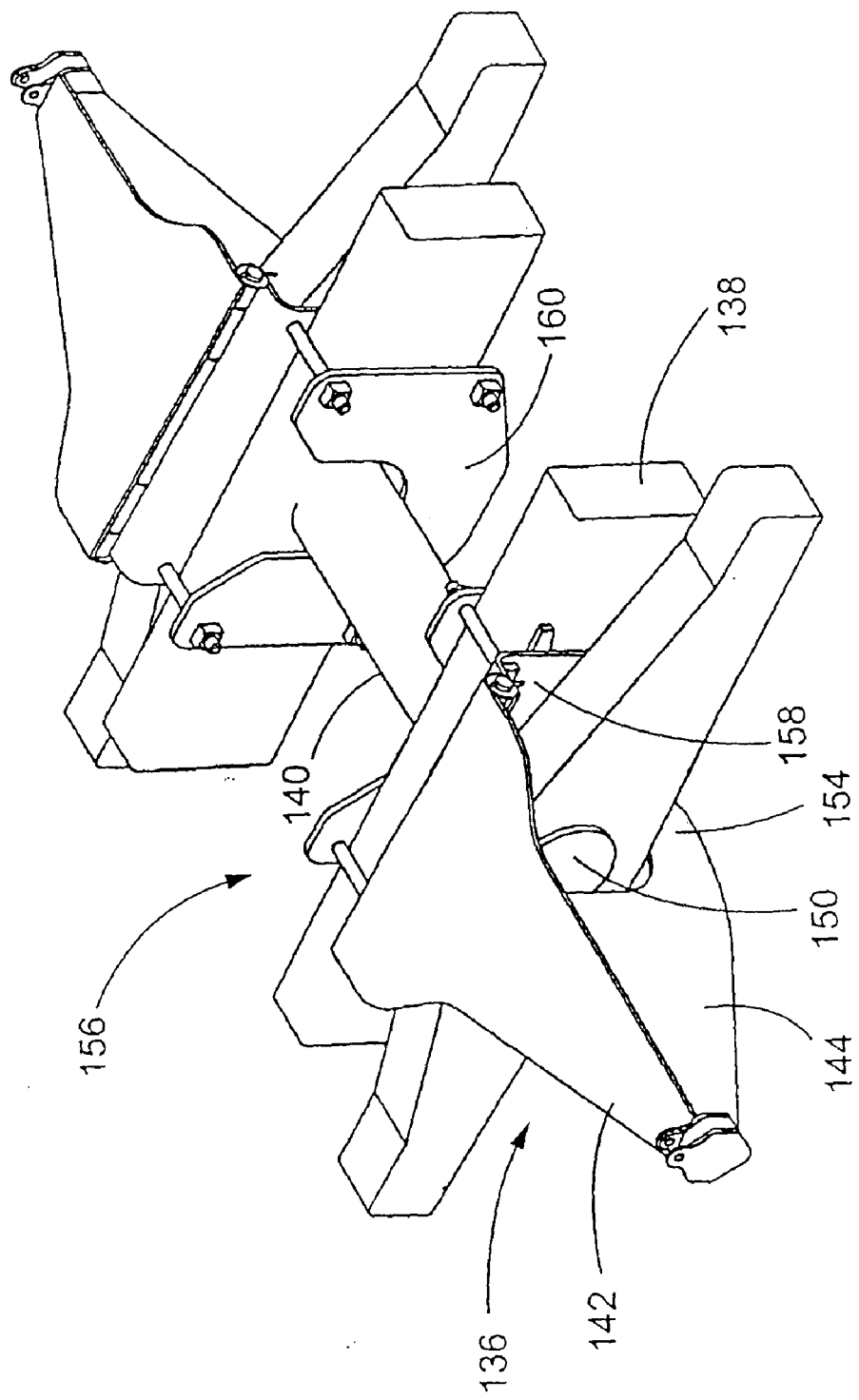
FIG. 9 is a perspective view of an alternative embodiment of an outrigger assembly according to the present invention.
Figure 10:
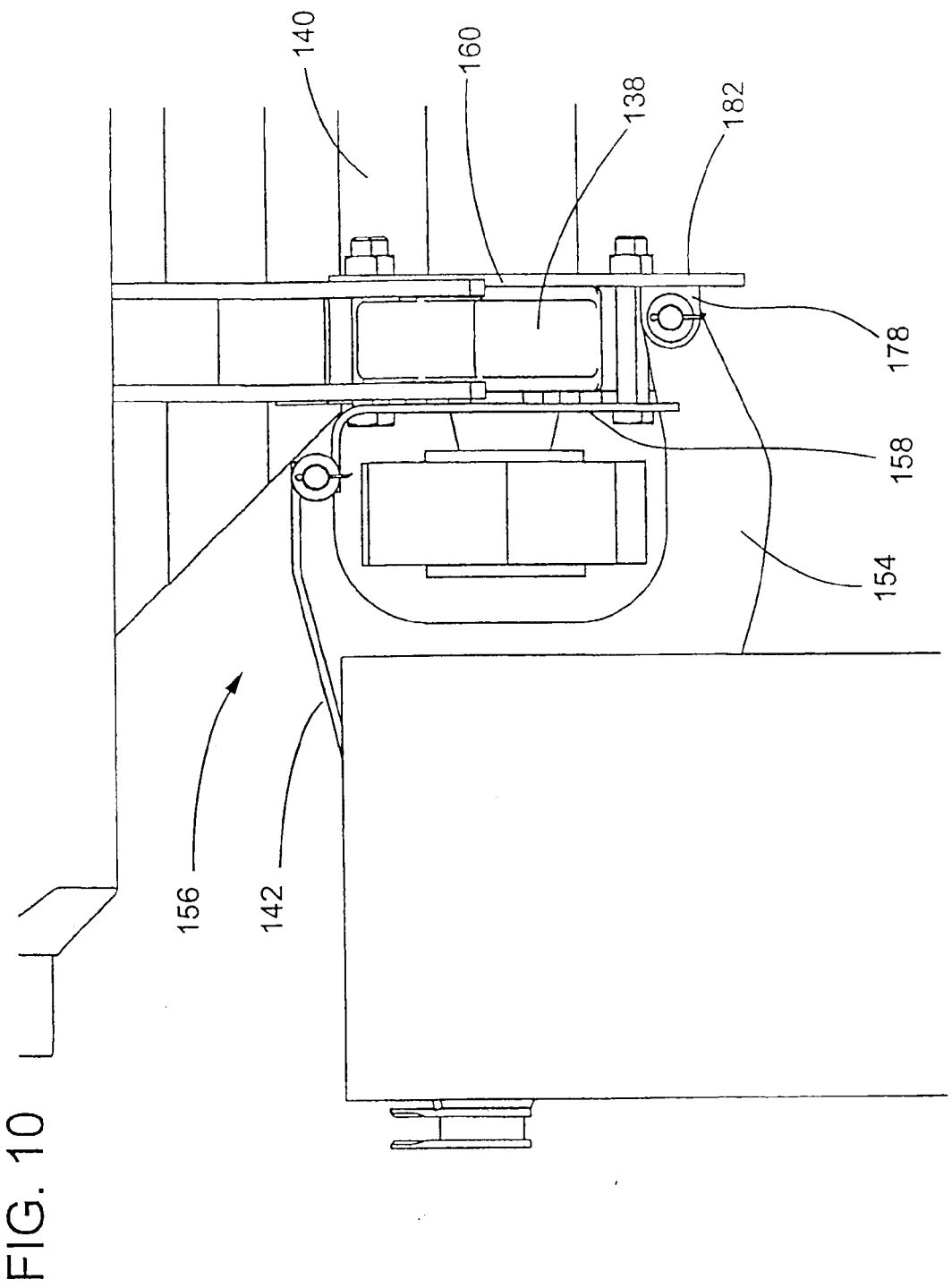
FIG. 10 is an enlarged end view of the outrigger assembly of FIG. 9.
Figure 11:
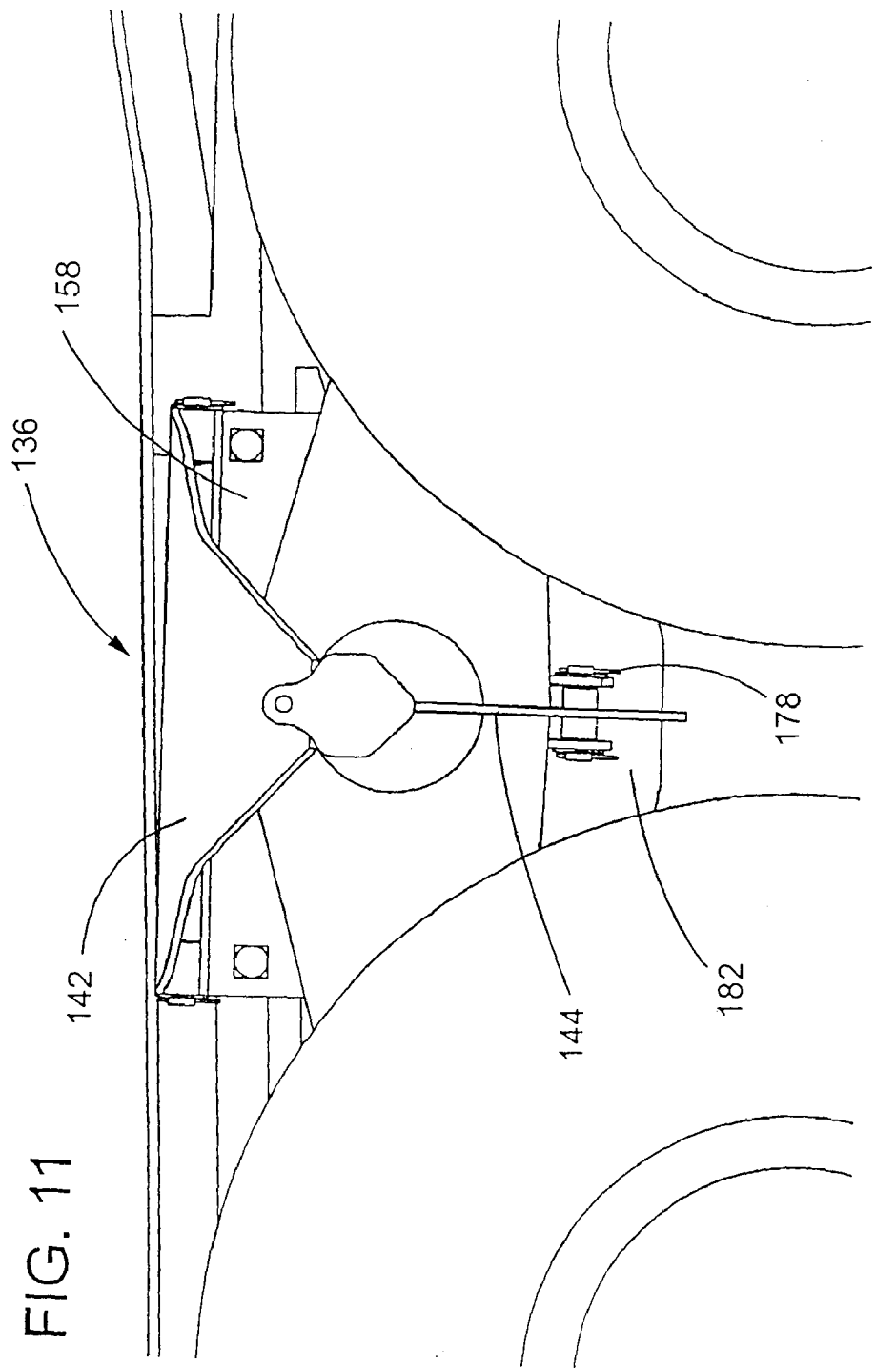
FIG. 11 is an enlarged side view of the outrigger assembly of FIG. 9.

An alternative embodiment of an outrigger assembly constructed in accordance with the present invention is shown in FIGS. 9–11. With the various alternative embodiments discussed herein, like reference numbers in the 100 series, 200 series, 300 series, etc. are used to designate similar components. As with the embodiment of the invention shown in FIGS. 4–8, this alternative embodiment of the outrigger assembly 136 includes a mounting assembly 156 that fastens around the longitudinal frame member 138 of the truck. The FIGS. 9–11 embodiment, however, utilizes one-piece mounting and clamp members 158, 160. In particular, the mounting and clamp members 158, 160 have generally U-shaped configurations that allow them to engage the longitudinal frame member 138 while accommodating the trunnion 150 and frame cross-member 140 (note that the one-piece mounting member is best shown in the similar FIGS. 12–13 embodiment). Moreover, the inner edge of the horizontal plate 142 of the outrigger assembly 136 is connected to the mounting member 158 via a pin and cotter key arrangement. Likewise, the lower arm 154 of the vertical plate 144 of the outrigger assembly 136 connects via a pin and cotter key arrangement to a mounting ear 178 that is supported on a vertical portion 182 of the clamp plate 160 that extends below the longitudinal frame member 138 (see, e.g., FIG. 10) as opposed to on the truck frame as illustrated in FIG. 6.

Figure 12:
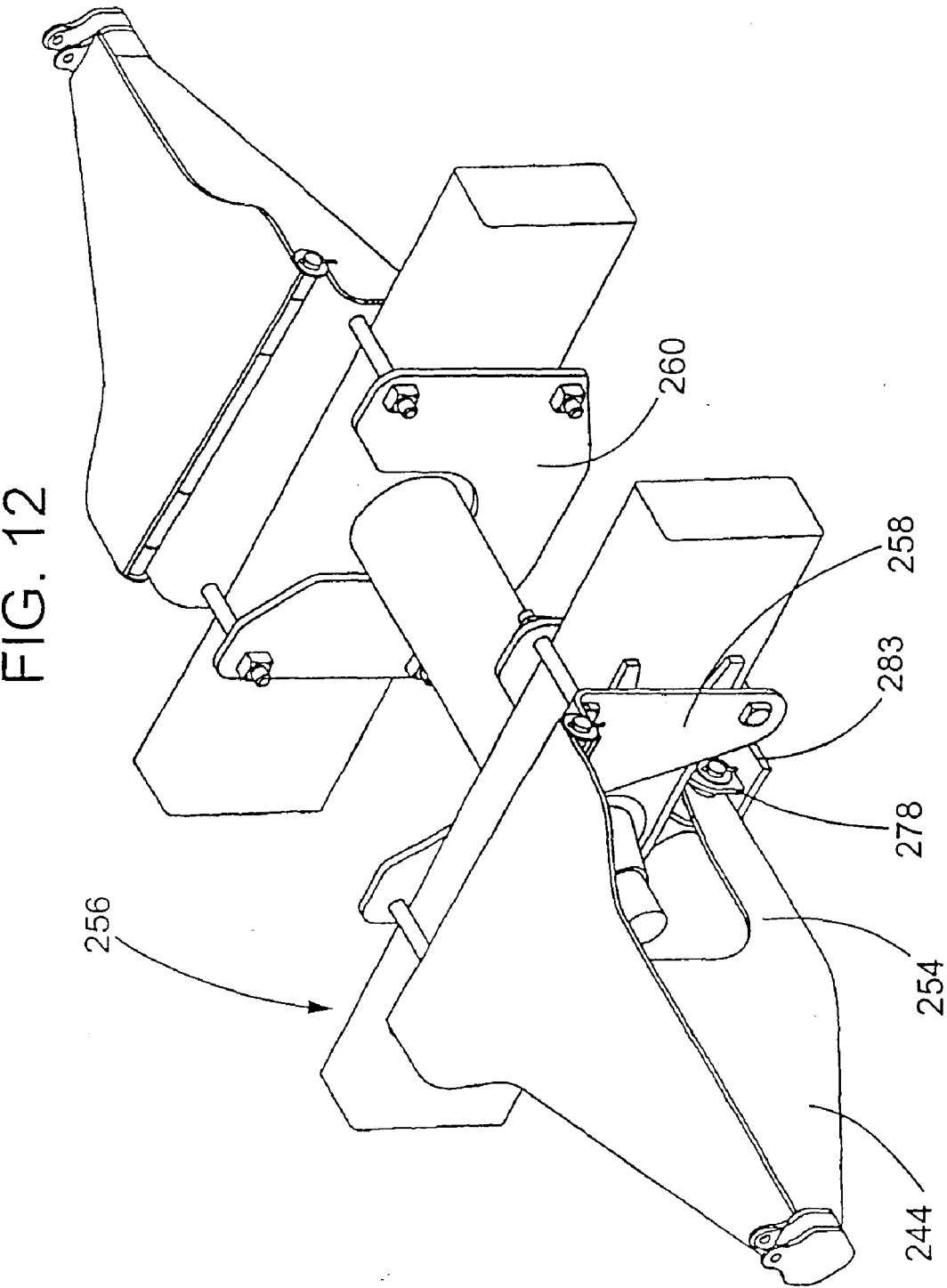
FIG. 12 is a perspective view of another alternative embodiment of an outrigger assembly according to the present invention.
Figure 13:
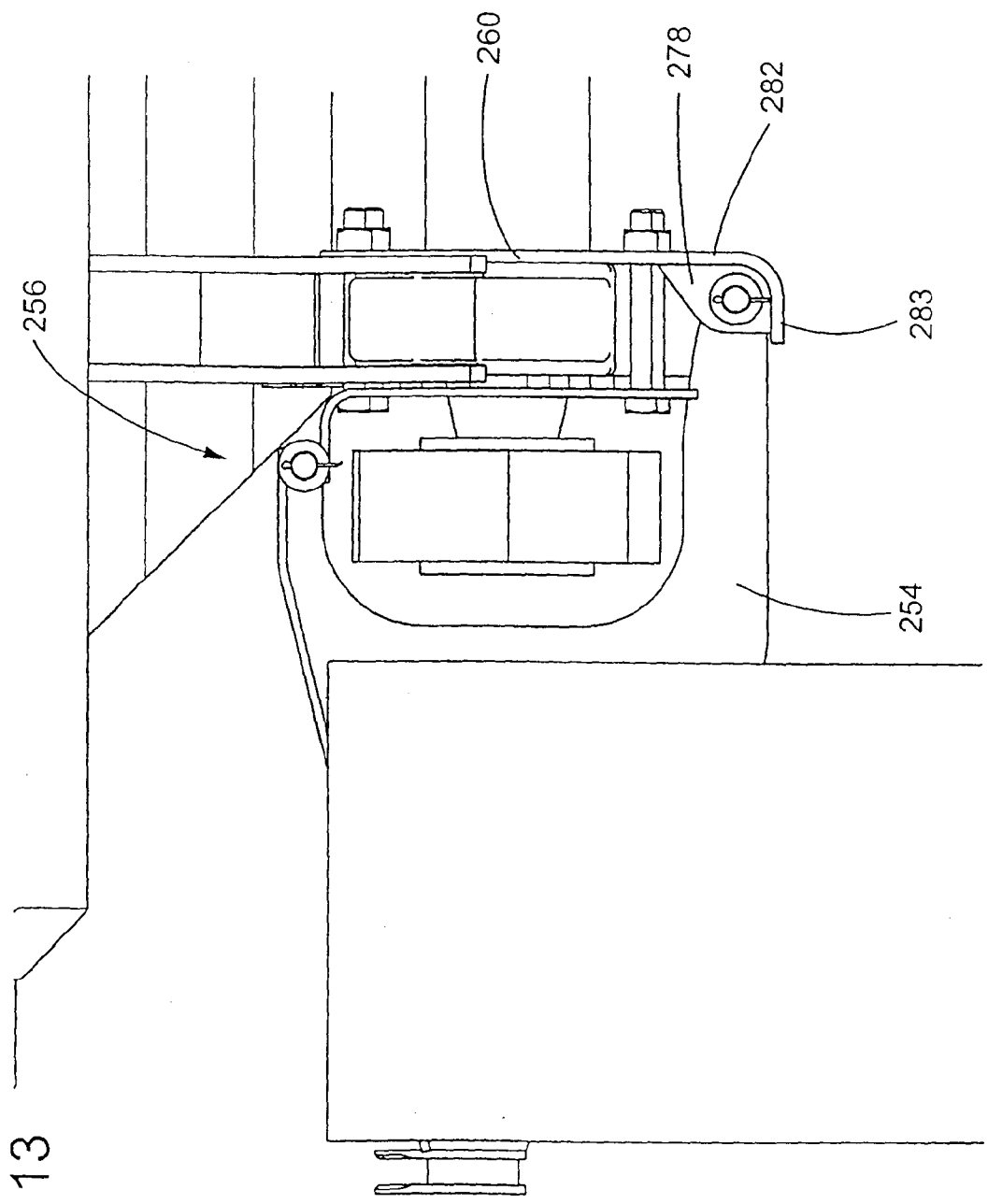
FIG. 13 is an enlarged end view of the outrigger assembly of FIG. 12.

The embodiment of the invention illustrated in FIGS. 12 and 13 is generally similar to the FIGS. 9–11 embodiment. However, in the FIGS. 12–13 embodiment, the clamp member 260 of the mounting assembly 256 has a bend at its lower end so as to provide a horizontal extension 283 that extends toward the lower arm 254 of the vertical plate 244 beneath the longitudinal frame member 238 in addition to the vertical extension 282. The mounting ear 278 that connects the lower arm 254 of the vertical plate 244 to the clamp member 260 is arranged in the bend so as to provide additional support for the mounting ear 278 in the vertical and horizontal directions (see FIG. 13).

Figure 14:
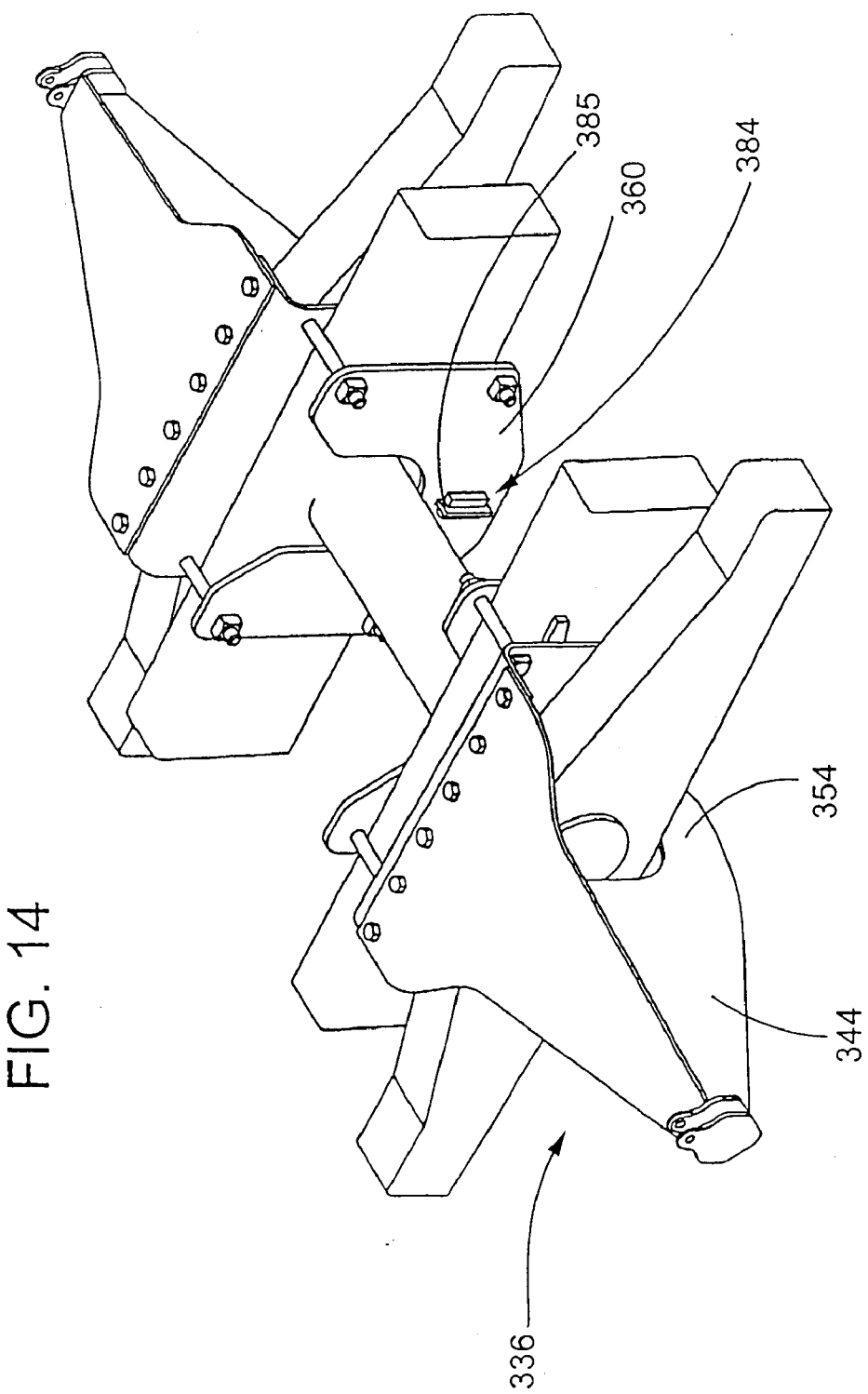
FIG. 14 is a perspective view of another alternative embodiment of an outrigger assembly according to the present invention.
Figure 15:
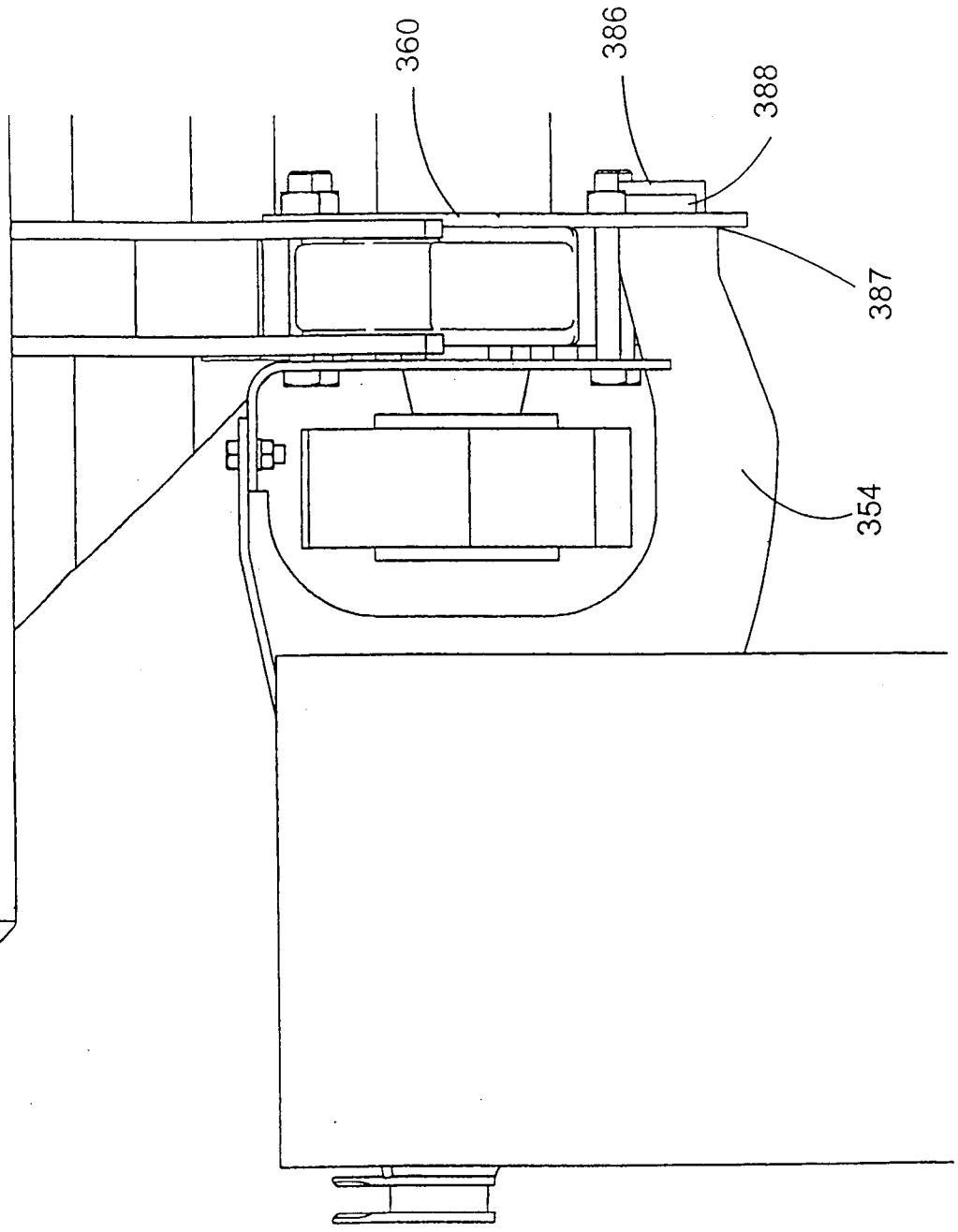
FIG. 15 is an enlarged end view of the outrigger assembly of FIG. 14.

A further alternative embodiment of the present invention is shown in FIGS. 14–15. In this embodiment, the lower arm 354 of the vertical plate 344 of the outrigger assembly 336 is attached to the clamp member 360 of the mounting assembly 356 by a slot-and-tab arrangement 384. In particular, a slot 385 is provided in the portion 382 of the clamp member 360 that extends below the longitudinal frame member 338. As best shown in FIG. 15, an end portion 386 of the lower arm 354 has a reduced cross-sectional area such that it is insertable in the slot 385 until a shoulder 387 defined by the transition to the end portion 386 of the lower arm engages the surface of the clamp member 360. The lower arm 354 can then be secured in place by attaching one or more tabs 388 to the portion of the lower arm 354 that extends past the opposing side of the clamp plate 360 such that the end portion 386 of the lower arm cannot be withdrawn from the slot 385.

Figure 17:
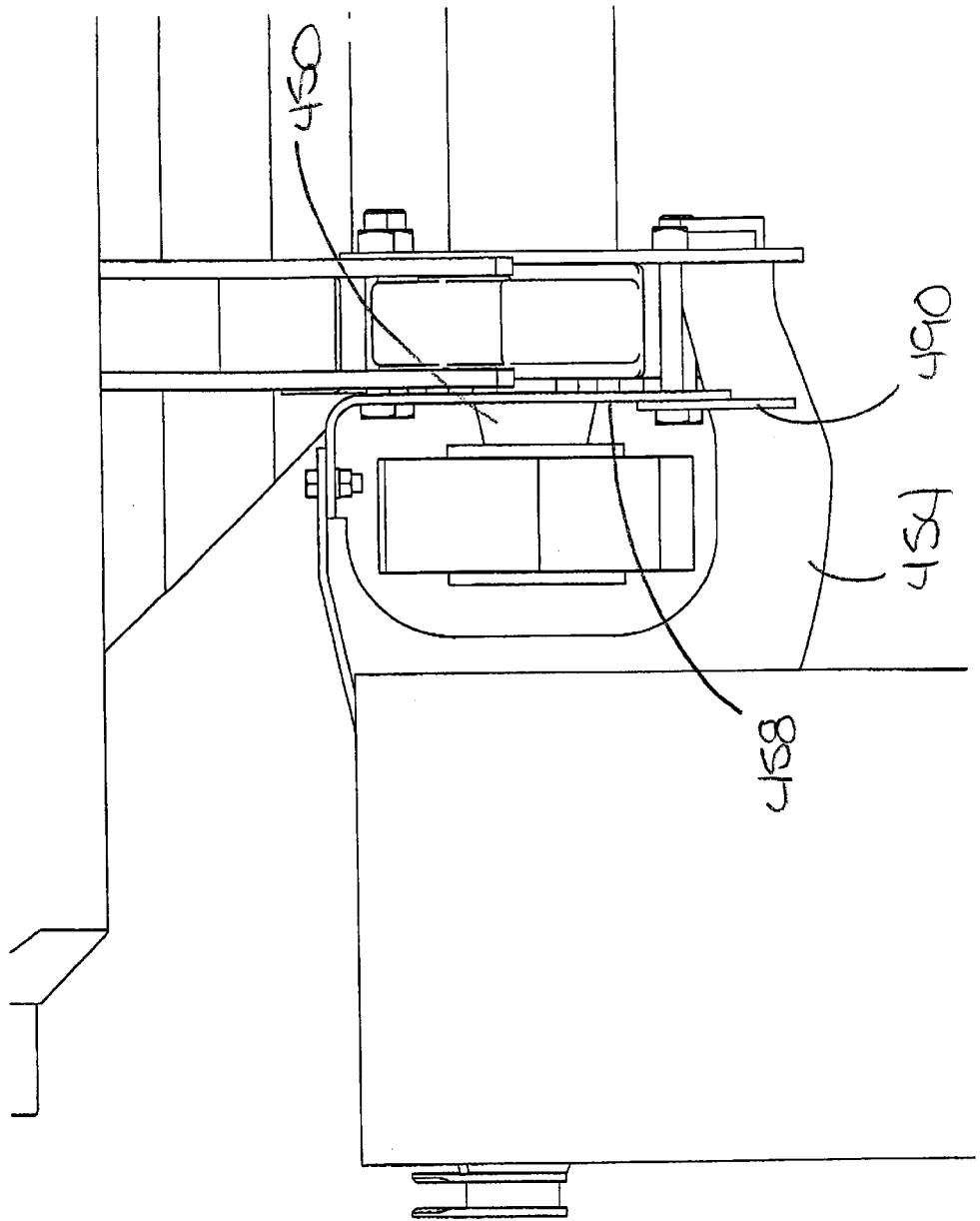
FIG. 17 is an enlarged side view of the outrigger assembly of FIG. 16.
Figure 16:
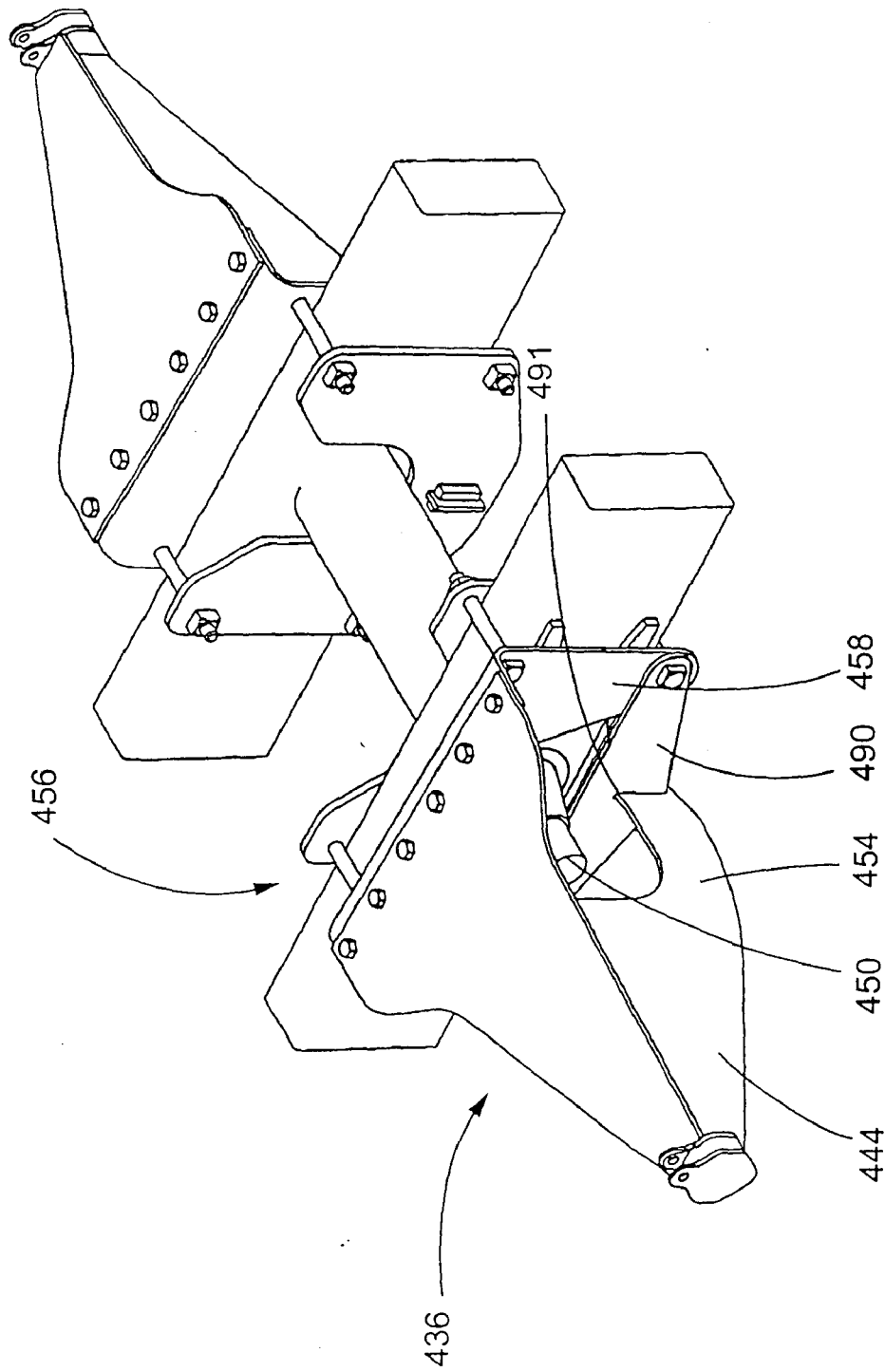
FIG. 16 is a perspective view of another alternative embodiment of an outrigger assembly according to the present invention.
Figure 17:
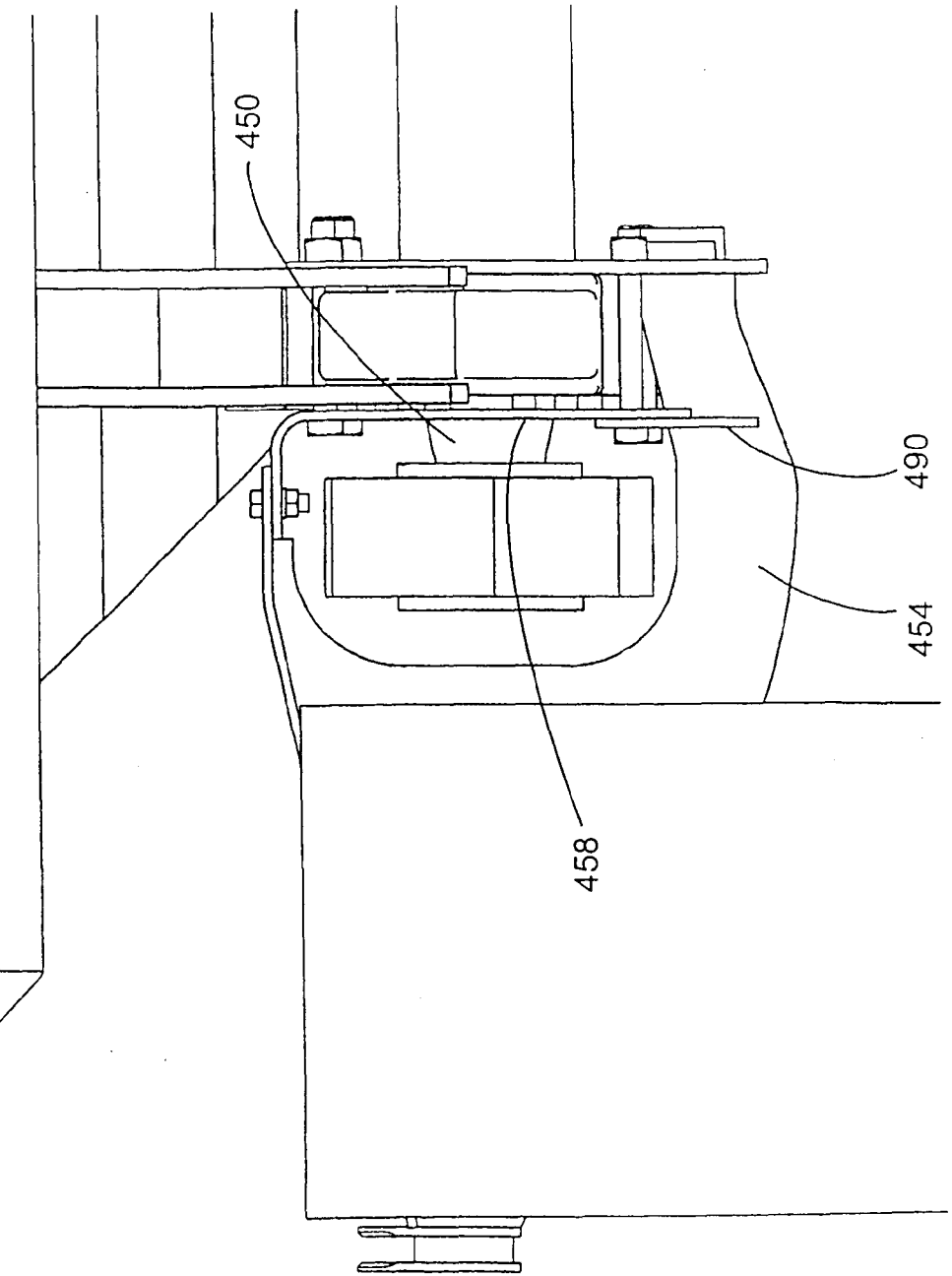
Figure 18:
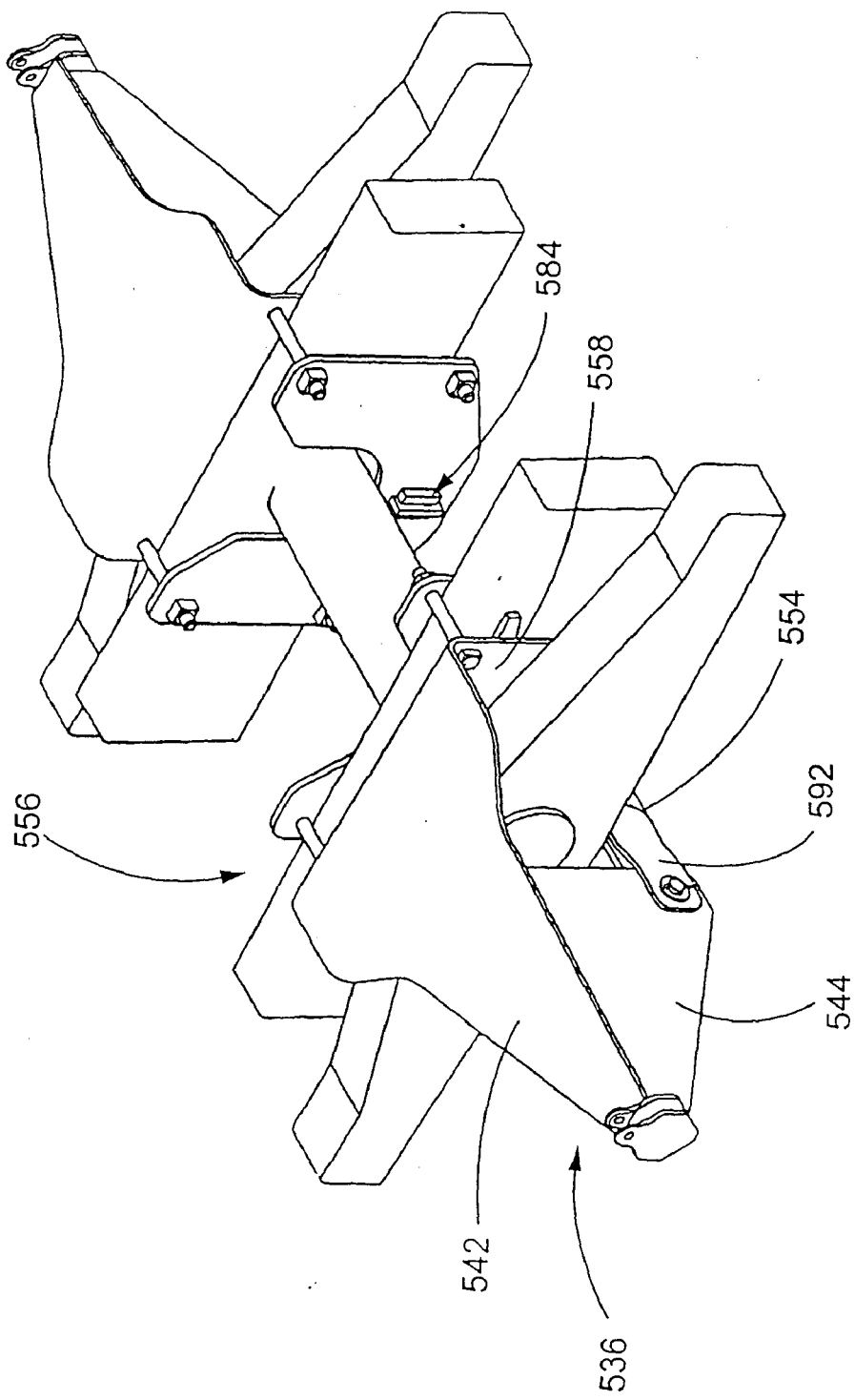

The embodiment of the invention illustrated in FIGS. 16 and 17 is similar to the FIGS. 14–15 embodiment except that the mounting assembly 456 includes a crosspiece 490 that provides additional stability to the mounting assembly 456 and the outrigger assembly 436. More specifically, the stabilizing crosspiece 490 is secured to the mounting member 458 such that it extends between the two legs of the mounting member beneath the trunnion 450. The crosspiece 490 has a slot 491 extending from its lower edge so that the crosspiece fits over the lower arm 454 of the vertical plate 444.

Figure 18:
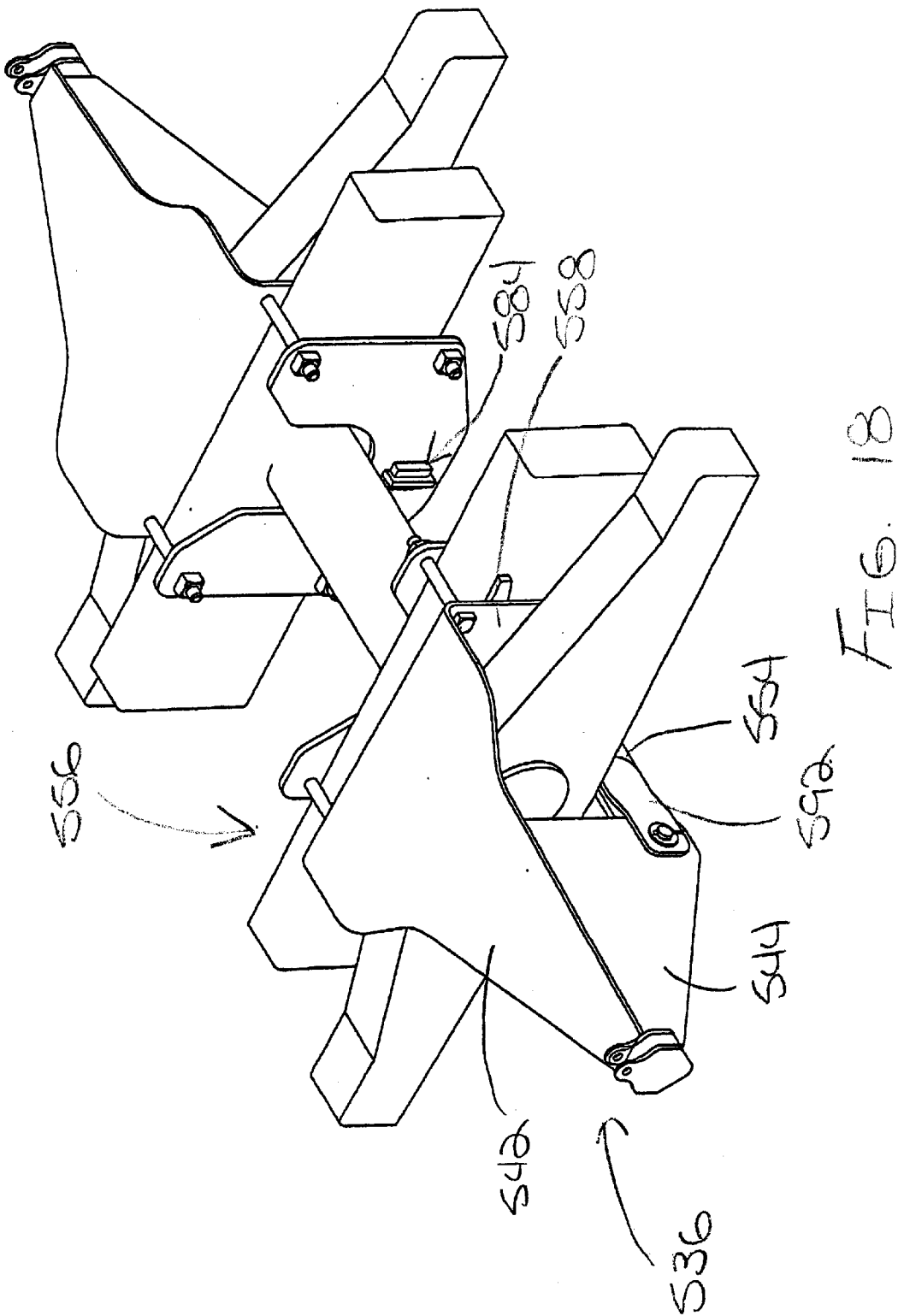
FIG. 18 is a perspective view of another alternative embodiment of an outrigger assembly according to the present invention.
Figure 81:
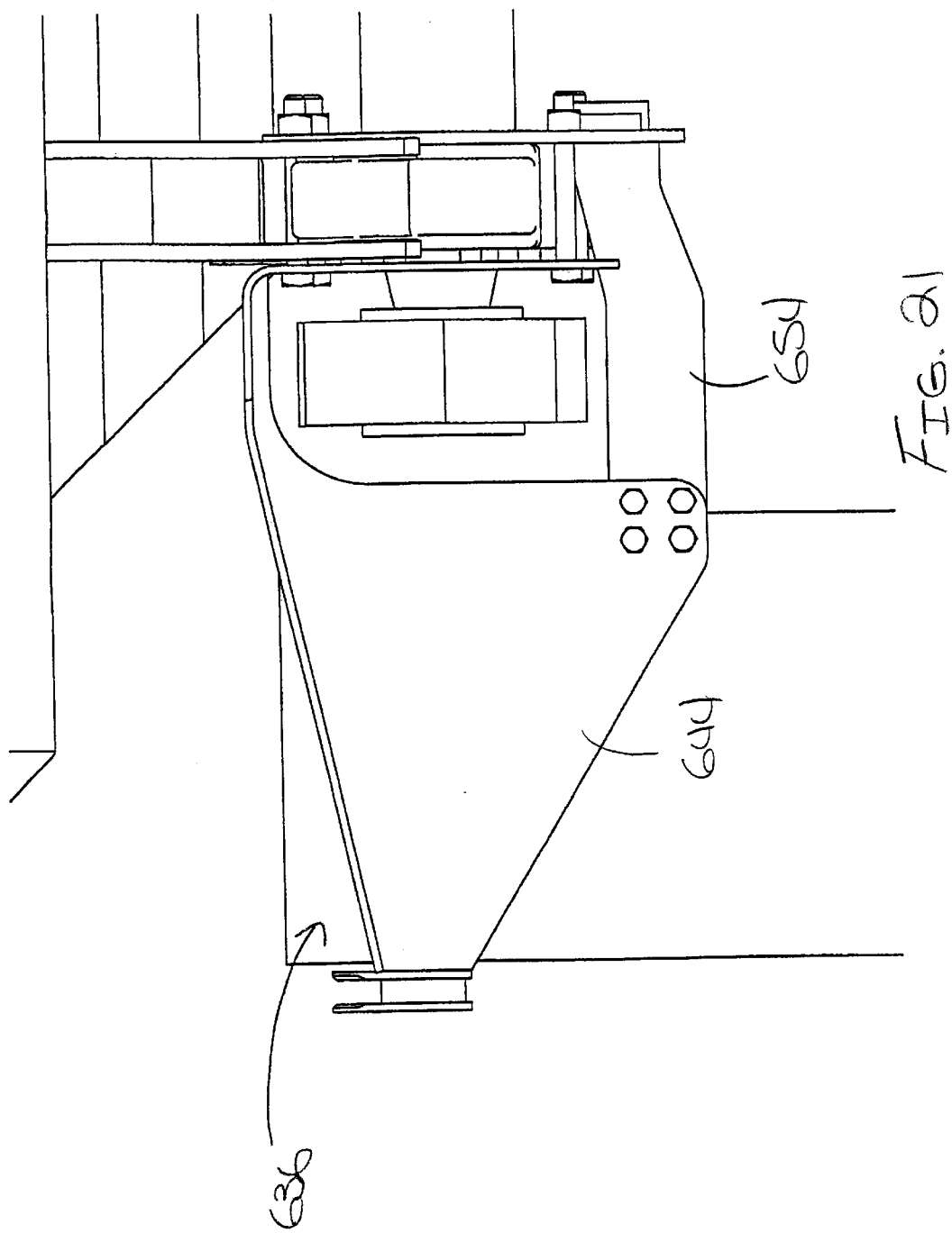
Figure 86:
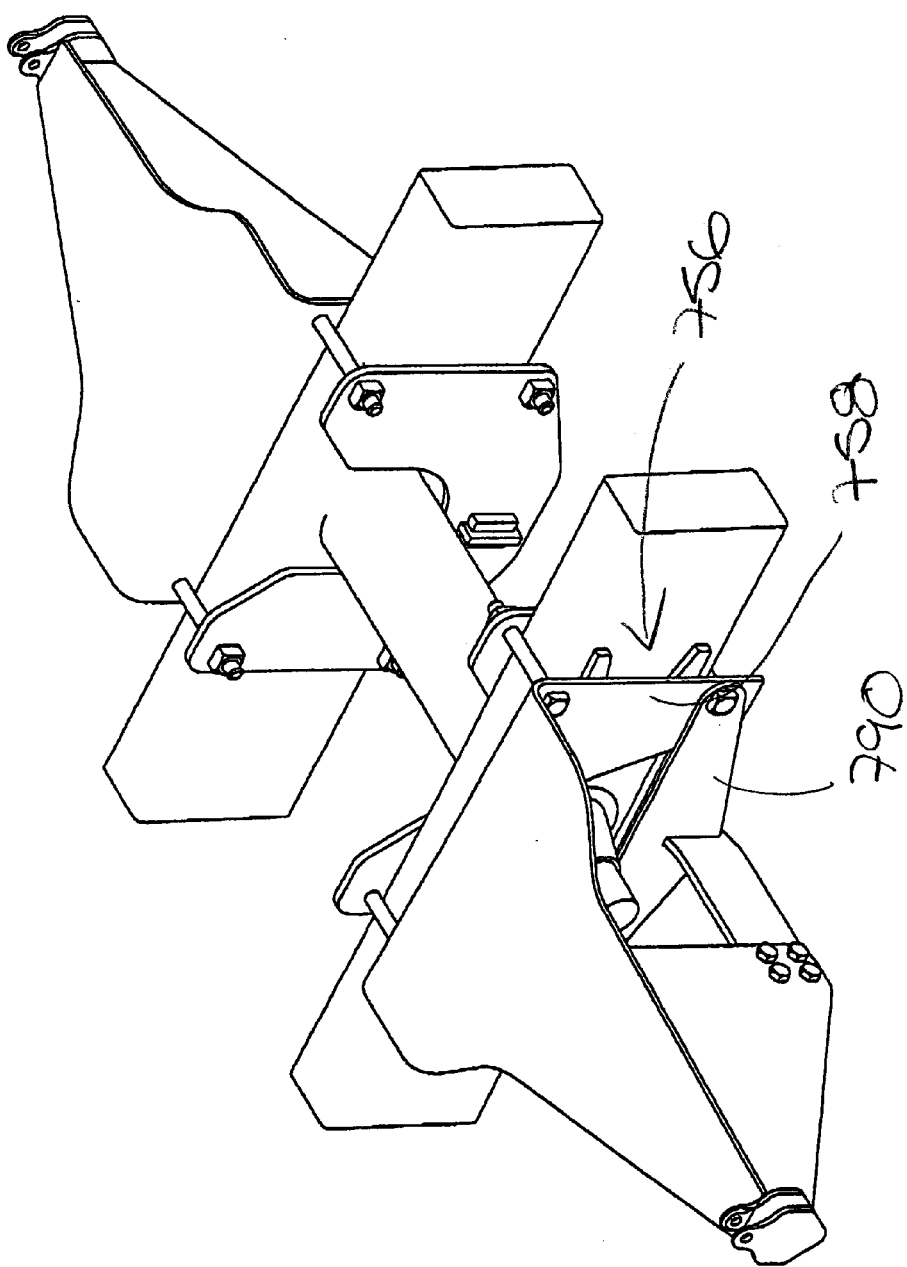
Figure 33:
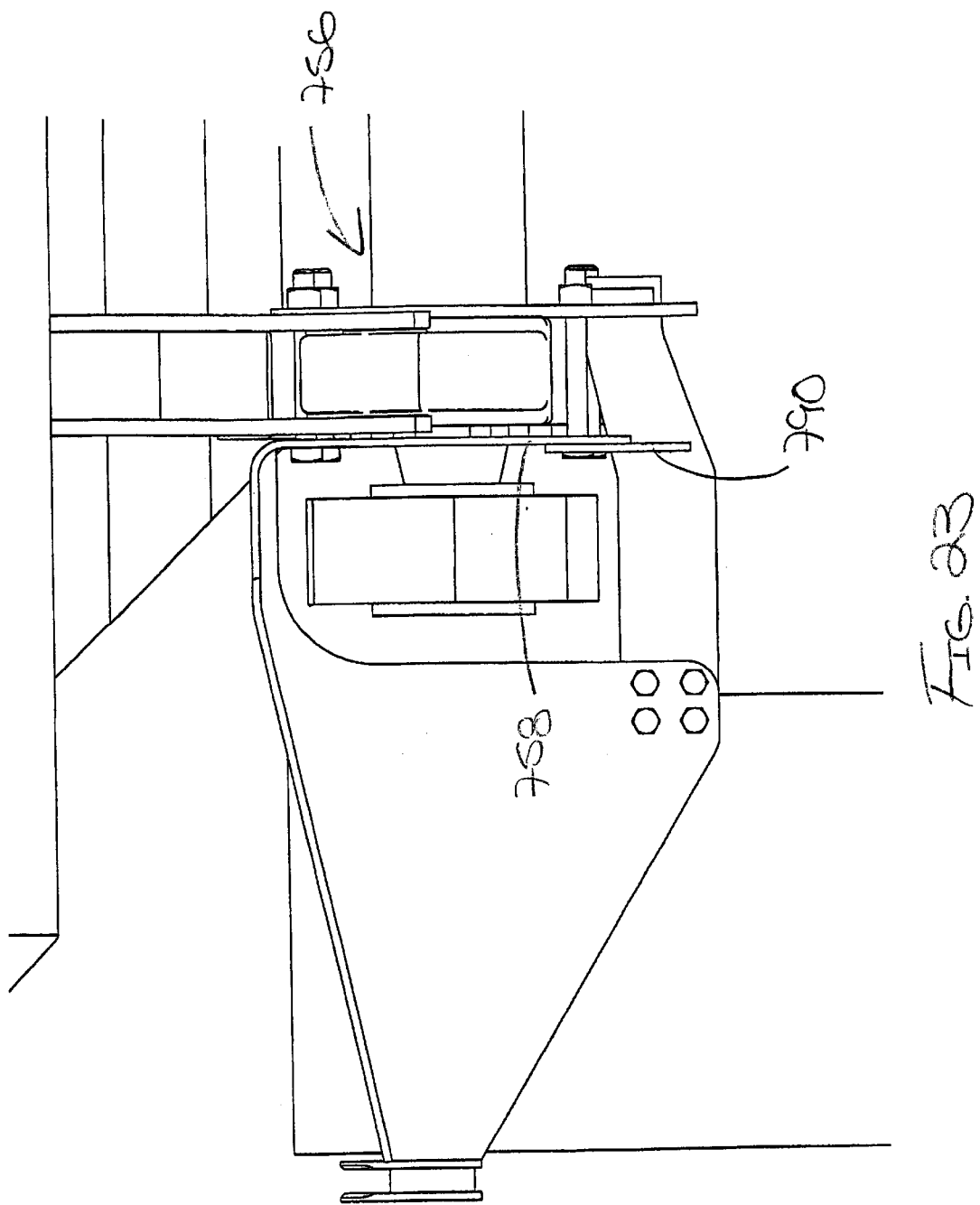
Figure 85:
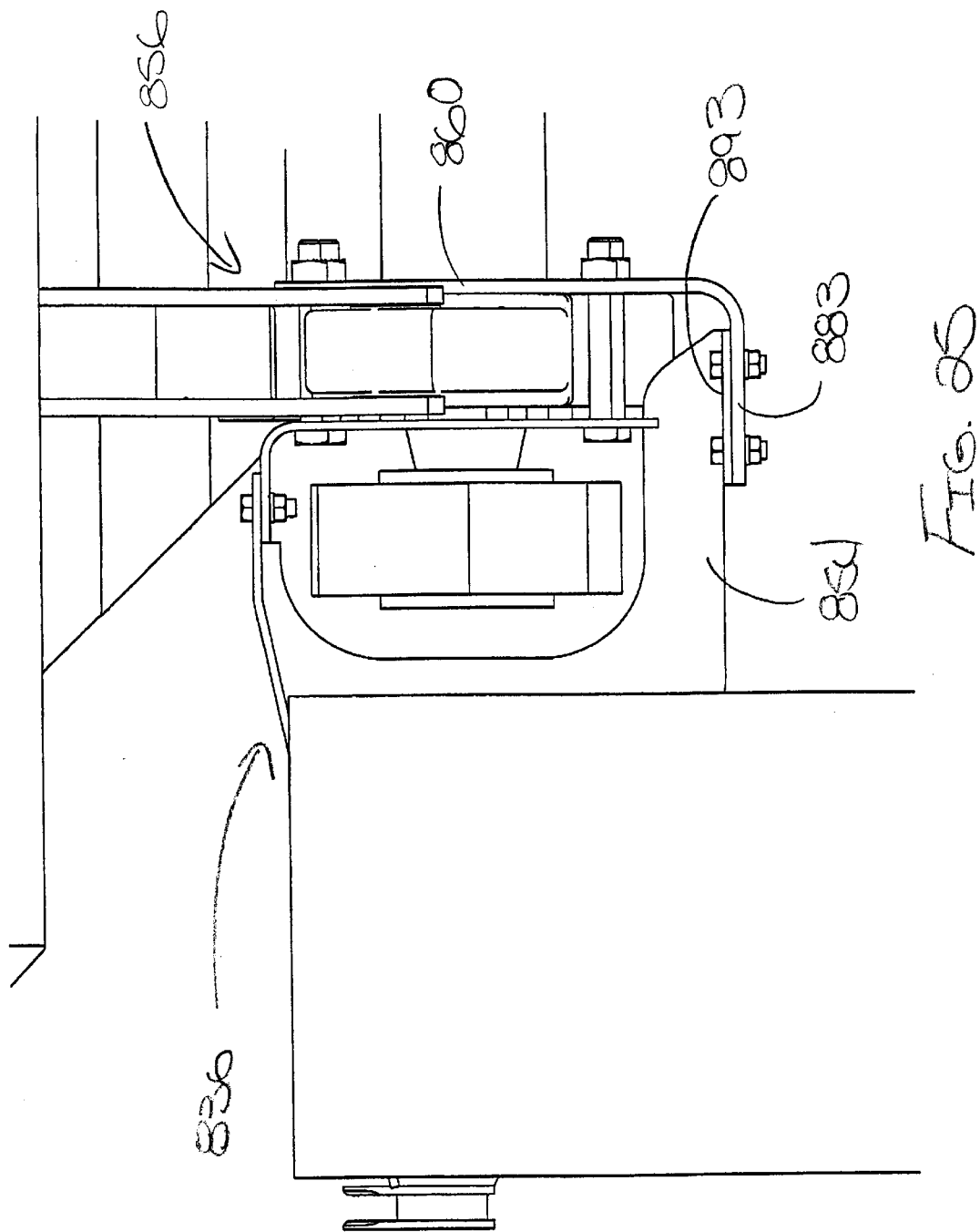
Figure 87:
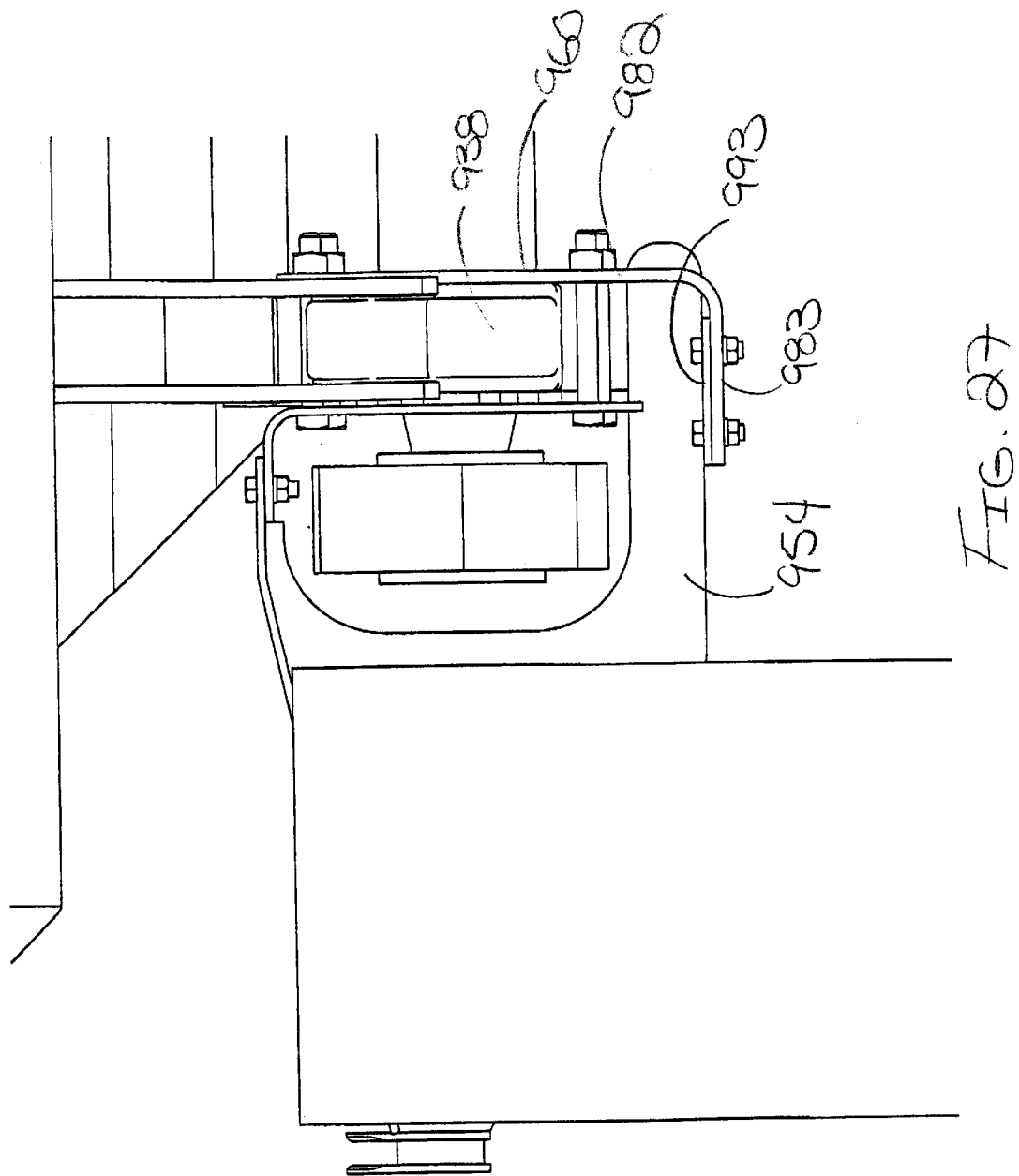
Figure 19:
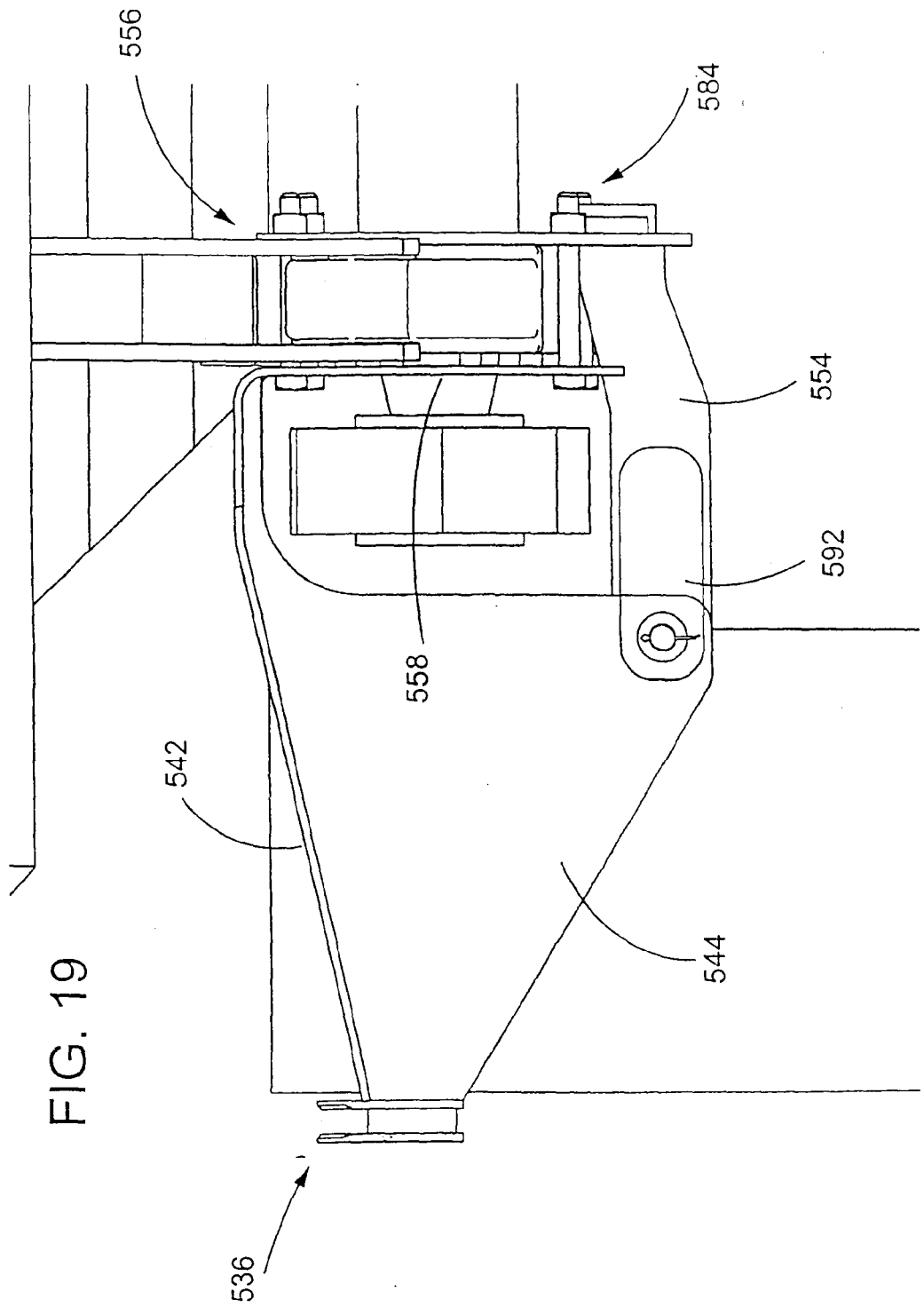
FIG. 19 is an enlarged side view of the outrigger assembly of FIG. 18.

Another embodiment of the present invention is illustrated in FIGS. 18 and 19. Instead of comprising a separate component, the mounting member 558 of the mounting assembly 556 of this embodiment consists of an integral downwardly extending portion at an inner end of the horizontal plate 542 of the outrigger assembly 536 (see FIG. 19). In contrast, the vertical plate 544 of the outrigger assembly 536 has a two-piece construction with the lower arm 554 of the vertical plate 544 comprising a separate component. More specifically, the lower arm 554 has a yoke 592 at its outer end within which an inner end of the main portion of the vertical plate 544 is received. The two parts of the vertical plate 544 are secured together in this instance by a pin and cotter key arrangement. The lower arm 554 of the vertical plate 544 is connected to the clamp member using the same slot-and-tab arrangement 584 described in connection with the embodiment of FIGS. 14 and 15.

Figure 20:
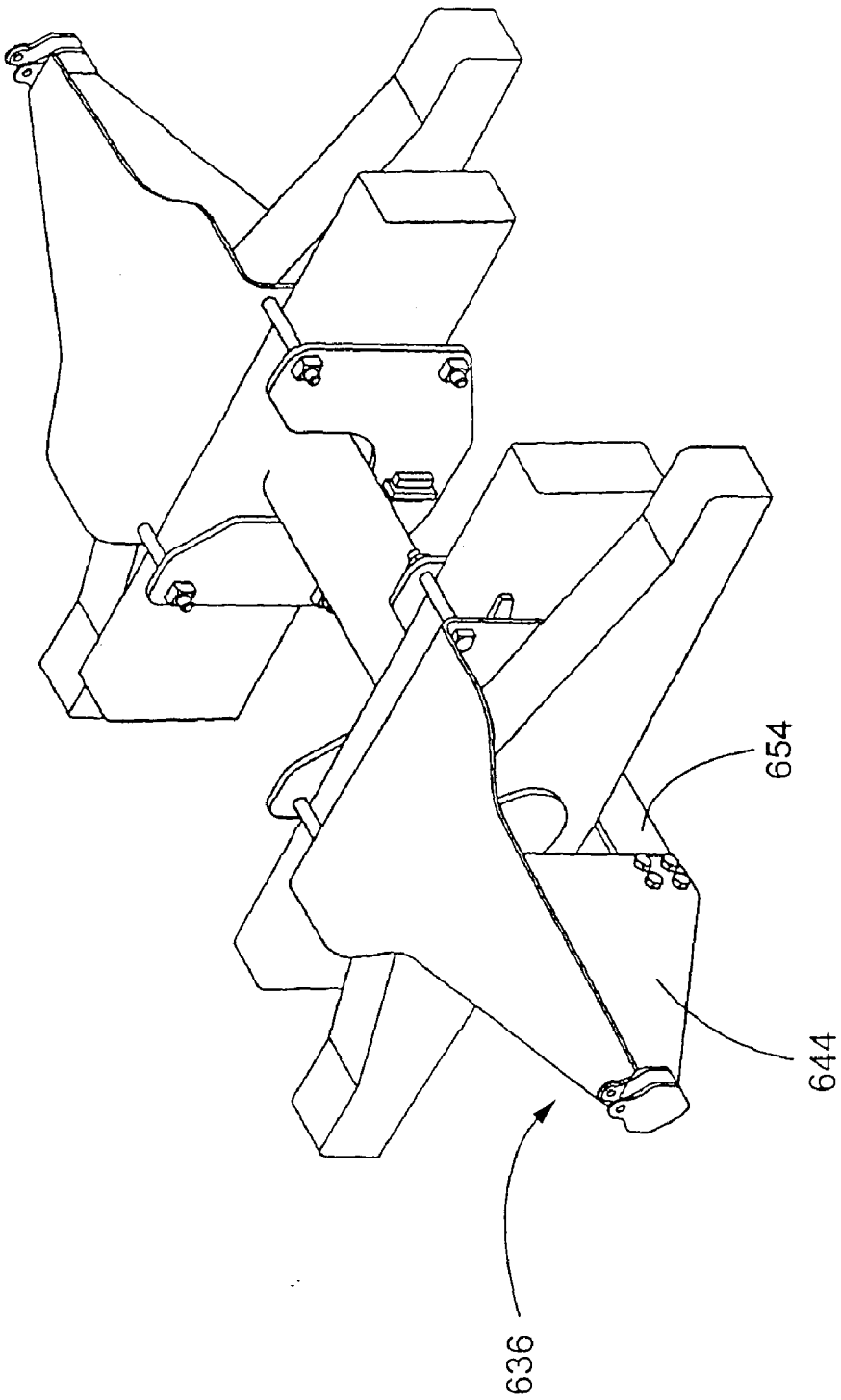
FIG. 20 is a perspective view of another alternative embodiment of an outrigger assembly according to the present invention.
Figure 21:
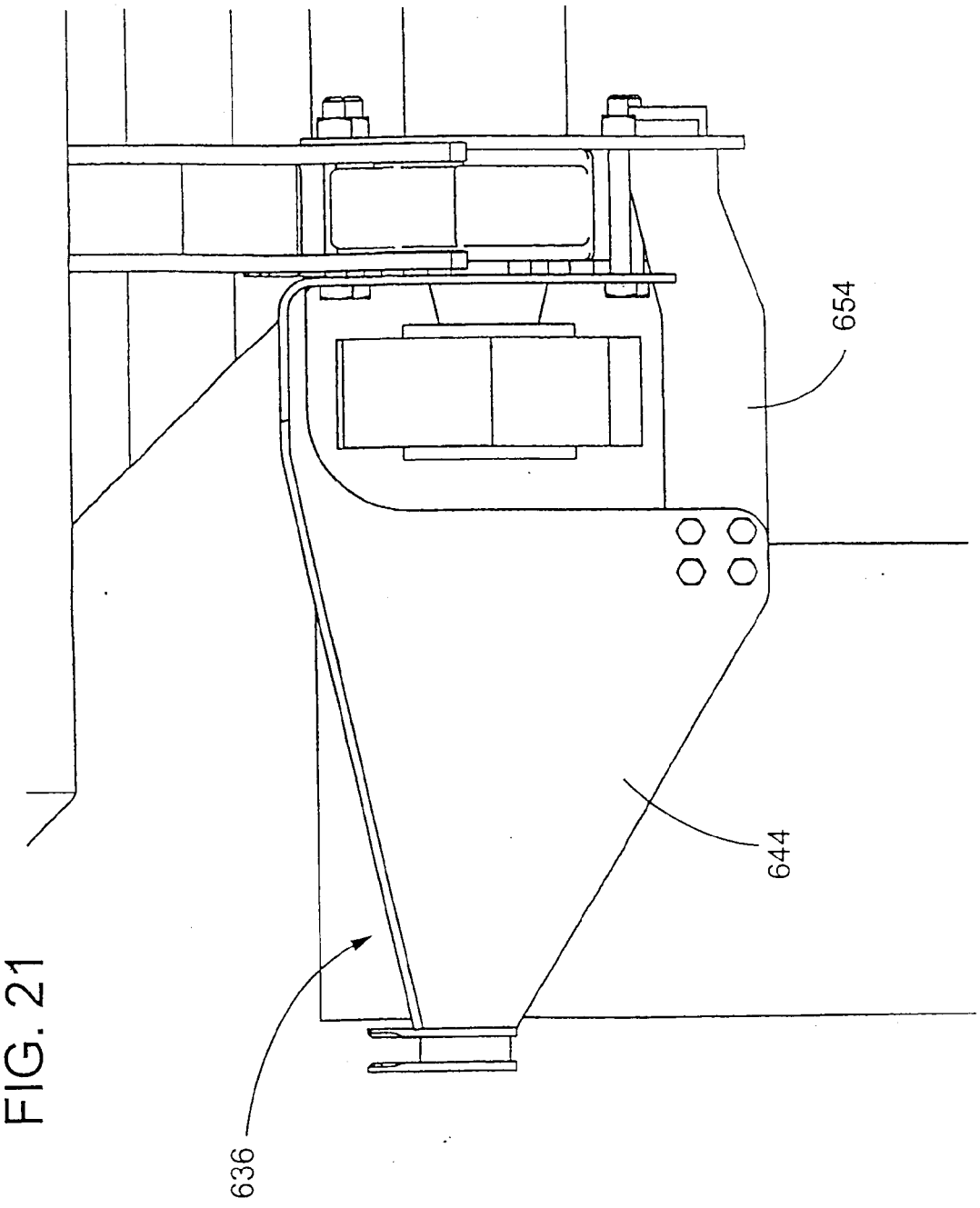
FIG. 21 is an enlarged side view of the outrigger assembly of FIG. 20.
Figure 22:
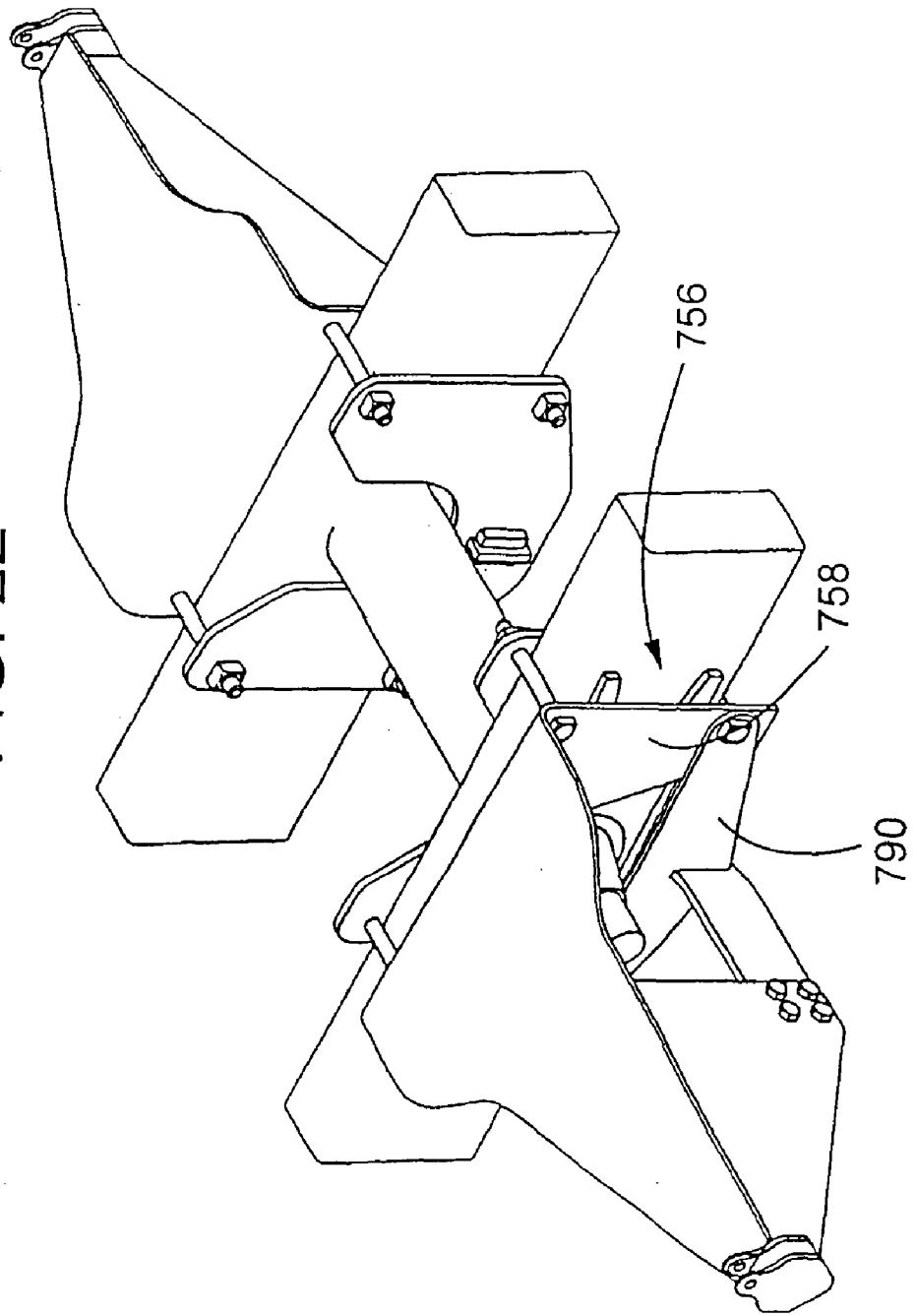
FIG. 22 is a perspective view of another alternative embodiment of an outrigger assembly according to the present invention.
Figure 23:
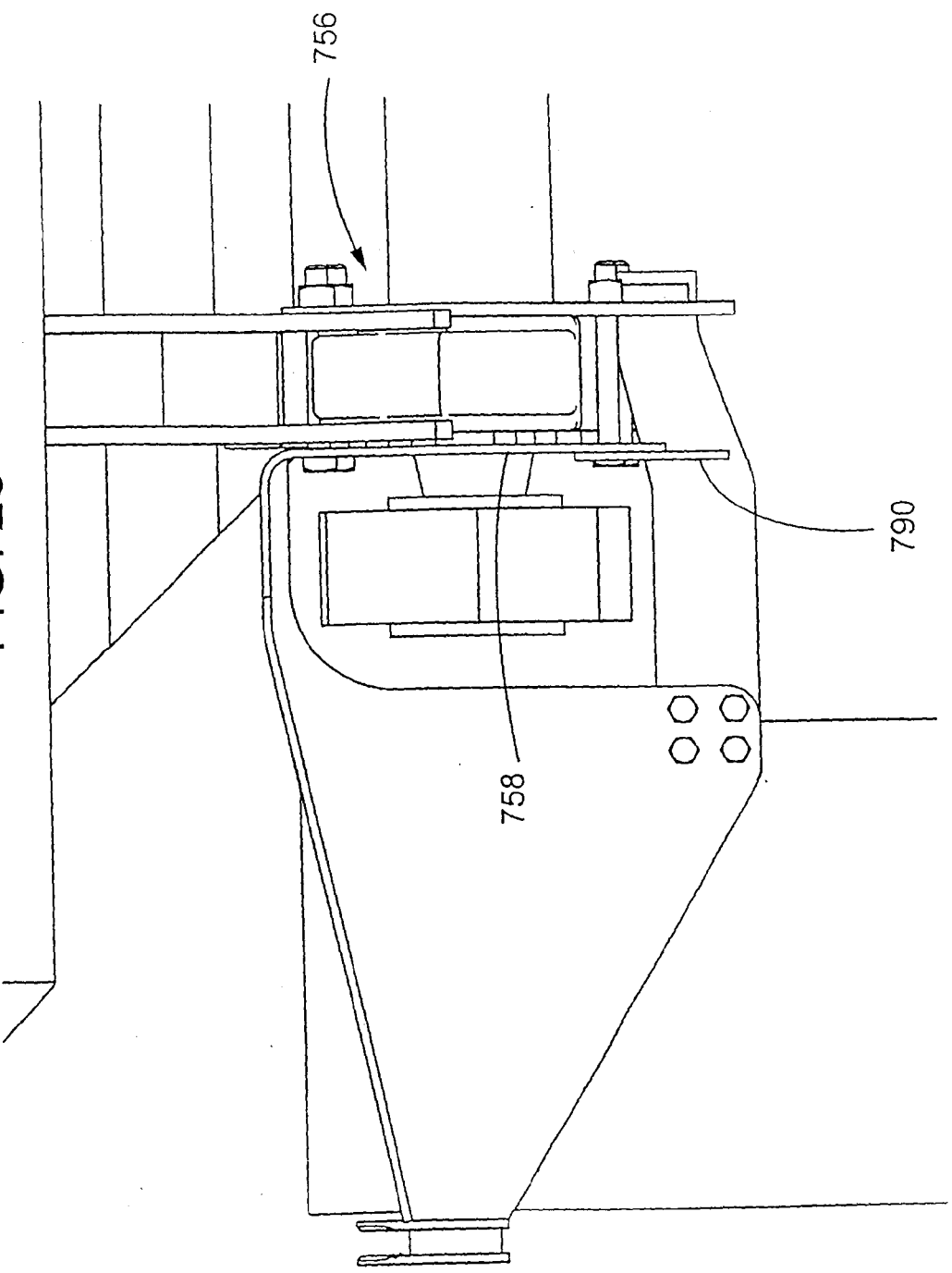
FIG. 23 is an enlarged side view of the outrigger assembly of FIG. 22.

The embodiment of the invention illustrated in FIGS. 20–21 is the same as that shown in FIGS. 18–19 except that the lower arm 654 of the outrigger assembly 636 is attached to the remainder of the vertical plate 644 using bolts instead of a yoke and pin. Similarly, the embodiment of the FIGS. 22 and 23 is the same as that shown FIGS. 20–21 except that the mounting assembly 756 includes a stabilizing crosspiece 790 like that used in the FIGS. 16–17 which extends between the legs of the mounting member 758.

Figure 24:
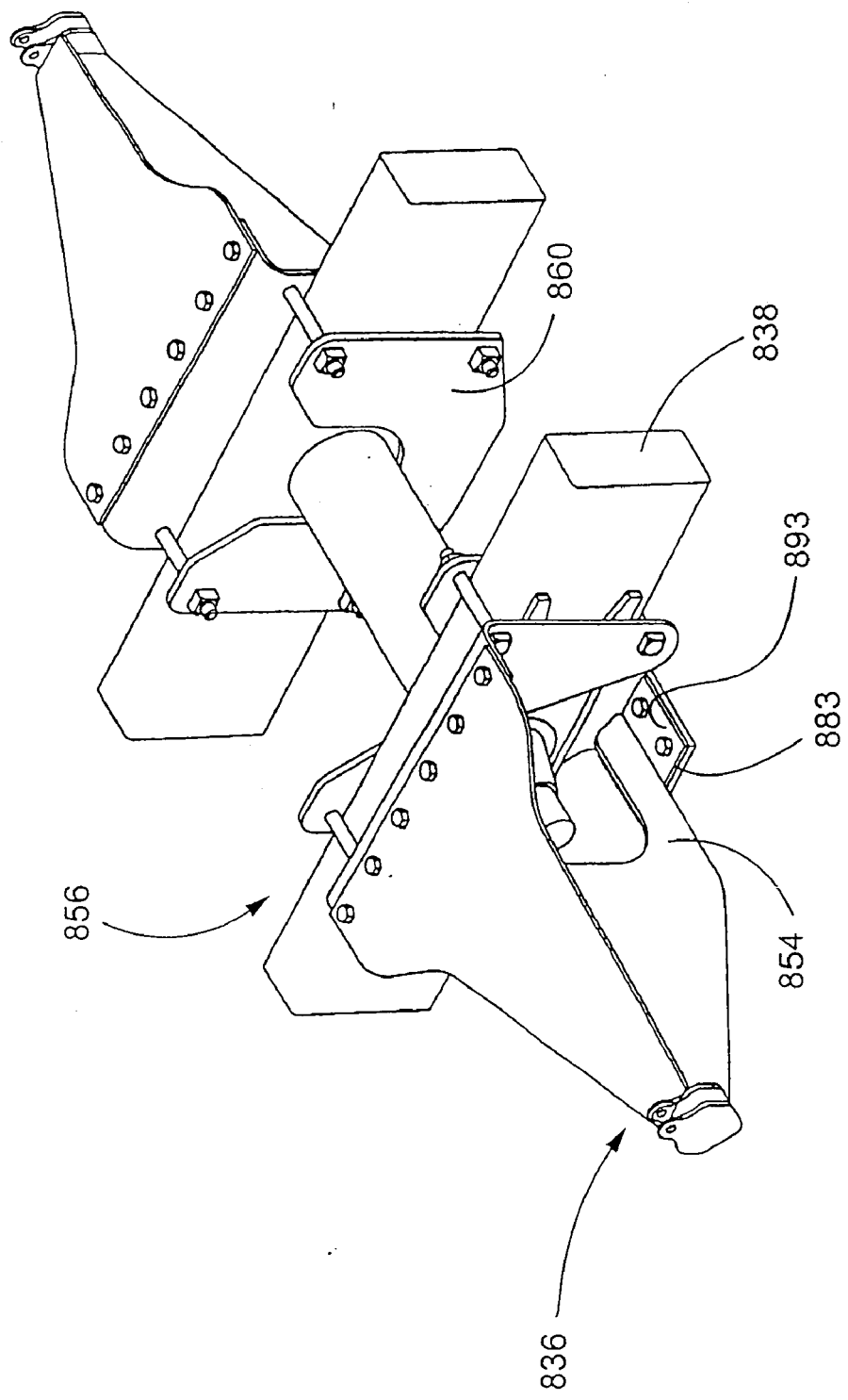
FIG. 24 is a perspective view of another alternative embodiment of an outrigger assembly according to the present invention.
Figure 25:
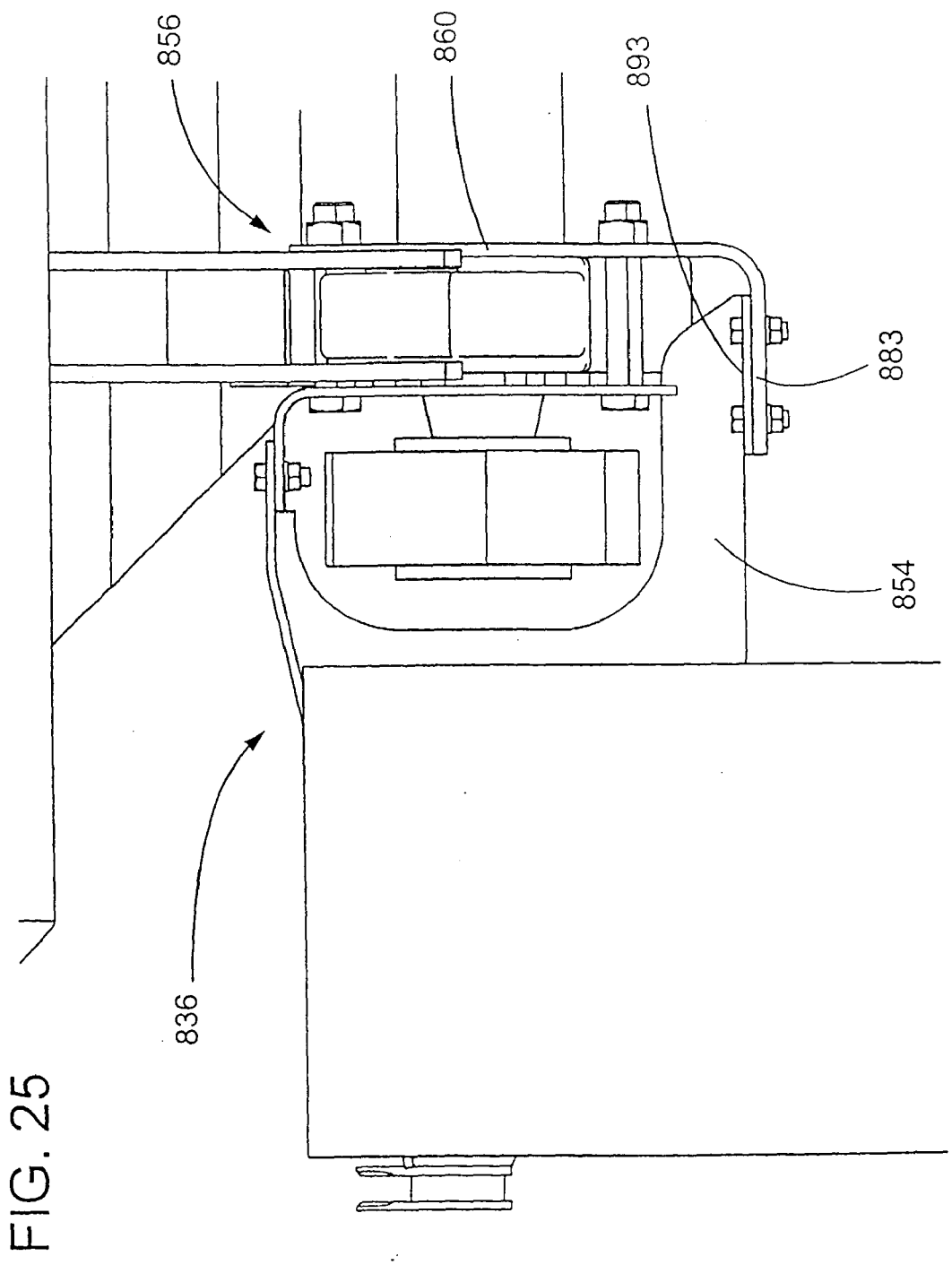
FIG. 25 is an enlarged side view of the outrigger assembly of FIG. 24.
Figure 26:
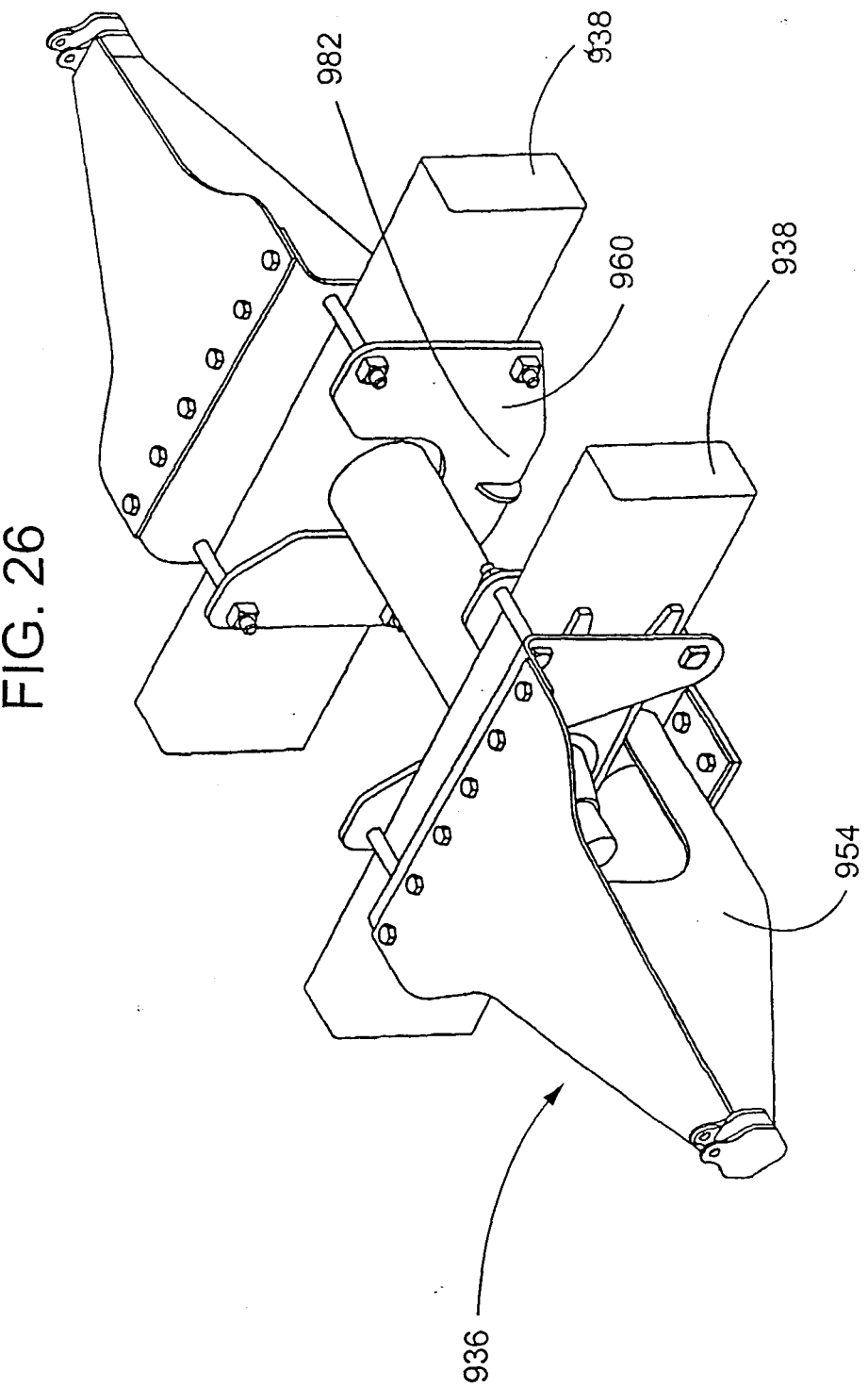
FIG. 26 is a perspective view of another alternative embodiment of an outrigger assembly according to the present invention.
Figure 27:
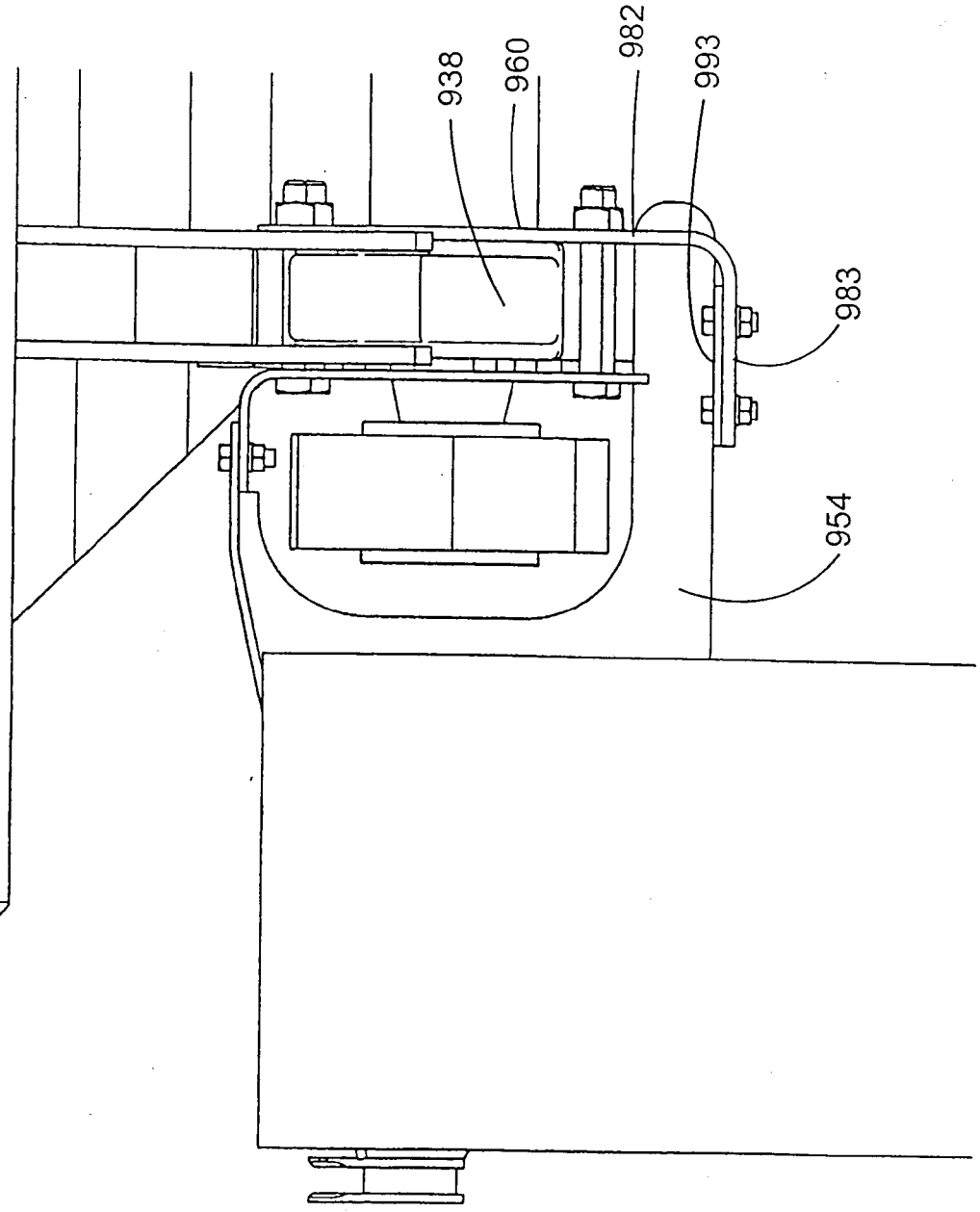
FIG. 27 is an enlarged side view of the outrigger assembly of FIG. 26.

Yet another alternative embodiment of the present invention is shown in FIGS. 24 and 25. In this embodiment, the clamp member 860 of the mounting assembly 856 includes a horizontal extension 883 at its lower end that extends outwardly beneath the longitudinal frame member 838 toward the lower arm 854 of the outrigger assembly 836. A horizontal plate 893 is attached to the lower arm 854 that can be secured to the horizontal extension 883 of clamp member 860 by bolts or the like. As shown in the embodiment of FIGS. 26 and 27, to provide additional stability, the lower arm 954 of the outrigger assembly 936 could extend beneath the longitudinal frame member 938 and be received in a slot in the vertical portion 982 of the clamp member 960 that extends below the lower edge of the longitudinal frame member 938 (see, e.g., FIG. 27). As with the FIGS. 24 and 25 embodiment, a horizontal plate 993 on the lower arm 954 of the outrigger assembly is secured to a horizontal extension 983 of the clamp member 960 via bolts.

Figure 28:
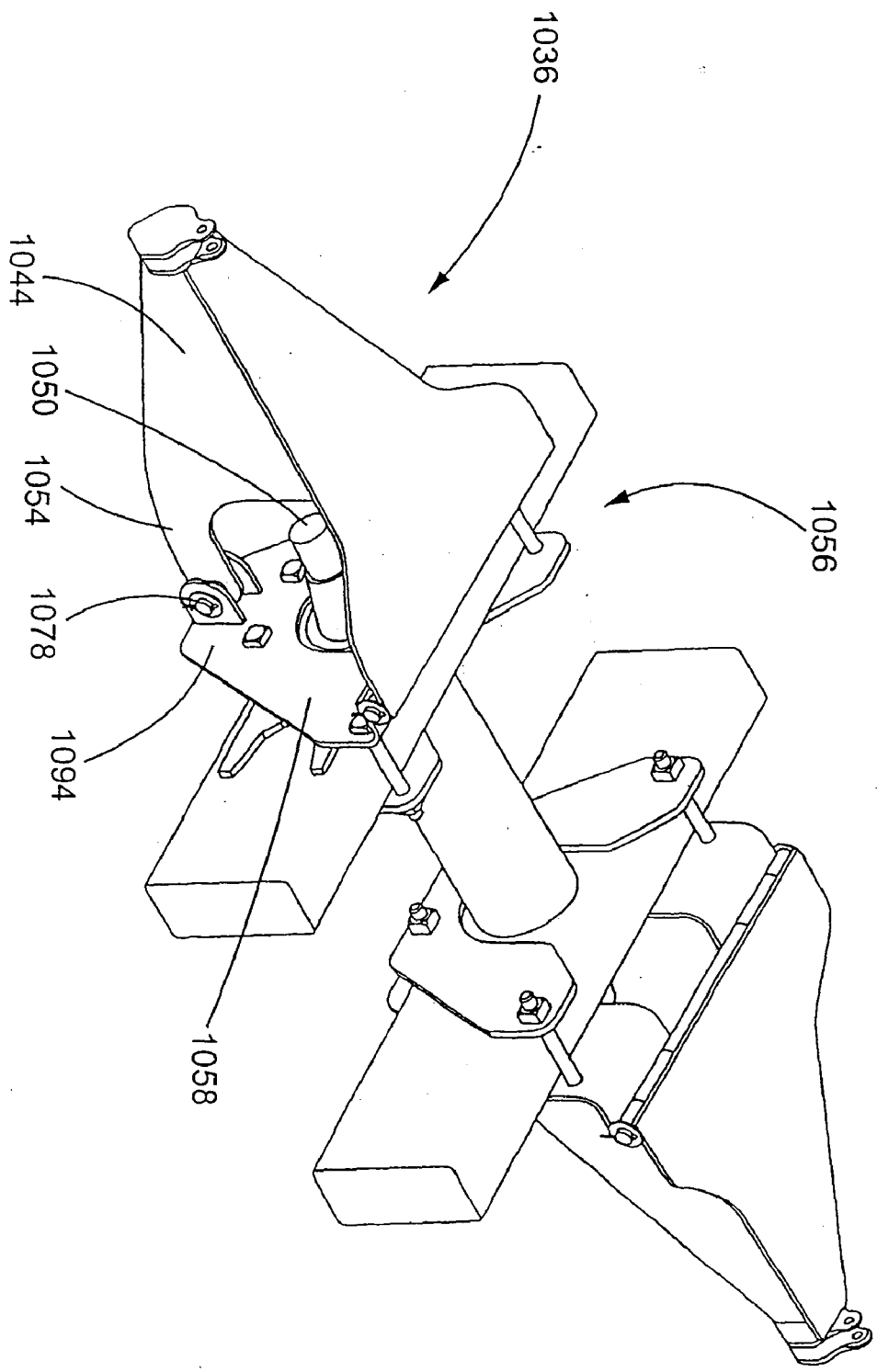
FIG. 28 is a perspective view of another alternative embodiment of an outrigger assembly according to the present invention.
Figure 29:
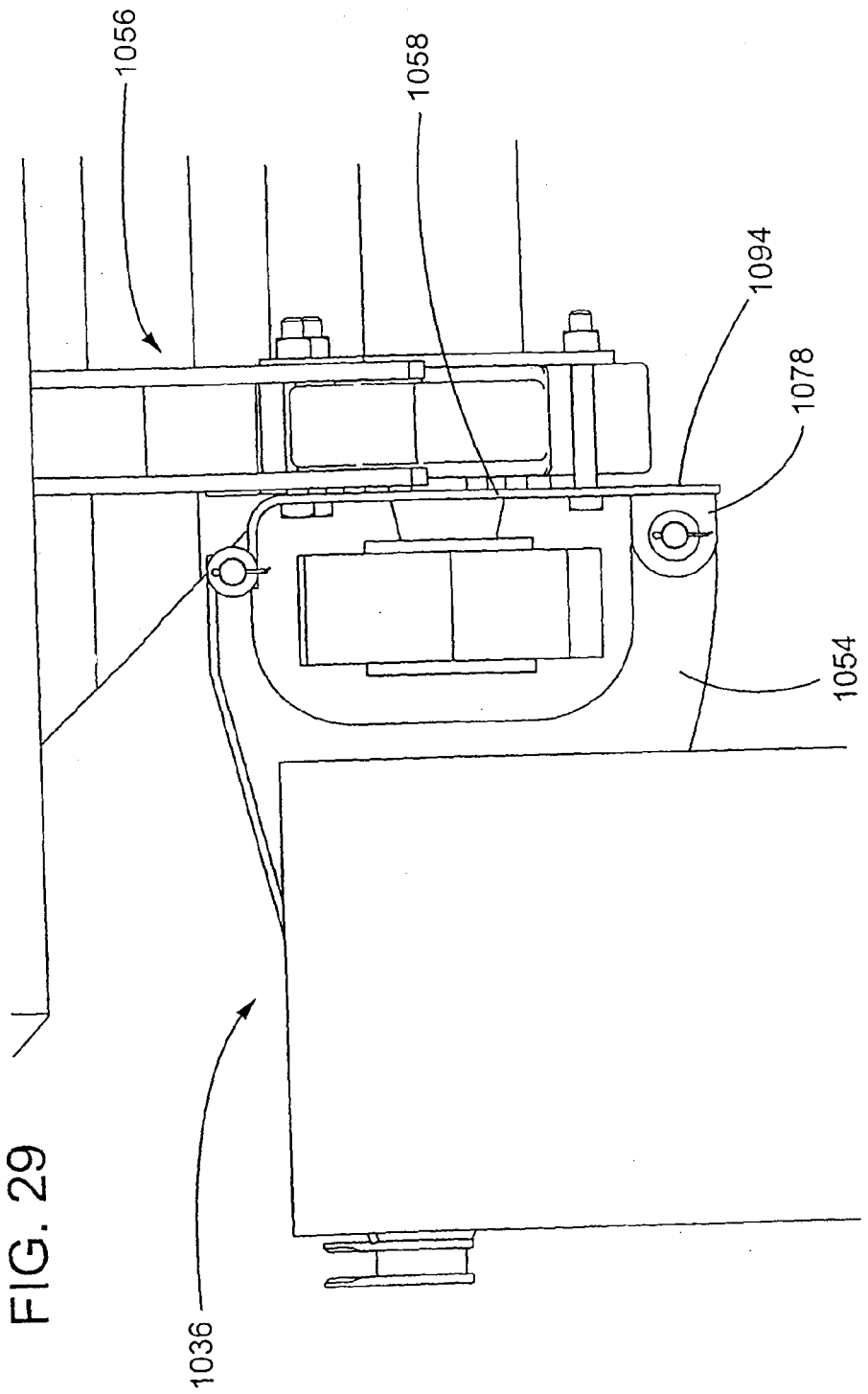
FIG. 29 is an enlarged side view of the outrigger assembly of FIG. 28.

Another embodiment of the invention in which the lower arm 1054 of the outrigger assembly 1036 is attached to the mounting member 1058 is illustrated in FIGS. 28 and 29. In particular, the mounting assembly 1056 includes a mounting member 1058 having a vertical portion 1094 arranged, in this case, below the trunnion 1050 that provides a surface to which the lower arm 1054 of the outrigger assembly 1036 can be attached. A mounting ear 1078 is provided on the vertical portion 1094 to which the lower arm 1054 of the vertical plate 1044 can be attached via a pin and cotter key arrangement.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventor for carrying out the invention. Of course, variations of those preferred embodiments will become apparent to those of ordinary skill in the art upon reading the foregoing description. The inventor expects skilled artisans to employ such variations as appropriate, and the inventor intends for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

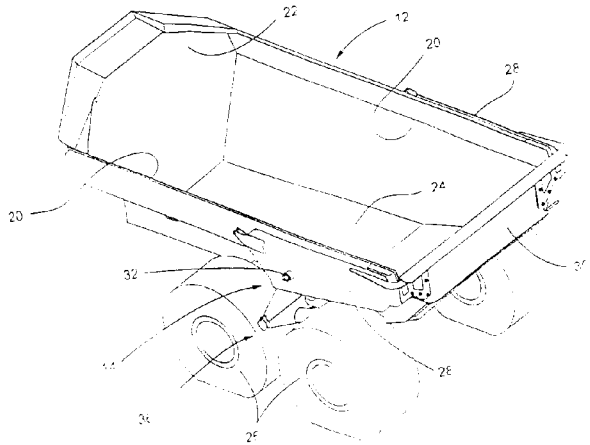

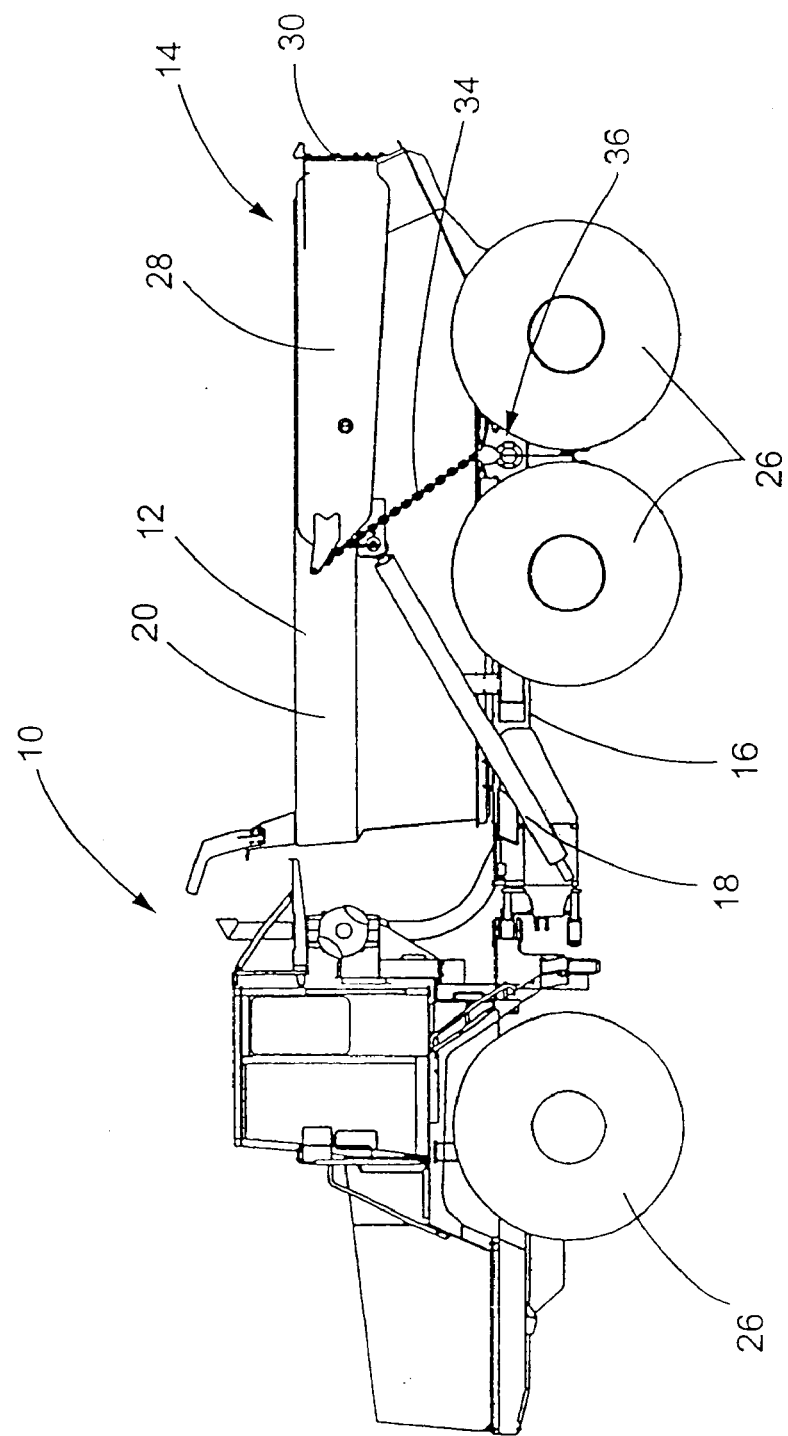

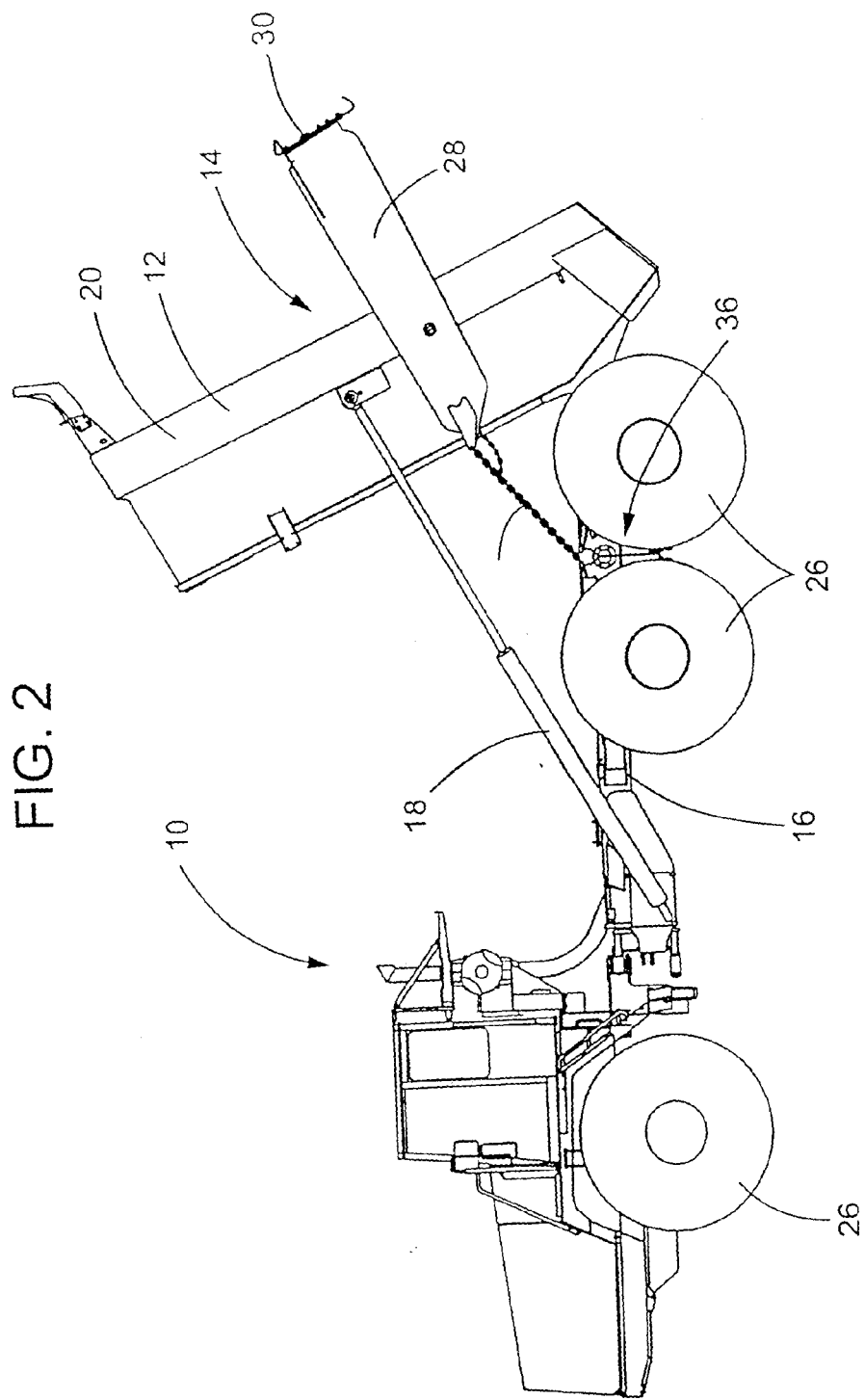

What is claimed is:

1. A tailgate assembly for a dump body of a truck, the dump body having a pair of opposing sidewalls and an open rear end, the dump body being movable relative to a truck frame between a lowered transport position and a raised dump position, the tailgate assembly comprising:
   a pair of opposing sidearms each of which is pivotally connected to a respective one said sidewall of the dump body and a center-rear portion supported between the opposing sidearms, the sidearms and center-rear portion being movable between a closed position wherein the center-rear portion spans substantially between the opposing sidewalls of the dump body and encloses the open rear end of the dump body and an open position wherein the center-rear portion is positioned away from the open rear end of the dump body;
   a pair of outrigger assemblies, each outrigger assembly having an associated mounting assembly for connecting the respective outrigger assembly to the truck frame, each mounting assembly including a mounting member for engaging a first surface of the frame, a clamp member for engaging a second surface of the frame which opposes the first surface and at least one fastener for interconnecting the mounting and members thereby clamping the frame therebetween; and
   a pair of connectors, each connector coupling a respective one of the sidearms to a respective one of the outrigger assemblies such that the sidearms and center-rear portion rotate between the open and closed positions in response to rotation of the dump body between the lowered and raised positions.

2. The tailgate assembly of claim 1 wherein each of the outrigger assemblies has a passage therethrough through which a component of the truck can extend.

3. The tailgate assembly of claim 1 wherein an upper end of each of the outrigger assemblies is connected to the respective mounting member.

4. The tailgate assembly of claim 3 wherein the upper end of each of the outrigger assemblies is connected to an outwardly extending portion of the respective mounting member.

5. The tailgate assembly of claim 1 wherein a lower end of each of the outrigger assemblies is connected to the respective clamp member.

6. The tailgate assembly of claim 1 wherein a lower end of each of the outrigger assemblies is connected to a respective mounting ear supported on the truck frame.

7. The tailgate assembly of claim 1 wherein a lower arm of each of the outrigger assemblies is connected to a respective mounting ear supported on the clamp member.

8. The tailgate assembly of claim 7 wherein the mounting ear is supported on a vertical portion of the clamp member that extends below a lower edge of the truck frame.

9. The tailgate assembly of claim 7 wherein the mounting ear is supported by both a vertical portion of the clamp member that extends below a lower edge of the truck frame and a horizontal portion of the clamp member that extends perpendicular to the vertical portion of the clamp member.

10. The tailgate assembly of claim 1 wherein a lower arm of each of the outrigger assemblies is received in a slot in the respective clamp member.

11. The tailgate assembly of claim 10 wherein tabs are secured on a portion of the lower arm which extends through the clamp member to prevent the withdrawal of the lower arm.

12. The tailgate assembly of claim 11 wherein a shoulder portion on the lower arm abuts against an outer surface of the clamp member.

13. The tailgate assembly of claim 1 wherein a horizontal plate secured to a lower arm of each of the outrigger assemblies is secured to a horizontal portion of the respective clamp member which extends below the truck frame.

14. The tailgate assembly of claim 13 wherein an end portion of the lower arm extends through a slot in the clamp member.

15. The tailgate assembly of claim 1 wherein each of the outrigger assemblies includes a horizontal plate and vertical plate extending downwardly from the horizontal plate.

16. The tailgate assembly of claim 15 wherein the mounting member associated with each outrigger assembly is integral with the respective horizontal plate.

17. The tailgate assembly of claim 15 wherein the horizontal plate of each outrigger assembly is bolted to the respective mounting member.

18. The tailgate assembly of claim 15 wherein the horizontal plate of each outrigger assembly is connected by pin and key arrangement to the respective mounting member.

19. The tailgate assembly of claim 15 wherein the vertical plate has a passage therethrough through which a component of the truck can extend.

20. The tailgate assembly of claim 19 wherein a lower edge of the passage is defined by a lower arm.

21. The tailgate assembly of claim 20 wherein the lower arm connects to the respective clamp member.

22. The tailgate assembly of claim 20 wherein the lower arm is integral with the remainder of the vertical plate.

23. The tailgate assembly of claim 20 wherein the lower arm comprises a separate component connected to the remainder of the vertical plate.

24. The tailgate assembly of claim 20 wherein the mounting member includes a pair of legs and the mounting assembly further includes a stabilizing crosspiece extending between the legs of the mounting member, the stabilizing crosspiece including a slot through which the lower arm extends.

25. The tailgate assembly of claim 1 wherein a lower end of each of the outrigger assemblies is connected to the respective mounting member.

26. An outrigger assembly for a dump body of a truck, the dump body being supported on a truck frame, the outrigger assembly comprising a mounting assembly for connecting the outrigger assembly to the truck frame, each mounting assembly including a mounting member for engaging a first surface of the frame, a clamp member for engaging a second surface of the frame which opposes the first surface and at least one fastener for interconnecting the mounting and clamping members thereby clamping the frame therebetween.

27. The outrigger assembly of claim 26 wherein an upper end of the outrigger assembly is connected to the mounting member.

28. The outrigger assembly of claim 26 wherein a lower end of the outrigger assembly is connected to the clamp member.

29. The outrigger assembly of claim 26 wherein a lower end of the outrigger assembly is connected to a mounting ear supported on the truck frame.

30. The outrigger assembly of claim 26 wherein a lower arm of the outrigger assembly is connected to a mounting ear supported on the clamp member.

31. The outrigger assembly of claim 30 wherein the mounting ear is supported on a vertical portion of the clamp member that extends below a lower edge of the truck frame.

32. The outrigger assembly of claim 31 wherein the mounting ear is supported by both a vertical portion of the clamp member that extends below a lower edge of the truck frame and a horizontal portion of the clamp member that extends perpendicular to the vertical portion of the clamp member.

33. The outrigger assembly of claim 26 wherein a lower arm of the outrigger assembly is received in a slot in the respective clamp member.

34. The outrigger assembly of claim 33 wherein tabs are secured on a portion of the lower arm which extends through the clamp member to prevent the withdrawal of the lower arm.

35. The outrigger assembly of claim 34 wherein a shoulder portion on the lower arm abuts against an outer surface of the clamp member.

36. The outrigger assembly of claim 26 wherein a horizontal plate secured to a lower arm of the outrigger assembly is secured to a horizontal portion of the clamp member which extends below the truck frame.

37. The outrigger assembly of claim 36 wherein an end portion of the lower arm extends through a slot in the clamp member.

38. The outrigger assembly of claim 26 wherein the outrigger assembly includes a horizontal plate and vertical plate extending downwardly from the horizontal plate.

39. The outrigger assembly of claim 38 wherein the mounting member is integral with the respective horizontal plate.

40. The outrigger assembly of claim 38 wherein the vertical plate has a passage therethrough through which a component of the truck can extend.

41. The outrigger assembly of claim 40 wherein a lower edge of the passage is defined by a lower arm.

42. The outrigger assembly of claim 41 wherein the lower arm connects to the respective clamp member.

43. The outrigger assembly of claim 41 wherein the mounting member includes a pair of legs and the mounting assembly further includes a stabilizing crosspiece extending between the legs of the mounting member, the stabilizing crosspiece including a slot through which the lower arm extends.

44. The outrigger assembly of claim 26 wherein a lower end of the outrigger assembly is connected to the clamp member.

* * * * *

UNITED STATES PATENT AND TRADEMARK OFFICE
CERTIFICATE OF CORRECTION

PATENT NO.    : 6,726,288 B2
DATED         : April 27, 2004
INVENTOR(S)   : LeRoy G. Hagenbuch It is certified that error appears in the above-identified patent and that said Letters Patent is hereby corrected as shown below:

The title page showing illustrative figures, should be deleted and substitute therefore the attached title page.

The drawing sheets consisting of Figs 1-29 should be deleted to be replaced with the drawing sheets, consisting of Figs. 1-29, as shown on the attached pages.

Signed and Sealed this

Fourteenth Day of September, 2004

JON W. DUDAS
*Director of the United States Patent and Trademark Office*

(12) United States Patent
Hagenbuch

(10) Patent No.: US 6,726,288 B2
(45) Date of Patent: Apr. 27, 2004

(54) TAILGATE ASSEMBLY FOR AN OFF-ROAD TRUCK

(76) Inventor: LeRoy G. Hagenbuch, 502 W. Northgate Rd., Peoria, IL (US) 61614

(*) Notice: Subject to any disclaimer, the term of this patent is extended or adjusted under 35 U.S.C. 154(b) by 79 days.

(21) Appl. No.: 10/145,836

(22) Filed: May 14, 2002

(65) Prior Publication Data
US 2003/0214174 A1 Nov. 20, 2003

(51) Int. Cl.$^7$ .................................................. B60P 1/26
(52) U.S. Cl. ................................ 298/23 D; 298/230 F; 296/56
(58) Field of Search ........................ 298/23 MD, 23 D, 298/230 F, 17 B; 296/56, 50, 184

(56) References Cited

U.S. PATENT DOCUMENTS

| 2,639,187 A | * | 5/1953 | Grumbache ................. 296/37.6 |
| 3,272,552 A | | 9/1966 | Park |
| 3,720,446 A | | 3/1973 | Kelley |
| 3,751,112 A | * | 8/1973 | Hagenbuch ............... 298/23 DF |
| 3,905,493 A | | 9/1975 | Logue |
| 3,905,616 A | | 9/1975 | Tamburino et al. |
| 3,917,343 A | | 11/1975 | Taylor et al. |
| 3,927,724 A | * | 12/1975 | Baker ........................... 177/136 |
| 4,050,734 A | | 9/1977 | Richard |
| 4,071,277 A | | 1/1978 | Stedman |
| 4,323,279 A | | 4/1982 | Domes et al. |
| 4,348,055 A | | 9/1982 | Meisner et al. |
| 4,531,781 A | | 7/1985 | Hunt et al. |
| 4,621,858 A | | 11/1986 | Hagenbuch |
| 4,666,003 A | * | 5/1987 | Reichow ...................... 177/136 |
| 4,678,235 A | | 7/1987 | Hagenbuch |
| 4,779,931 A | * | 10/1988 | Miller et al. .............. 298/17 B |
| 5,100,279 A | | 3/1992 | Bjerk |
| 5,112,082 A | * | 5/1992 | Clelland ..................... 280/783 |
| 5,228,750 A | | 7/1993 | Hagenbuch |
| 5,372,448 A | * | 12/1994 | Gilb ............................ 403/231 |
| 5,474,363 A | | 12/1995 | Hagenbuch |
| 5,887,914 A | | 3/1999 | Hagenbuch |
| 6,495,774 B1 | * | 12/2002 | Pederson .................... 177/136 |
| 6,517,143 B2 | * | 2/2003 | Hagenbuch ................. 296/184 |

FOREIGN PATENT DOCUMENTS

| CH | 98789 | 4/1940 |
| DE | 913876 | 6/1954 |
| GB | 595516 | 12/1947 |

OTHER PUBLICATIONS

Photographs (5) of an outrigger arrangement on a Moxy MT26 truck taken Mar. 22, 2002.

* cited by examiner

Primary Examiner—D. Glenn Dayoan
Assistant Examiner—H. Gutman
(74) Attorney, Agent, or Firm—Leydig, Voit & Mayer, Ltd.

(57) ABSTRACT

In view of the foregoing, a tailgate assembly for a dump body of a truck is provided. The tailgate assembly includes an outrigger assembly having an associated mounting assembly that permits the outrigger assembly to be fastened around the frame of the truck. Each mounting assembly includes a mounting member connected to the outrigger assembly for engaging a first surface of the frame, a clamp member for engaging a second surface of the frame and at least one fastener for interconnecting the mounting and clamping plates thereby clamping the frame therebetween.

44 Claims, 29 Drawing Sheets